(12) United States Patent
Barnhart et al.

(10) Patent No.: US 12,187,462 B2
(45) Date of Patent: Jan. 7, 2025

(54) USING GENETIC ALGORITHMS FOR SAFE SWARM TRAJECTORY OPTIMIZATION

(71) Applicant: UNIVERSITY OF SOUTHERN CALIFORNIA, Los Angeles, CA (US)

(72) Inventors: David Barnhart, Los Angeles, CA (US); Rahul Rughani, Los Angeles, CA (US); Tyler Presser, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 435 days.

(21) Appl. No.: 17/568,462

(22) Filed: Jan. 4, 2022

(65) Prior Publication Data

US 2022/0227503 A1    Jul. 21, 2022

Related U.S. Application Data

(60) Provisional application No. 63/133,602, filed on Jan. 4, 2021.

(51) Int. Cl.
*B64G 1/24* (2006.01)
*B64G 1/10* (2006.01)
*B64G 1/36* (2006.01)
*G06N 3/126* (2023.01)

(52) U.S. Cl.
CPC ........... *B64G 1/242* (2013.01); *B64G 1/1085* (2013.01); *B64G 1/36* (2013.01); *G06N 3/126* (2013.01)

(58) Field of Classification Search
CPC ........ B64G 1/242; B64G 1/1085; B64G 1/36; G06N 3/126
See application file for complete search history.

(56) References Cited

U.S. PATENT DOCUMENTS

| 11,228,362 | B2 * | 1/2022 | Schloemer | H04B 7/18513 |
| 2018/0162558 | A1 * | 6/2018 | Chao | B64G 1/2429 |
| 2020/0019435 | A1 * | 1/2020 | Stevenson | G06N 3/006 |
| 2022/0002006 | A1 * | 1/2022 | Hu | B64G 1/242 |

OTHER PUBLICATIONS

Rughani, R. et al., "Safe Construction in Space: Using Swarms of Small Satellites for In-Space Manufacturing," 34th Annual. Small Satellite Conference, 2020, 5 pgs.
Rughani, R., "Relative-Motion Trajectory Generation and Maintenance for Multi-Spacecraft Swarms, ProQuest Dissertations" Publishing, May 2021, 177 pgs.
Rughani, R. et al., "Sensor Fusion Kalman Filtering for Stability and Control of Satellite Swarms," 16h Int'l Conference on Space Operations, Cape Town, South Africa, 2021, 15 pgs.

* cited by examiner

*Primary Examiner* — Tarek Elarabi
(74) *Attorney, Agent, or Firm* — Brooks Kushman P.C.

(57) ABSTRACT

A control system includes a target spacecraft and a swarm of chaser spacecraft. Each chaser spacecraft is controlled to follow a corresponding computed trajectory. The system also includes at least one computing device that executes a nested genetic algorithm. The nested genetic algorithm includes multiple guidance genetic algorithms and an outer genetic algorithm. Characteristically, each chaser spacecraft has an associated guidance genetic algorithm that determines a computed trajectory for the chaser spacecraft associated therewith. Advantageously, the outer genetic algorithm checks for collisions and is configured to alter one or more computed trajectories to avoid collisions.

12 Claims, 28 Drawing Sheets

As viewed in the inertial frame.

As viewed from the comoving frame in circular orbit 1.

(a) XY Plane (b) XZ Plane (c) YZ Plane (d) Perspective View (a) XY Plane (b) XZ Plane (c) YZ Plane (d) Perspective View (a) XY Plane (b) XZ Plane (c) YZ Plane (d) Perspective View

USING GENETIC ALGORITHMS FOR SAFE SWARM TRAJECTORY OPTIMIZATION

CROSS-REFERENCE TO RELATED APPLICATIONS

This application claims the benefit of U.S. provisional application Ser. No. 63/133,602 filed Jan. 4, 2021, the disclosure of which is hereby incorporated in its entirety by reference herein.

TECHNICAL FIELD

In at least one aspect, the present invention relates to methods and systems for swarm trajectory optimization.

BACKGROUND

With the emergence of the space servicing sector and the anticipated return of manned missions beyond low earth orbit, there is a need for quick, efficient, and most of all, safe Rendezvous and Proximity Operations (RPO). More than that, the next technologic step forward in the space domain will be building objects in space using robotic vehicles, which will involve large numbers of spacecraft cooperating in close proximity to each other, all subjected to the laws of orbital mechanics. Currently, there is a lack of knowledge about how to safely operate a swarm of spacecraft in close quarters in a dynamically changing environment (i.e., what is considered a "space construction site"), without creating a high risk of collision and potential debris creation. Methods for swarm RPO safety are being developed but have not yet been tested in space, primarily due to a lack of focused application-based funding on the theoretical side and a lack of matured technology on the hardware side, given the high risk of operating many spacecraft in close proximity to each other in orbit.

Many people talk about a future in which spacecraft and structures are manufactured and built-in space, and indeed there are a handful of companies focusing today on making that dream a reality. However, there is no framework as of yet to set up or control a group, or a swarm, of individual spacecraft working cooperatively in close proximity to each other. This is different from traditional formation flying [1, 2], where a small number of spacecraft are in a static or highly-controlled pre-planned configuration, typically to collect scientific measurements. Swarms, by contrast, are inherently dynamic in nature, shifting in size and scope as the mission progresses. In the case of the on-orbit assembly or construction site example, it is expected that the object under construction would grow in a nonlinear fashion over time. Thus each independent construction or servicing spacecraft would be required to constantly modify its movement around the growing central object and each other, continuously avoiding any conjunction.

Currently, there is an interest in the development of a spacecraft that can perform on-orbit assembly [3-5] and in large structures to be manufactured in space from a single spacecraft [6-8]. However, there is a distinct lack of research into the processes of in-space construction and how to enable large-scale cooperative actions safely around a central object that is growing over time (i.e., an assembled large-scale structure).

Satellite swarms are groups of spacecraft that operate cooperatively to perform a common task or goal in orbit. Examples of this are an in-space assembly of structures, construction, cooperative sensing platforms, on-orbit servicing, asteroid mining, etc. The swarm framework is designed using relative-motion orbits, working around a common point in space, usually within a few kilometers of each other. Such swarms can share information between each member of the swarm, allowing them to have a shared situational awareness of the entire mission. Although not all members of the swarm may have the same functionality, i.e. some may be communication nodes, others may have robotic arms, and yet others may have scanning cameras and LIDARs, it is expected that they will all have propulsive capabilities to allow them to maneuver in relative orbits around each other and/or a common target.

As swarms are composed of many spacecraft operating in relatively close proximity to each other, there is an inherent risk of a possible collision, requiring complex planning to ensure safe operations in orbit. A large part of safety to date for satellite swarms is passive, where free orbital trajectories will not cause conjunction within a given amount of time, preventing unnecessary maneuvering and risk. In order to ensure passive safety of orbital trajectories of satellite swarms operating in close proximity, such that one vehicle's failure does not impact any other members of the swarm for a prescribed amount of time, a new set of orbital optimization algorithms are required to obtain these trajectories. This process will consider low collision risk and low delta-v, but also allow each member of the swarm to perform their specific set of tasks assigned to them.

Accordingly, there is a need for a framework and universal tool for spacecraft swarms that enables construction of a set of trajectories for a swarm with distributed tasks and mission goals.

SUMMARY

In at least one aspect, a swarm control system is provided. The swarm control system includes a target space platform and a swarm of chaser spacecraft. Each chaser spacecraft is controlled to follow a corresponding computed trajectory. The system also includes at least one computing device that executes a swarm control algorithm that includes a nested genetic algorithm. The nested genetic algorithm includes multiple guidance genetic algorithms and an outer genetic algorithm. Characteristically, each chaser spacecraft has an associated guidance genetic algorithm that determines a computed trajectory for the chaser spacecraft associated therewith. Advantageously, the outer genetic algorithm checks for collisions and is configured to alter one or more computed trajectories to avoid collisions.

In another aspect a new framework and universal tool for spacecraft swarms enables both construction of a set of trajectories for a swarm with distributed tasks and mission goals, and orbit maintenance/control to compensate for gravitational perturbations and unexpected events, including a swarm architecture that is fluctuating in size and shape.

In another aspect, the swarm control system can be configured to solve trajectories and maintain swarm efficiency and safety during in-space construction. For example, all the trajectories generated by the guidance and outer genetic algorithms are passively stable for a period of at least days. Additionally, the swarm GA method allows dynamic reconfiguration of the swarm to accept new spacecraft into the swarm, and to grow as the aggregated object changes in size and mass, an ability required for missions involving in-space manufacturing and assembly.

In another aspect, the swarm control system can be configured to solve trajectories and maintain swarm efficiency and safety during in space construction. The swarm control system having a swarm of spacecraft, each with its own processor, can offer a real-time parallel processing distributed option for computing in real-time GA solutions.

In another aspect, a computer implement method for controlling a swarm of chaser spacecraft includes steps of:
a) generating an initial population as an input set of position $r(t_0)$ and velocity $v(t_0)$ pairs where to is a start time;
b) compute trajectories from the input set of position $r(t_0)$ and velocity $v(t_0)$ pairs;
c) propagate the chaser spacecraft to a final time $t_f$;
d) calculate a trajectory fitness function using an initial position $r(t_0)$, an initial velocity $v(t_0)$, a final position $r(t_f)$, an final velocity $v(t_f)$;
e) if the trajectory fitness function for a given trajectory is calculated to be above a predetermined threshold, the given trajectory is identified as a potential trajectory;
f) encode set of position $r(t_0)$ and velocity $v(t_0)$ pairs into pairs of position binary numbers and velocity binary number;
g) select a predetermined number of the pairs of position binary numbers and velocity binary numbers having best values for the trajectory fitness function as parents for a next generation;
h) apply crossover to the parents;
i) apply mutations to the parents;
j) identify results from the crossover and mutation as inputs for a next iteration;
k) binary decoder results from the crossover and mutation to form a new set of position $r(t_0)$ and velocity $v(t_0)$ pairs; and
l) provide the new set of position $r(t_0)$ and velocity $v(t_0)$ pairs as the input set of position $r(t_0)$ and velocity $v(t_0)$ pairs in step b). Typically, steps b) to 1) are repeated until the trajectory fitness function achieves a predetermined value or until a predetermined number of iterations are executed.

In another aspect, a computer implemented method for patched rendezvous and proximity operations is provided. The computer implemented method includes steps of:
a. computing a transfer trajectory from Clohessy-Wiltshire equations, the transfer trajectory providing a trajectory from a first position to a second position that is a destination for a chaser spacecraft;
b. iteratively computing the transfer trajectory from a perturbed gravity model;
c. beginning transfer trajectory of the chaser spacecraft;
d. applying a Kalman filter to compute an estimated true position of the chaser spacecraft in real-time using onboard sensors;
e. using the estimated true position to recompute a target point at an end of a transfer arc; f, determining if the destination is reached if the destination is reached the transfer is complete;
g. if the destination is not reached, determining if a trajectory for the chaser spacecraft deviates from a safety corridor by more than a predetermined amount;
h. if the chaser spacecraft's trajectory deviates from the safety corridor by more than the predetermined amount, an impulsive maneuver is performed by the chaser spacecraft to align to an updated trajectory wherein step d) is re-executed while maintaining the original target point as the destination.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Figure 1A:
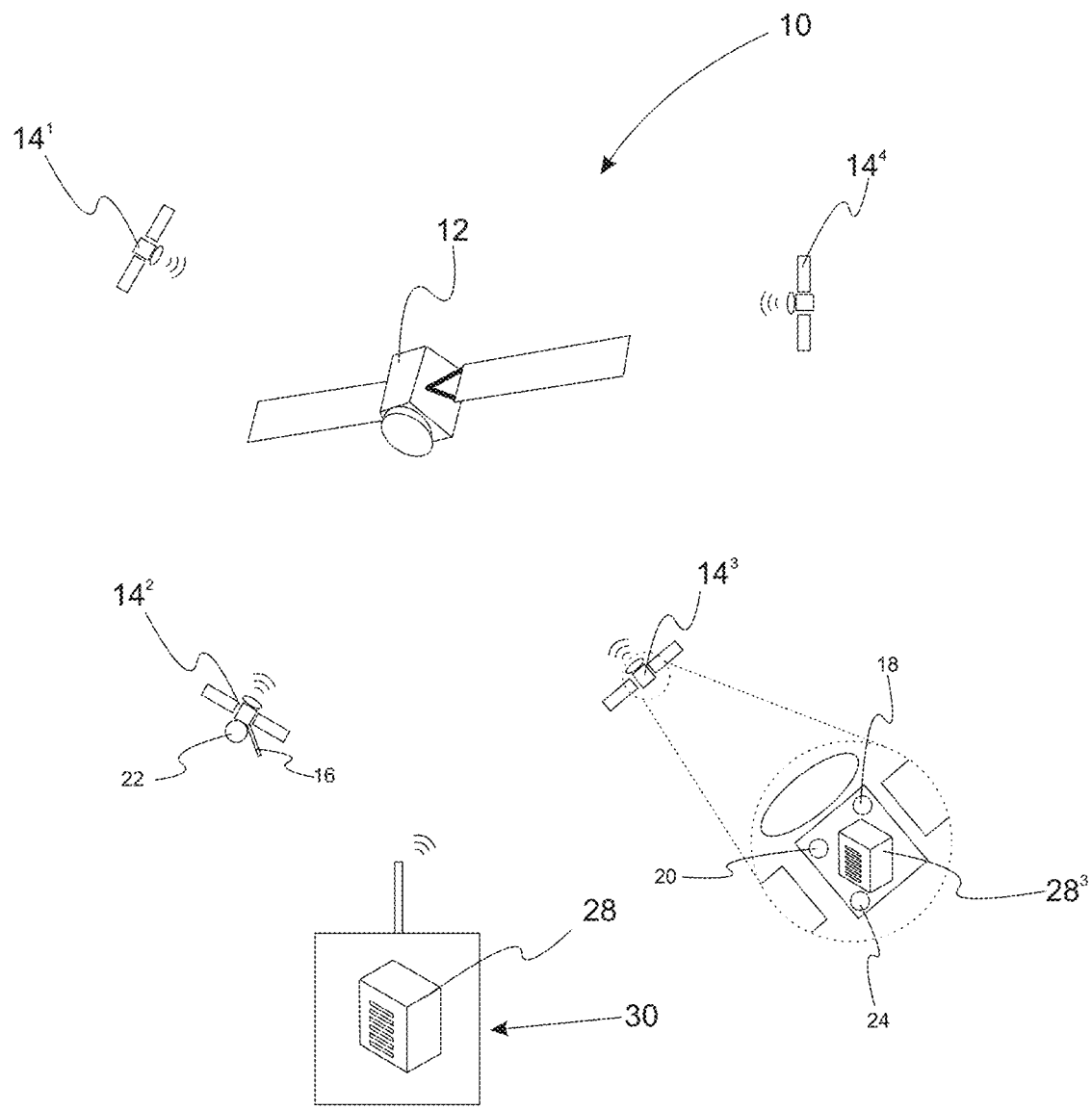
FIG. 1A.

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

The term "one or more" means "at least one" and the term "at least one" means "one or more." The terms "one or more" and "at least one" include "plurality" as a subset.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Throughout this application, where publications are referenced, the disclosures of these publications in their entireties are hereby incorporated by reference into this application to more fully describe the state of the art to which this invention pertains.

Abbreviations:
"C-W" means Clohessy-Wiltshire.
"GA" means genetic algorithm.
"LVLH" means Local-Vertical-Local-Horizontal.
"Npop" means population size.
"Ngen" means number of generations.
"Nsat" means the number of spacecraft.
"LEO" means low earth orbit.
"LIDAR" means Light Detection and Ranging.
"GEO" means geostationary earth orbit.
"OOS" means on-orbit servicing.
"pcross" means the probability of crossover.
"pmut" means the probability of mutation.
"r" means relative position.
"RPO" means rendezvous and proximity operations.
"SFKF" means Sensor Fusion unscented Kalman Filter.
"v" means relative velocity.

In an embodiment, a method of swarm movement optimization uses genetic algorithms to converge on an optimal set or family of trajectories for each member of the swarm. These trajectories are such that each member can perform their required individual actions while minimizing the fuel required for maneuvering and also avoiding conjunctions, to a prescribed probability of collision, for a given amount of time. While near term it is expected that ground command uplink intervention would be needed to determine and execute remedial actions in the case of failure on orbit of a single element in the swarm, the long-term goal is to develop autonomous algorithms to enable a swarm to accept and remediate failures, in real time. Genetic algorithms have been used previously for optimization of low thrust orbit transfers [9], drone delivery networks [10], and control of self-driving cars [11], among other applications. Genetic algorithms are very powerful optimization tools, but these algorithms require a great deal of fine-tuning to work properly and efficiently. An important result set forth below is the identification of a cost function that will govern the optimization of the swarm while allowing each member of the swarm to complete their specific assigned mission without endangering the swarm as a whole.

Referring to FIG. 1A, a schematic for a swarm control system is provided. Swarm control system 10 includes a target space platform 12 (i.e., sometimes referred to a client) and a satellite swarm of chaser spacecraft $14^i$ (i.e., sometimes referred to as a servicer vehicle or spacecraft) where i is an integer label for each chaser spacecraft. In a refinement the target space platform is a target spacecraft. The present embodiment is not limited by the number of chaser spacecraft with can be a number imax of chaser spacecraft from 2 to 50 or more (i.e., the label i can be 1 to 50). Characteristically, swarm control system 10 is configured to control the trajectories of satellites in the satellite swarm. In this context, satellite swarms are groups of spacecraft that operate cooperatively to perform a common task or goal in orbit. Examples of this are an in-space assembly of structures, manufacturing, cooperative sensing platforms, on-orbit servicing, asteroid mining, etc. Swarms would be operating in relative-motion orbits, working around a common point in space, within a few kilometers of each other. Such swarms would share information between each member of the swarm, allowing them to have a shared situational awareness of the entire mission. Each chaser spacecraft is controlled to follow a corresponding computed trajectory. It should also be appreciated that not all members of the swarm may have the same functionality, i.e. some may be communication nodes, others may have robotic arms 16, and yet others may have scanning cameras and/or LIDARs 18. In a refinement, chaser spacecraft $14^i$ can have propulsion system 20 that provides propulsive capabilities to allow them to maneuver in relative orbits around each other and/or a common target (e.g., target space platform 12). In a refinement, one or more of the payload chaser spacecraft $14^i$ can include a payload 22 such as raw materials or prefabricated parts.

In a variation, swarm control system 10 also includes at least one computing device 28 that executes the swarm control algorithm. Characteristically, the swarm control algorithm includes a nested genetic algorithm. In a refinement, the nested genetic algorithm includes multiple guidance genetic algorithms and an outer genetic algorithm. Characteristically, each chaser spacecraft $14^i$ has an associated guidance genetic algorithm that determines a computed trajectory (e.g., an orbit) for the chaser spacecraft associated therewith. In this regard, each guidance genetic algorithm optimizes an associated trajectory fitness function. The outer genetic algorithm checks for collisions and is configured to alter one or more computed trajectories to avoid collisions. In a refinement, the outer genetic algorithm is configured to isolate spacecraft that are involved in a collision and determine how to mitigate the collision most efficiently. In a further refinement, the outer genetic algorithm is further configured to add one or more chaser spacecraft. For example, the outer genetic algorithm can add chaser spacecraft by optimizing an insert fitness function that uses existing trajectories as an input as set forth below in more detail. In a further refinement, the outer genetic algorithm is also configured to mediate collision avoidance with a spacecraft that has unexpectedly gone offline either entirely or from a communications standpoint, by marking a restricted zone around the nonfunctioning spacecraft so that the solver does not generate trajectories that cross into that zone. This action can protect the swarm until communications with the nonfunctioning spacecraft are restored, or the vehicle can be safely nudged out of the swarm. In a variation, the computed trajectories can be determined in real-time for example by applying parallel computing techniques.

In a refinement, each chaser spacecraft includes a computing device $28^i$ that executes the guidance genetic algorithm for that chaser spacecraft $14^i$. FIG. 1A depict computing device $28^3$ within chaser spacecraft $14^3$. In a refinement, swarm control system can further include a control station 30 that includes the at least one computing device 28. In another refinement, one of the chaser space craft can include a computing device that generates control inputs for the rest of the chaser spacecraft.

In a refinement, the swarm control system is configured to utilize parallel computing schemes to speed up the computation, allowing for control of swarms greater than 20 spacecraft.

In a refinement, the swarm control system is configured to solve trajectories and maintain swarm efficiency and safety for geostationary satellites co-habiting the same slot.

In a refinement, the swarm control system is configured to solve trajectories and maintain swarm efficiency and safety during missions involving swarms that change in number or swarms with spacecraft that change in size or need to change their orbits dynamically (i.e. in space construction).

A set of orbits are created for the swarm to perform its operations by taking into account the individual tasks of the various members of the swarm while keeping collision avoidance in mind. It should be appreciated that these orbits need to be maintained over time. Unlike a single spacecraft operating alone, a spacecraft swarm cannot rely on inertial navigation methods or large navigational systems such as GPS, as these methods cannot provide the high-fidelity data required to determine the relative position of the members of the swarm with respect to each other. Instead, a system of onboard relative positions sensors 24, along with data from RF communications between the spacecraft can be used. Upon receiving this wealth of data from onboard sensors, each of varying resolution and quality, this data can be parsed in real-time by the on-board system on each spacecraft in the swarm, and then fed into a sensor fusion Kalman filter, also aboard the spacecraft, to maintain the relative motion orbit of the swarm in the face of external orbital perturbations. Examples of onboard sensors 24 include, but are not limited to, relative motion position sensors to determine a range to nearby spacecraft and relative motion speed sensors to determine the speed of nearby spacecraft.

In a refinement, the swarm control system is configured to utilize guidance genetic algorithms paired with data from onboard sensors on each individual chaser spacecraft. Examples of onboard sensors include but are not limited to, relative motion position sensors to determine a range to nearby spacecraft and/or relative motion speed sensors to determine the speed of nearby spacecraft. This data can be parsed in real-time by the onboard system on each spacecraft in the swarm of chaser spacecraft and then fed into a sensor fusion Kalman filter on each individual spacecraft to allow the outer genetic algorithm to maintain the relative motion orbit of the swarm when gravitational perturbations are present. In a further refinement, the combination of the sensor fusion Kalman filter and the guidance genetic algorithms is configured to predict the relative positions of the spacecraft for real-time collision detection and avoidance. This combination results, for example, in a set of trajectories for each spacecraft that enable it to achieve its mission goals within its ΔV budget, while also leveraging the combined sensor data of the entire swarm to accurately determine the relative positions between each spacecraft to a higher precision than GPS data alone.

Figure 1B:
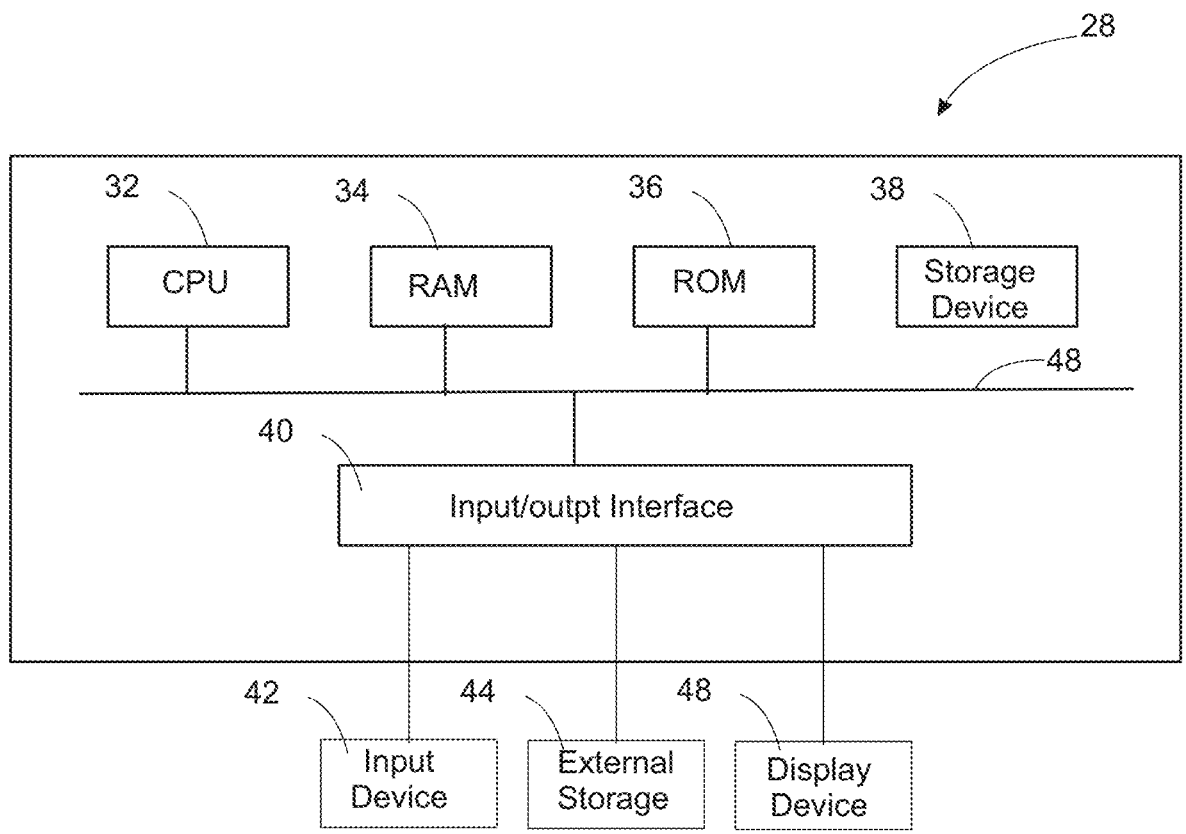
FIG. 1B.

The swarm control methods implemented by the swarm control system set forth herein can be implemented by a computer program executing on a computing device 28. FIG. 1B provides a block diagram of a computing system that can be used to implement the methods. Computing device 28 includes a processing unit 32 that executes the computer-readable instructions for the computer-implemented steps for swarm control methods. Processing unit 32 can include one or more central processing units (CPU) or microprocessing units (MPU). Computer device 28 also includes RAM 34 or ROM 36 that can have instructions encoded thereon for swarm control methods. In some variations, computing device 28 is configured to display a user interface on display device 28.

Still referring to FIG. 1B, computer device 28 can also include a secondary storage device 38, such as a hard drive. Input/output interface 40 allows interaction of computing device 28 with an input device 42 such as a keyboard and mouse, external storage 44 (e.g., DVDs and CDROMs), and a display device 28 (e.g., a monitor). Processing unit 32, the RAM 34, the ROM 36, the secondary storage device 38, and input/output interface 60 are in electrical communication with (e.g., connected to) bus 48. During operation, computer device 28 reads computer-executable instructions (e.g., one or more programs) recorded on a non-transitory computer-readable storage medium which can be secondary storage device 38 and or external storage 44. Processing unit 32 executes these reads computer-executable instructions for the swarm control methods. Specific examples of non-transitory computer-readable storage medium for which executable instructions for the swarm control methods are encoded onto include but are not limited to, a hard disk, RAM, ROM, an optical disk (e.g., compact disc, DVD), or Blu-ray Disc (BD)™), a flash memory device, a memory card, and the like.

Figure 2:
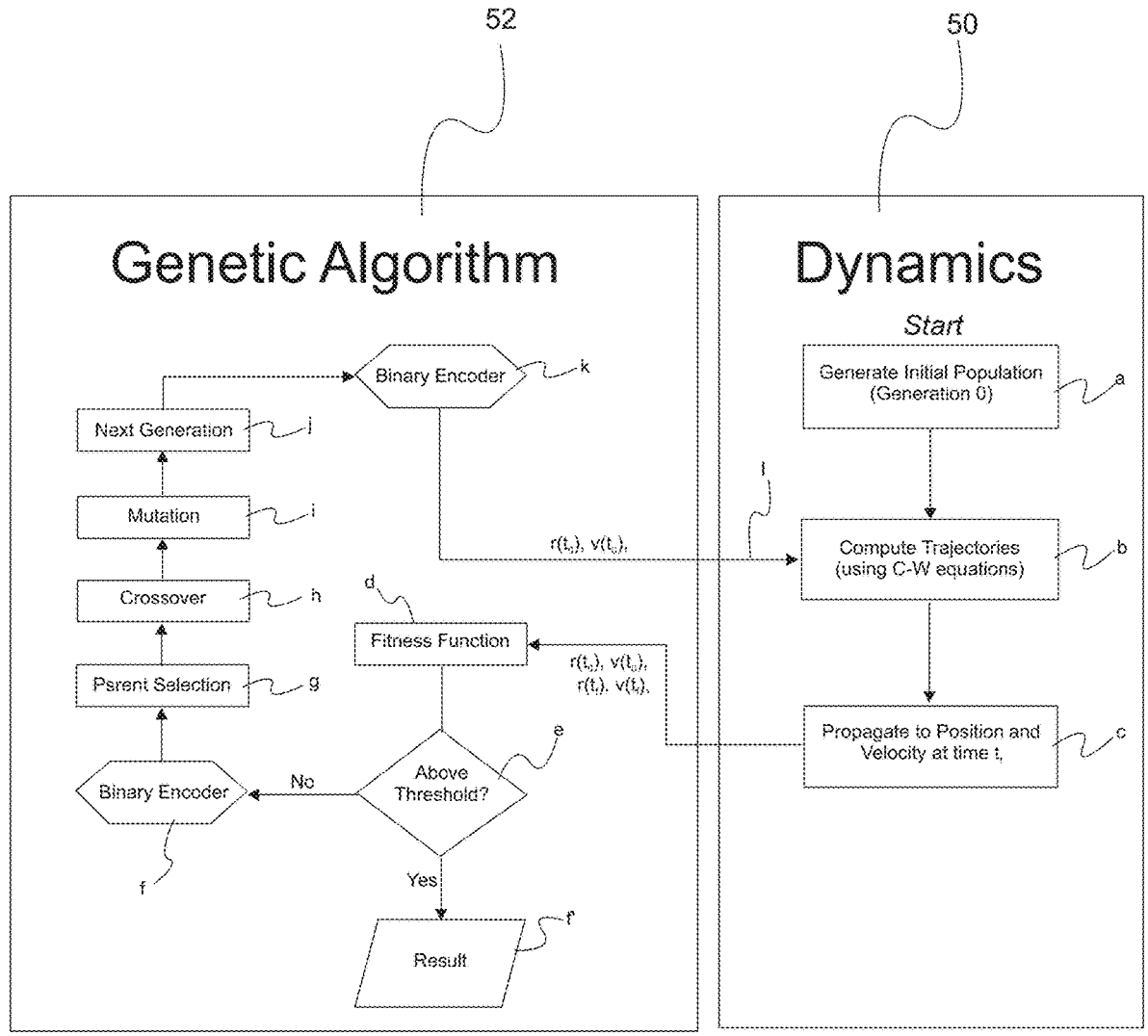
FIG. 2. GA Example Flowchart.
Figure 6:
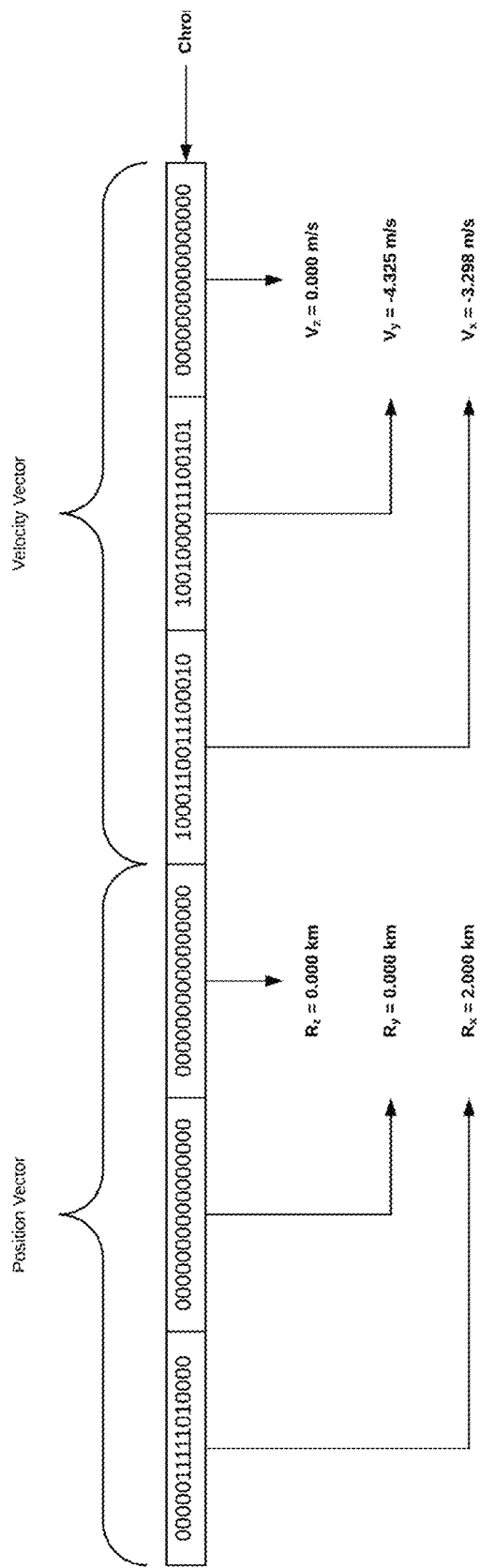
FIG. 6. GA Binary Representation.
Figure 7:
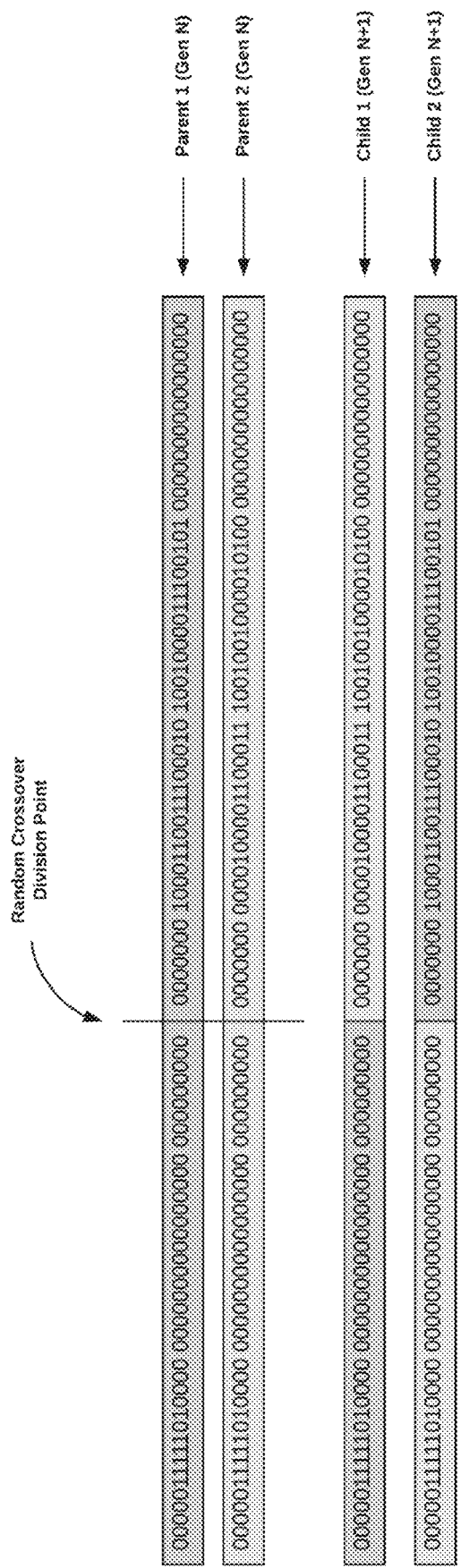
FIG. 7. GA Crossover Example.

Referring to FIG. 2, each guidance genetic algorithm can be executed by a computing device 28. The swarm control algorithm includes a dynamics component 50 and a genetic control component 52. The swarm control algorithm includes steps of:
a) generating an initial population as an input set of position $r(t_0)$ and velocity $v(t_0)$ pairs where $t_0$ is the start time;
b) compute trajectories from the input set of position $r(t_0)$ and velocity $v(t_0)$ pairs;
c) propagate each chaser spacecraft to a final time $t_f$;
d) calculate a trajectory fitness function using an initial position $r(t_0)$, an initial velocity $v(t_0)$, a final position $r(t_f)$, a final velocity $v(t_f)$;
e) if the trajectory fitness function is calculated to be above a predetermined threshold identify the result as a potential trajectory;
f) encode set of position $r(t_0)$ and velocity $v(t_0)$ pairs into pairs of position binary numbers and velocity binary number;
g) select a predetermined number of the pairs of position binary numbers and velocity binary number having best values for the trajectory fitness function as parents for a next generation;
h) apply crossover to the parents;
i) apply mutations to the parents;
j) identify results from the crossover and mutation as inputs for a next iteration;
k) binary decoder results from the crossover and mutation to form a new set of position $r(t_0)$ and velocity $v(t_0)$ pairs for the next iteration; and
l) provide the new set of position $r(t_0)$ and velocity $v(t_0)$ pairs as the input set of position $r(t_0)$ and velocity $v(t_0)$ pairs in step b). In a variation, steps b) to l) are iteratively repeated until the trajectory fitness function achieves a predetermined value or until a predetermined number of iterations are executed to provide the final results depicted in box f. Characteristically, steps a), b), and c) are part of the dynamic component while steps d) to k) are part of the genetic algorithm component. It should be appreciated that the encoding of the set of position $r(t_0)$ and velocity $v(t_0)$ pairs into pairs of position binary numbers and velocity binary number is the analog of a chromosome depicted in FIG. 6. Similarly, the application of crossover to the parents in step h is the analog of the biological crossover (see FIG. 7) while the applications of random mutations to the parents in step i) is the analog of biological mutations of chromosomes.

In a variation, the primary method of collision avoidance is implemented directly in the genetic algorithm trajectory generation method itself. Trajectories are generated such that, over a specified time period (e.g., at least 24 hrs), there is no risk of collision between any chaser spacecraft $14^i$ in the swarm. During the trajectory generation process, if there is a collision predicted, then the genetic algorithm isolates the chaser spacecraft $14^i$ that are involved in the collision and determine how to mitigate it most efficiently, as well as which spacecraft has the least restrictions on it to modify its trajectory. The simplest solution is not to change the trajectory, but instead adjust the insertion time of a satellite into its trajectory so as to adjust its phase, thereby avoiding a collision. If this is not possible, or if this results in further collisions, then the solver will try slight variations of the trajectories until one is found that does not result in any conjunction.

In a refinement, a secondary method of collision avoidance is an active system that uses Kalman filtering to determine the estimated relative position of all chaser spacecraft $14^i$ in the swarm, and perform corrective maneuvers if any begin to drift. In order to maintain safe trajectories that avoid collisions between chaser spacecraft $14^i$ in the swarm, a Sensor Fusion Kalman Filter (SFKF) is used to accurately determine, in real-time, the position and velocity of each spacecraft. This is done using only the information available to the swarm members themselves, through external sensors 24 without additional information from operators on the ground. Using the filtered data, a set of covariance matrices are obtained for each predicted position and velocity, setting the upper limits of the error bars on the measured and processed data.

Figure 12:
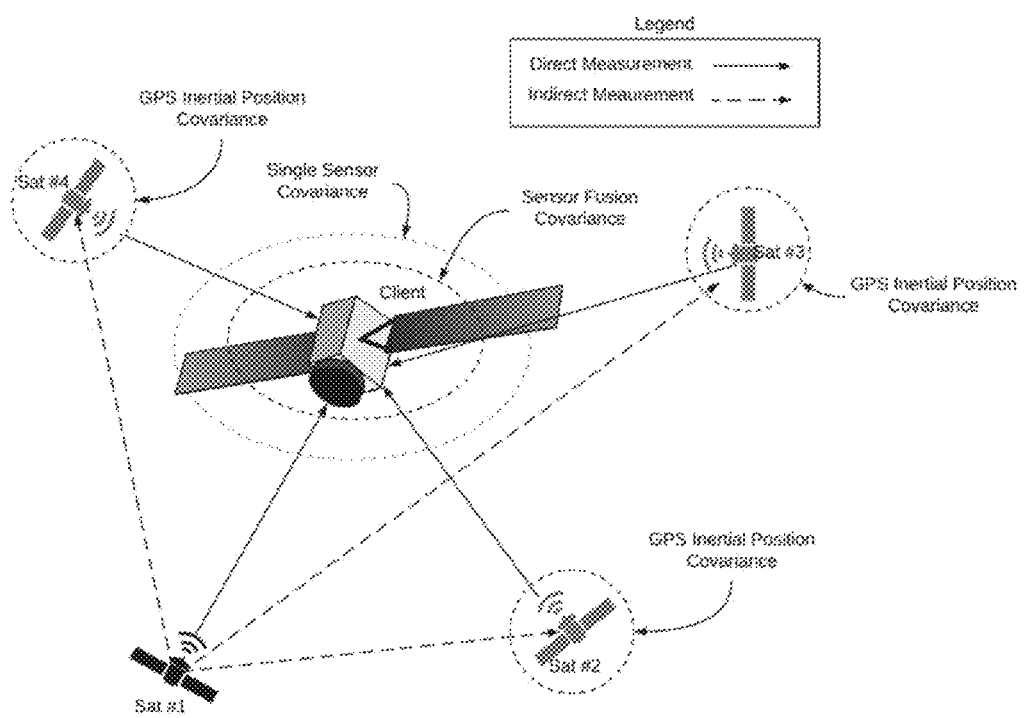
FIG. 12. Sensor fusion diagram.

A sensor fusion Kalman filter is an extension of an unscented Kalman filter to incorporate the data from multiple sensors. This is implemented using multiple measurement update cycles to incorporate the shared data of the swarm, further refining the covariance ellipsoid for each spacecraft. FIG. 12 shows an example of the sensor fusion process, where the covariance of the position between Sat #1 and the Client spacecraft can be improved by fusing the data from all the swarm spacecraft, even taking into account the GPS position errors defining the locations of each swarm spacecraft with respect to Sat #1.

Using Kalman filtering, trajectories can also be assigned a specific corridor, where if the spacecraft drifts too far from the designated trajectory (as determined by fusing sensor data and filtering it through the sensor fusion Kalman filter), a small corrective maneuver is performed to re-align the spacecraft to its designated trajectory.

Figure 3A:
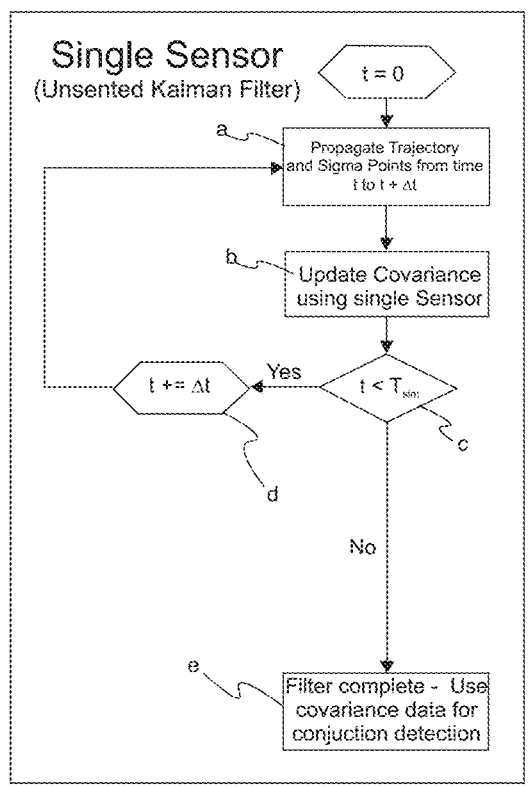
FIGS. 3A and 3B. Sensor fusion Kalman filter process.
Figure 3B:
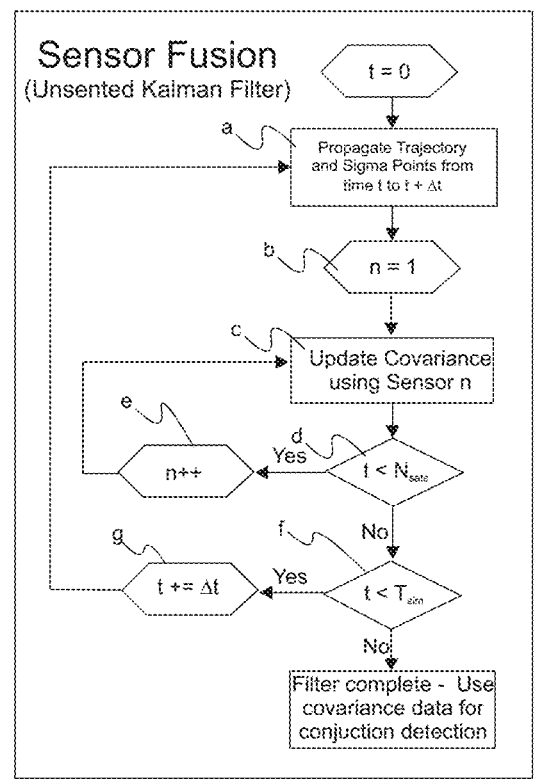

Referring to FIGS. 3A and 3B, flowcharts for the single sensor and sensor fusion Kalman filter processes. Therefore, in a variation computing device 28 is configured to execute these processes. For the single sensor process as depicted in FIG. 3A, trajectory and sigma points are propagated from time t to t+Δt in step a). In step b), the covariance is updated using the single sensor data. As depicted by step c), a determination is made if the time t is less than a predetermined simulation time. If the time is less, the time is updated by a predetermined time interval Dt. If not, a determination is made that the filter is complete, and the covariance data is used for conjunction detection. FIG. 3A provides a flowchart for the sensor fusion process. In this method, trajectory and sigma points are propagated from time t to t+Δt in step a).

Figure 4:
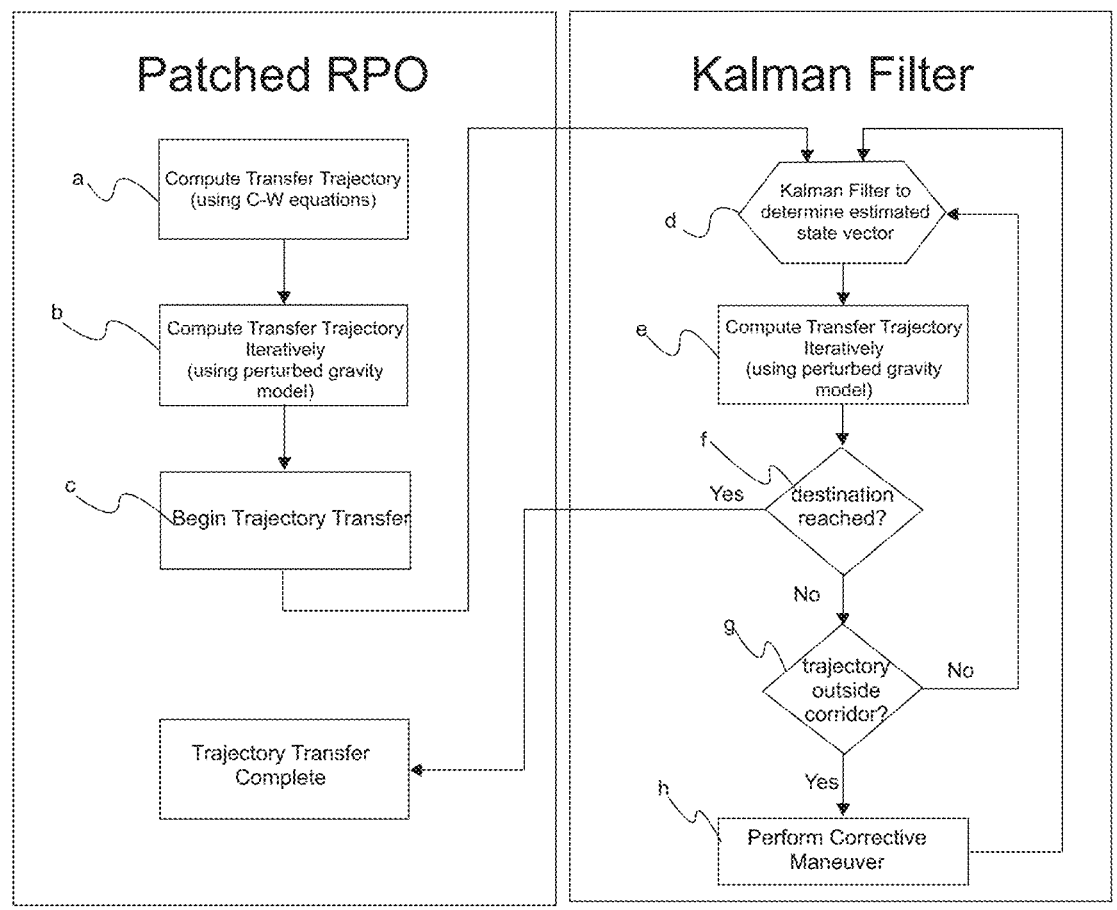
FIG. 4. Patched RPO process.

Referring to FIG. 4, a flowchart depicting a method for patched rendezvous and proximity operations is provided. Therefore, in a variation computing device 28 is configured to execute these operations. This method takes two defined states, separated by a defined period of time, to determine the most efficient set of impulsive maneuvers to be able to safely transition between these states. This is done using two, three, or four impulsive maneuvers, depending on what method yields the lowest Δv consumption (i.e., velocity change) while maintaining safe operations with nearby spacecraft.

Still referring to FIG. 4, a transfer trajectory is computed using the Clohessy-Wiltshire equations (see, Appendix A) in step a). Each impulsive maneuver begins a new trajectory segment. To compute the shape of the transfer trajectory and the initial velocity vector required to place the spacecraft on that trajectory, a two-stage solver is used, using the solution of the linearized C-W equation to seed the nonlinear solver for the perturbed gravitational field solution.

$$\vec{v} = \Phi_{rv}^{-1}(\vec{r}_f - \Phi_{rr}\vec{r}_0) \quad (4.14)$$

$$\vec{v}_f = \Phi_{vr}\vec{r}_0 = \Phi_{vv}\vec{v}_0 \quad (4.15)$$

Equations 4.14 and 4.15 describe the process used to solve for the initial and final velocities on a transfer arc, when the initial and final positions are known, as well as the transfer time. $\Phi_{rr}$, $\Phi_{rr}$, $\Phi_{rv}$, $\Phi_{vr}$, and $\Phi_{vv}$ come from the definition of the C-W equations [71]. When solving with the C-W equations, the value for $v_0$ is close to the desired solution; however, it is a linearized approximation of the unperturbed solution. In step b), the transfer trajectory is computed iteratively using the perturbed gravity model. In this regard, the perturbed solution can be solved iteratively, numerically solving the second-order ODE in Equation 4.16.

$$\frac{d^2\vec{r}}{dt^2} = -\mu \frac{\vec{r}}{\|\vec{r}\|^3} + \vec{a}_{grav-pert} + \vec{a}_{sun-moon} + \vec{a}_{SRP} \quad (4.16)$$

where $\vec{a}_{grav-pert}$ accounts for the perturbations in Earth's asymmetrical gravitational field, $\vec{a}_{sun-moon}$ accounts for the Sun and Moon gravitational perturbations, and $\vec{r}_{SRP}$ accounts for the solar radiation pressure. This system of second-order ODEs is then solved iteratively to find the initial velocity $\vec{v}_{0pert}$ such that the final position, $\vec{r}_f$, is the desired trajectory endpoint.

This is initially done prior to the start of the maneuver in order to plan out the trajectory being traveled and prepare the spacecraft for the burn. Once the initial Δv is applied, the spacecraft has been injected onto the transfer trajectory.

Still referring to FIG. 4, the transfer trajectory of the chaser spacecraft is begun in step c). In step d), a Kalman filter receives the data for the computed transfer trajectory and is used to compute the estimated true position of the spacecraft in real-time, using its onboard sensors. In step e), this estimated true position is then used to constantly recompute the target point at the end of the transfer arc (e.g., at a rate of once per second).

In step f), a determination is made if the destination is reached. If the destination is reached, the transfer is complete. If the destination is not reached, a determination is made is step g) if the trajectory is determined to deviate from a safety corridor by more than a predetermined amount (e.g., 5 m). If the chaser spacecraft's trajectory deviates from the safety corridor by more than the predetermined amount, a small impulsive maneuver is performed to align to an updated trajectory in step h). Moreover, Equation 4.16 is solved again iteratively by re-executing step d) while maintaining the original target point as the destination. Advantageously, these steps are performed continuously in real-time during all swarm operations to maintain trajectories within their corridors.

The following examples illustrate the various embodiments of the present invention. Those skilled in the art will recognize many variations that are within the spirit of the present invention and scope of the claims.

1. Genetic Computation of Trajectories
1.1 Relative Motion

The equations of motion that are used to model the gravitational forces throughout the optimization process are initially the Clohessy-Wiltshire (C-W) equations. These are linearized solutions of the relative orbital motion problem, in which two spacecraft are both orbiting the same central body in similar orbits. The solution space for this problem is in the LVLH (Local-Vertical-Local-Horizontal) reference frame, centered on the target spacecraft, making it a rotating reference frame and thus a non-inertial space, which is why linearized solutions are much easier to solve. After creating a working algorithm and cost function for the linearized solution, a nonlinear solution of the relative motion problem will be applied to the genetic algorithm to test for variations between the nonlinear model and the linearized model [12].

For the purposes of this analysis, the definition of a swarm is: a group of two or more spacecraft cooperating towards a common task or goal [12]. The analysis is performed in the relative motion non-inertial coordinate system defined by the C-W equations [13].

Figure 5:
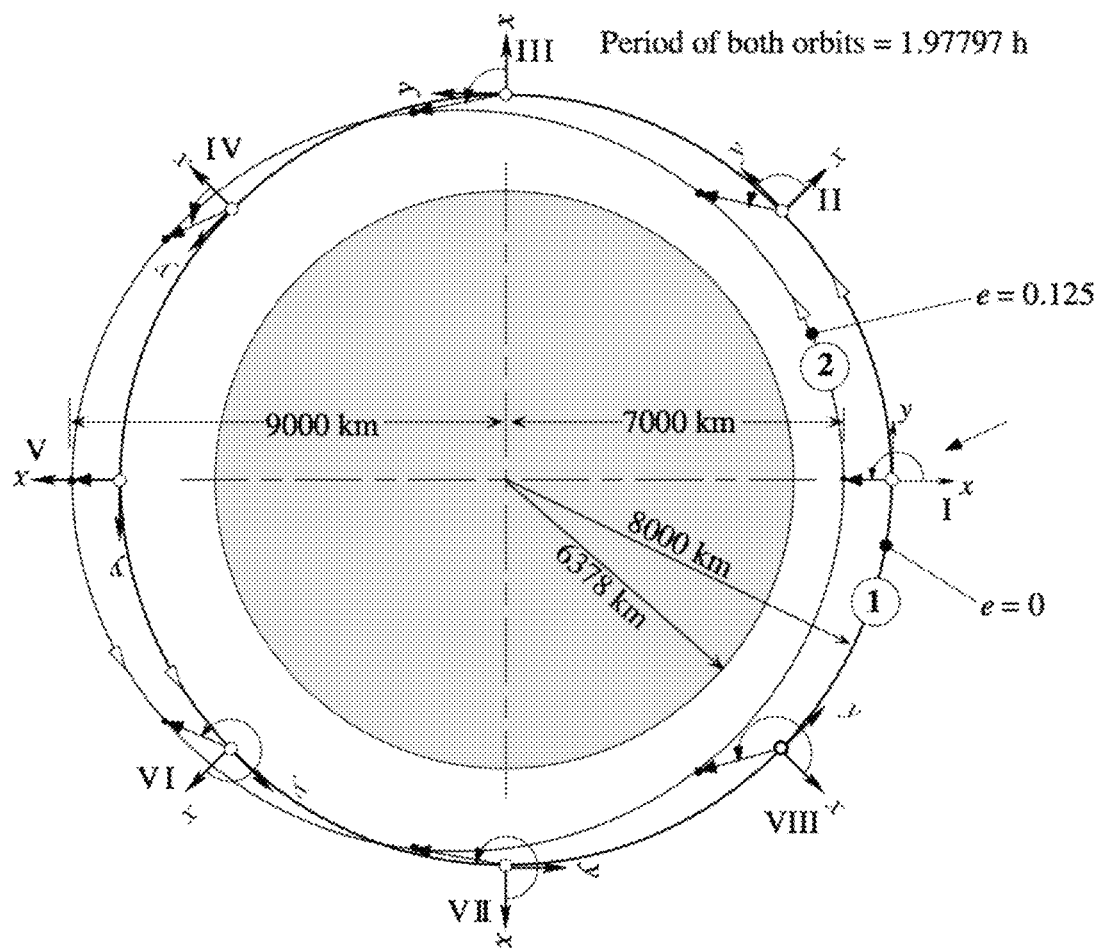
FIG. 5. Slightly eccentric orbit allows relative motion.
Figure 5:
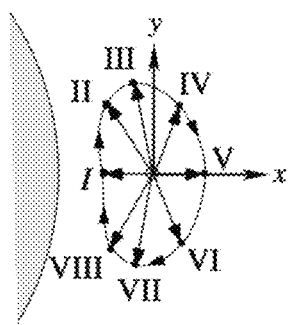

As seen in FIG. 5, the spacecraft depicted (1 and 2) are in slightly different orbits from each other (upper subfigure), such that in the relative motion space (lower subfigure) spacecraft 2 appears to be "orbiting" around spacecraft 1. The mechanics of the free-trajectory motion following these relative motion orbital tracks are well known and understood, having been used for more than fifty years, prior to the Apollo missions [14].

1.2 Genetic Algorithms

Genetic Algorithms (GAs) are a method of optimization, applicable to a wide variety of problems, that use a process similar to Darwinian evolution to evolve a set of random (or pseudorandom) initial conditions to find an acceptable solution or even a globally optimal solution, to a problem [15]. These initial conditions form the initial population of size $N_{pop}$. This initial population is then propagated, in this case using the C-W equations, to the final state at time $t_f$. FIG. 2 shows a depiction of the GA process, explained in detail in the following section.

Once the initial population is created and propagated, the solutions are ranked based on how close they come to the desired solution, using a fitness function. For simplicity, we created our fitness function such that it ranges from 0 to 1, where a value of 0 has no attributes of the desired solution, and a value of 1 is the desired solution. For the initial problem of finding closed and repeating trajectories in the LVLH frame, this was defined as:

$$F = (1 + C_r \|\vec{r}(t_f) - \vec{r}(t_0)\| + C_v \|\vec{v}(t_f) - \vec{v}(t_0)\|)^{-1}$$

where:
$C_r$: coefficient of position
$C_v$: coefficient of velocity

Given a start time to and end time $t_f$, Eq. (1.1) defines a fitness function that prefers solutions that are closed trajectories. The closer the final conditions, $\vec{r}(t_f)$ and $\vec{v}(t_f)$ are to the initial conditions, $\vec{r}(t_0)$ and $\vec{v}(t_0)$, the higher the fitness function's value will be, since an desired solution is one where the final conditions and initial conditions are the same. Once the population members are ranked based on their fitness, the bottom half is culled as they are not desirable solutions. However, we need to rebuild the population back to size $N_{pop}$ for the next generation ($N_{pop}$=200 in our case), so this is where genetic crossover is implemented (see FIG. 7). To perform crossover, each member of the population (chromosome) should be represented in binary notation in order to represent the data with the greatest number of genes (string elements), since binary is lowest-order possible data-encoding scheme, with a radix of 2. In the case of swarm trajectories, where our population is composed of 3 position and 3 velocity variables, each of these are represented in binary as 16 bit floats and appended to form a 96 bit string, called a chromosome, seen in FIG. 6.

Figure 8:
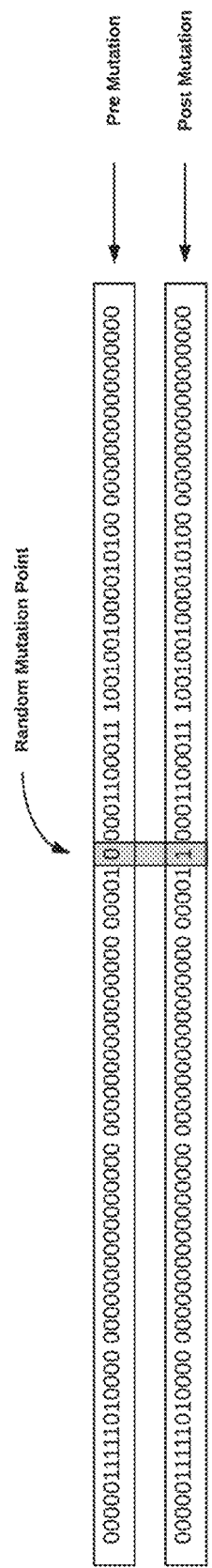
FIG. 8. GA Mutation Example.

After crossover is completed, the final step of the GA sequence is to perform a mutation on the chromosomes. The crossover process spreads genetic diversity throughout the population, but does not introduce any new possibilities to the population. This is where mutation comes in; mutation allows new structures or solutions to appear by randomly flipping bits throughout all the chromosome. A variable, $p_{mut}$, is used to control this probability, and thus a small subset of all bits in all chromosomes are flipped, introducing new and random solution possibilities (see FIG. 8). Good mutations will survive to the next generation and undesirable mutations will not, by means of the fitness function. Although mutation is an important part of the GA process, it must be used sparingly to avoid conflicting with the crossover process. In this case, we use a probability of mutation of 0.2% ($p_{mut}$=0:002).

Once the mutation is completed, the binary data is then decoded back into their separate variables, and the process begins again for the next generation. This process continues until a fitness value of one is achieved for a member of the generation, or the maximum number of generations has been reached ($N_{gen}$=100). In practice, however, a threshold must be specified, since it is impossible to converge to an exact solution [16]. For an accurate solution, a threshold of 0.001 is used; however, in practice it is more computationally efficient to use a threshold of 0.01 to get near the solution and use another targeted optimization technique to further refine the solution. This is due to the fact that the Genetic Algorithm (GA) method is designed to search across the entire solution space and find a solution among many possible solution spaces, and thus is very good at identifying the location of an optimal solution, but lacks efficiency in arriving at the exact solution itself [15].

1.3 Solving for Spacecraft Swarms 1.3.A. Initial Trajectory Generation

In order to solve for a set of trajectories for a swarm of spacecraft, multiple genetic algorithms are used, one for each spacecraft, all nested within a larger GA to de-conflict for collisions.

Each spacecraft is assigned its own fitness function, and this is defined by the mission requirements for a spacecraft. For example, a spacecraft that has a requirement to be within $d_{max}$ but no closer than $d_{min}$ from a Client spacecraft or platform will have a fitness function as defined in Eq. (1.2). Note that for the three coefficients, each can be modified to focus on which parameters are desired to be solved to a higher accuracy. By default they are all set to 1, but if velocity knowledge is valued at higher precision over position knowledge (for example), then $C_v$ can be set lower (e.g., $C_r$=1 and $C_v$=0.5 will result in a twofold increase in precision for velocity)

$$F = \left(1 + C_r \|\vec{r}(t_f) - \vec{r}(t_0)\| + C_v \|\vec{v}(t_f) - \vec{v}(t_0)\| + C_d \delta_{dist}\right)^{-1} \quad (1.2)$$

where $$\delta_{dist} = \begin{cases} d_{min} - r_{min} & \text{if } r_{min} < d_{min} \\ r_{max} - d_{max} & \text{if } r_{max} > d_{max} \\ 0 & \text{otherwise} \end{cases}$$

$C_r$: coefficient of position
$C_v$: coefficient of velocity
$C_d$: coefficient of distance
$r_{min}$: closest range to Client spacecraft [km]
$r_{max}$: farthest range to Client spacecraft [km]
$d_{min}$: closest permissible distance to Client spacecraft [km]
$d_{max}$: farthest permissible distance to Client spacecraft [km]

These separate fitness functions allow the optimizer to solve for each spacecraft using its own GA, which can be run in parallel to save on computation time. Once a trajectory is generated for each spacecraft (identified by its initial position and velocity vectors), the outer GA checks for collisions. This is done by propagating each of the trajectories over the course of an orbit, sampling at a fixed timestep (e.g. 60 s). These position vs. time values are compared for all the spacecraft to determine if there is a chance of collision. For simplicity, a collision is determined to be possible if the two spacecraft are predicted to be within 1 km.

If there is a collision predicted, then the outer GA will isolate the two spacecraft that are involved in the collision and determine how to most efficiently mitigate it, as well as which spacecraft has the least restrictions on it to modify its trajectory. The simplest solution is not to change the trajectory at all, but instead adjust the insertion time of one into its trajectory so as to adjust its phase, thereby avoiding a collision. If this is not possible, or if this results in further collisions, then the solver will try slight variations of the trajectories until one is found that does not result in any conjunction.

Figure 10:
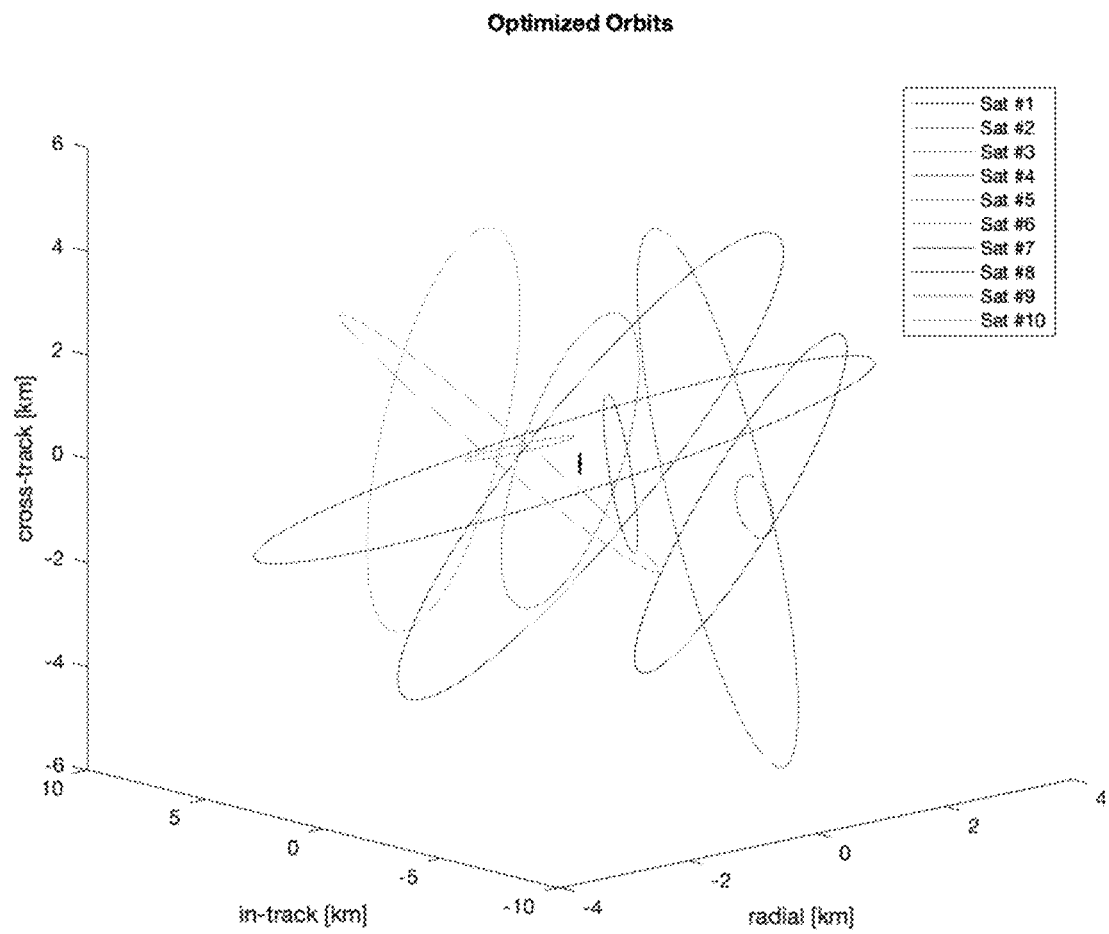
FIG. 10. Swarm Solution for 10 Spacecraft.

Running this for a set of 10 spacecraft, with a requirement to be between 0.5 km and 10 km of the Client, and to avoid conjunctions within a 1 km buffer corridor of each spacecraft, FIG. 10 shows a set of closed and repeating relative motion trajectories that satisfy this criteria It should be noted, however, that this is not a unique solution. There is a family of an infinite number of solutions that satisfy this specific criteria set of Client distance and number of chaser satellites, we are only interested in one of infinite possible sets that satisfies our constraints.

To find solutions that satisfy the constraints, the requirements and constraints of the swarm, and of each individual spacecraft within the swarm are first defined. These requirements and constraints are then enforced by the GA solver's fitness function. The GA solver is then able to generate a set of trajectories satisfying all of the requirements and constraints. These trajectories represent a set of initial state vectors for each spacecraft so that the swarm can be formed with no risk of collision.

The GAs for each individual spacecraft generate the trajectories, while the outer GA monitors for collisions by propagating each trajectory forward in time. The outer GA can take delta-v cost into account so as not to deplete a spacecraft of its fuel reserves. A new set of GA solvers can be used to modify an existing set of trajectories to enable the addition of new spacecraft or for new tasks to be completed, always minimizing delta-v.

1.3.B. Trajectory Modification for New Spacecraft Insertion

Now that a set of trajectories are generated for the swarm, the next problem to tackle is the dynamic nature of the swarm: what to do when the number of spacecraft or their requirements changes?

The problem of adding or removing a spacecraft from a set of swarm trajectories that have already been generated is fundamentally different from the problem above, since we cannot simply regenerate the trajectories for all spacecraft, we already have a set of spacecraft in their respective trajectories and want to modify this as little as possible. When adding a spacecraft to the swarm, its understood that some or all of the other spacecraft in the swarm may have to modify their trajectories, thereby using some of their fuel reserves, to enable a set of safe, mission-specific trajectories for the new swarm. However, it is desirable to do this in such a way that the delta-v used by the swarm as a whole is minimized, as well as the delta-v used by individual members of the swarm so as not to excessively deplete the reserves of a single spacecraft.

Figure 9:
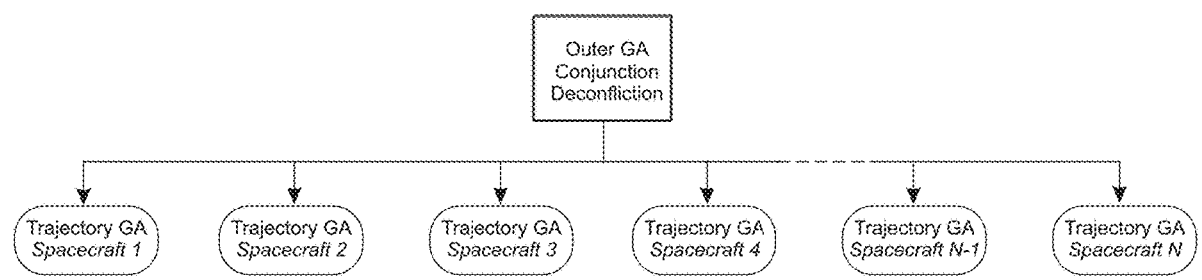
FIG. 9. Hierarchy of Genetic Solvers.

This is performed once again by using genetic algorithms, using the same nested GA scheme (see FIG. 9), but with a modification to the outer de-confliction GA to take into account the delta-v cost to attain a given trajectory from an existing one, and a modification to the spacecraft-level GA fitness function that uses the existing trajectory at the starting point for a solution rather than a random seed (see Eq. (1.3)).

$$F_{insert} = (1 + C_r \|\vec{r}(t_f) - \vec{r}(t_0)\| + C_v \|\vec{v}(t_f) - \vec{v}(t_0)\| + C_d \delta_{dist} + \Delta v)^{-1} \quad (1.3)$$

Figure 11:
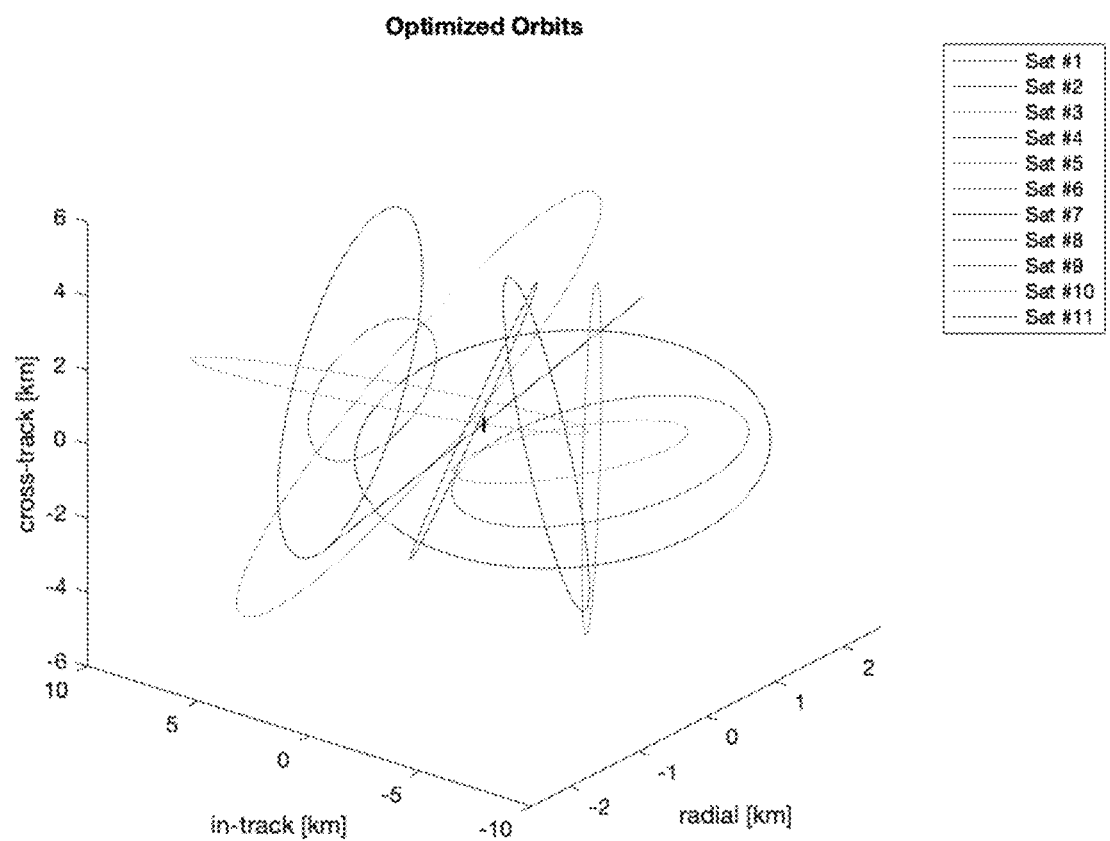
FIG. 11. Modified swarm solution for the addition of an 11th spacecraft.

An example of this can be seen in FIG. 11, which depicts a modification of the solution shown in FIG. 10 with an $11^{th}$ spacecraft added into the swarm. The trajectories of the original 10 spacecraft have been modified slightly to allow for the addition of the 11th, conserving delta-v.

1.3.C. Considerations for Construction and Aggregation

When applying this methodology to in-space construction or aggregation of swarm members, consideration needs to be taken not only for the addition and removal of members from the swarm, but also for the dynamically changing dimensions, mass, and moment of inertia of the Client being constructed. As the structure grows, so will the keep-out zone specified for all spacecraft, especially if it is spinning or nutating.

Conclusion

As the use of on-orbit servicing grows in Earth orbit, so will the use of satellite swarms to perform more complex maneuvers. The methodology outlined above, using genetic algorithms to narrow down a set of acceptable, efficient, and stable trajectories for spacecraft comprising a swarm, is one of many possible methods, but is adaptable to various scales and mission restrictions. Great strides have been made to design spacecraft that can perform on-orbit assembly, and to develop structures that can be assembled in space. It is now time to do the same for the methodology of how to perform these cooperative actions in a non-intuitive micro-gravity environment in as safe and autonomous a manner as possible.

2. The Use of Genetic Algorithms for Novel Geostationary Satellite Co-Location Trajectories

2.1. Nomenclature

CLIENT=Satellite or Platform to be Serviced
C-W=Clohessy-Wiltshire
ΔV=Delta-V: Magnitude of change in orbital velocity
DLR=Deutsches Zentrum für Luft- and Raumfahrt (German Aerospace Center)
ECI=Earth-Centered Inertial
ECEF=Earth-Centered Earth-Fixed
EP=Electric Propulsion
GEO=Geostationary Orbit

2.2. Introduction

The demand for high bandwidth communications is continuing to increase globally at a rapid pace [18]. The need to provide not just voice, but now video and higher speed data transfer through Geostationary (GEO) satellites has increased, and is being challenged by new low earth orbit constellations that are coming online (Starlink, OneWeb, TeleSat, Amazon [19-22]). The inability for GEO operators to compete in this new marketplace where lower altitude satellites do not suffer from long distance delays, and the increased density within typical GEO service areas covered on the ground, are forcing GEO operators to consider increasing the density of satellites in their GEO slots. Allocation of these spacecraft is managed by the International Telecommunication Union (ITU), which has divided the GEO belt into 0.1° slots. Each slot is approximately 74 km wide and 100 km tall, as viewed from the ground. Currently there are 534 active satellites in GEO, and numerous more retired spacecraft in the graveyard orbits above geostationary orbit [23]. While the perturbations within the GEO slots are not as great as other orbits, the value, size, and complexity of GEO satellites requires a very high degree of care to perform a daily delicate dance in a slot that has multiple GEO satellites.

It is possible, however, to use these perturbations to a satellite's advantage when coordinating the movement of many spacecraft in close proximity. Using cooperative satellite swarm trajectory generation and maintenance is useful to reduce the propellant utilization of spacecraft in GEO, and to maintain a dynamic formation flying configuration which enables each spacecraft to perform their individually required operations, while also choosing trajectories that prevent collision risks under free-flight trajectories for an extended duration. This dynamic trajectory formulation is performed using genetic algorithms to search the entire trade space for a family of solutions that satisfies all the constraint sets of the problem, and is able to find minimal delta-V solutions even with the nonlinear perturbed equations of motion [24].

2.2.1. Relative Motion Trajectories with Perturbations

Relative orbital motion takes place in the Local-Vertical Local-Horizontal (LVLH) rotating reference frame. This non-inertial reference frame is centered on a point in space, in orbit around the Earth, which could be a Client spacecraft or platform, a waypoint, or some other point of interest. The x-axis is directed along the outward radial vector from the center of the Earth to the target, the z-axis is normal to the orbital plane of the target, and the y-axis lies within the orbital plane, constrained by the x- and z-axes to form a triad.

This motion can be described by the following equations of motion, where R is the vector from the center of the Earth to the Client, and δr is the vector from the Client spacecraft to the Servicer vehicle, both in the Earth-Centered Inertial (ECI) frame:

$$\ddot{\vec{\delta r}} = -\ddot{\vec{R}} - \mu \frac{\vec{R} + \vec{\delta r}}{\|\vec{R} + \vec{\delta r}\|^3} \quad (2.1)$$

Although linearized approaches such as the Clohessy-Wiltshire (C-W) equations can be used to easily and efficiently describe relative motion trajectories [25], in order to fully define the trajectories for close proximity swarm maneuvers in geostationary orbit, direct numerical integration of the non-linear perturbed equations of motion is used to take into account the variations of Earth's gravitational field with longitude and latitude.

Planetary gravitational fields, like the Earth's, are not perfectly symmetric. The Earth is not a perfect sphere, nor is its mass evenly distributed; the resulting gravitational perturbations can be described using a spherical harmonic gravitational model [26]. This is a method of adding up progressively higher degrees of Legendre polynomial equations to represent an irregular but spherical object, similar to how a Fourier transform can represent a sinusoidal function using polynomials [27]. This gravity model is described in Eq. 2.2, in terms of the gravitational potential function, rather than as a force, as derived by Vallado [27]:

$$U = \frac{\mu}{r}\left[1 - \sum_{l=2}^{\infty} J_l\left(\frac{R_\oplus}{r}\right)^l P_l[\sin(\phi_{gc_{sat}})] + \sum_{l=2}^{\infty}\sum_{m=1}^{l}\left(\frac{R_\oplus}{r}\right)^l P_{l,m}[\sin(\phi_{gc_{sat}})]\{C_{l,m}\cos(m\lambda_{sat}) + S_{l,m}\sin(m\lambda_{sat})\}\right] \quad (2.2)$$

Where J, the zonal coefficient, is defined as:

$$J_l = C_{l,0} \quad (2.3)$$

Note also that $\Phi_{gc_{sat}}$ and $\lambda_{sat}$ are, respectively, the geocentric latitude and longitude of X the spacecraft. If only latitudinal variations of the gravitational field are being considered, then only the zonal coefficients and the first summation is required. The second, double summation is referred to as the tesseral component, and considers longitudinal variations of the gravitational field.

The $P_{l,m}[\sin(\Phi_{gc_{sat}})]$ coefficients are the Legendre Polynomials, mapped for spacecraft latitude in spherical coordinates, the first few of which are listed in Table 2.1 below:

are specific to the gravitational field in question. For Earth, this can be found in data from the GRACE mission by NASA and UT Austin, up to the $2160^{th}$ degree [28, 29]. For the purposes of this analysis, a fourth order analysis using both zonal and tesseral terms is used, to account for the significant East-West perturbations of Earth's gravitational field at high altitudes, and the effect of the planet's oblateness [30].

To recover the gravitational acceleration from the potential function, which is useful for numerical integration of the equations of motion, the gradient of the potential is taken:

$$\vec{a} = \frac{\partial U}{\partial r}\left(\frac{\partial r}{\partial \vec{r}}\right)^T + \frac{\partial U}{\partial \phi_{gc_{sat}}}\left(\frac{\partial \phi_{gc_{sat}}}{\partial \vec{r}}\right)^T + \frac{\partial U}{\partial \lambda_{sat}}\left(\frac{\partial \lambda_{sat}}{\partial \vec{r}}\right)^T \quad (2.4)$$

Where r is the magnitude of the position vector, and r is the position vector in Cartesian coordinates. These acceleration vectors are then numerically integrated over time for all the spacecraft, as well as the reference point in GEO in the ECI coordinate frame, to find the trajectory of each spacecraft over time. The reference trajectory is then subtracted from each to find the resultant relative motion trajectories, in the rotating reference frame co-located at the reference point.

Additionally, though the perturbations from the non-spherical nature of Earth's gravitational field are the most significant perturbations in LEO, in GEO they are joined by additional perturbations from the Sun and the Moon. These are the Sun-Moon gravitational perturbations, and the Solar Radiation Pressure perturbations, which are described in Eq. 2.5 & Eq. 2.6, respectively [31].

$$\vec{a}_{sun-moon} = -GM_\odot \frac{\vec{r}_{sun-earth} + \vec{r}}{\|\vec{r}_{sun-earth} + \vec{r}\|^3} - GM_\mathbb{D} \frac{\vec{r}_{moon-earth} + \vec{r}}{\|\vec{r}_{moon-earth} + \vec{r}\|^3} \quad (2.5)$$

TABLE 2.1

Associated Legendre Polynomials. This table gives a few sample expansions for the associated Legendre function, with geocentric latitude used [27]

| | | | |
|---|---|---|---|
| $P_{0,0}$ | 1 | $P_{3,2}$ | $15\text{COS}^2(\phi_{gc_{sat}})\text{ SIN}(\phi_{gc_{sat}})$ |
| $P_{1,0}$ | $\text{SIN}(\phi_{gc_{sat}})$ | $P_{3,3}$ | $15\text{COS}^3(\phi_{gc_{sat}})$ |
| $P_{1,1}$ | $\text{COS}(\phi_{gc_{sat}})$ | $P_{4,0}$ | $\frac{1}{8}\{35\text{SIN}^4(\phi_{gc_{sat}}) - 30\text{SIN}^2(\phi_{gc_{sat}}) + 3\}$ |
| $P_{2,0}$ | $\frac{1}{2}\{3\text{SIN}^2(\phi_{gc_{sat}}) - 1\}$ | $P_{4,1}$ | $\frac{5}{2}\text{COS}(\phi_{gc_{sat}})\{7\text{SIN}^3(\phi_{gc_{sat}}) - 3\text{SIN}(\phi_{gc_{sat}})\}$ |
| $P_{2,1}$ | $3\text{SIN}(\phi_{gc_{sat}})\text{COS}(\phi_{gc_{sat}})$ | $P_{4,2}$ | $\frac{15}{2}\text{COS}^2(\phi_{gc_{sat}})\{7\text{SIN}^2(\phi_{gc_{sat}}) - 1\}$ |
| $P_{2,2}$ | $3\text{COS}^2(\phi_{gc_{sat}})$ | $P_{4,3}$ | $105\text{COS}^3(\phi_{gc_{sat}})\text{ SIN}(\phi_{gc_{sat}})$ |
| $P_{3,0}$ | $\frac{1}{2}\{5\text{SIN}^3(\phi_{gc_{sat}}) - 3\text{SIN}(\phi_{gc_{sat}})\}$ | $P_{4,4}$ | $105\text{COS}^4(\phi_{gc_{sat}})$ |
| $P_{3,1}$ | $\frac{1}{2}\text{COS}(\phi_{gc_{sat}})\{15\text{SIN}^2(\phi_{gc_{sat}}) - 3\}$ | | |

Further coefficients can be determined using recursive relations from the first three entries, saving computational time and system memory for high-fidelity computations. Additionally, the C and S coefficients are required to solve for the potential, and these are determined empirically, and Where $\vec{r}_{sun-earth}$ is the vector pointing from the Sun to the Earth, $\vec{r}_{moon-earth}$ is the vector pointing from the Moon to the Earth, and $\vec{r}$ is the vector from the Earth to the spacecraft $$\vec{a}_{SRP} = -(1-\beta)\frac{F_s}{c}\frac{A_c}{m}\frac{\vec{r}_{sun-earth}+\vec{r}}{\|\vec{r}_{sun-earth}+\vec{r}\|} \quad (2.6)$$

Where $F_s$ is the solar flux at the orbital altitude of the spacecraft, $A_c$ is the cross sectional area of the spacecraft, as viewed from the Sun, c is the speed of light, m is the mass of the spacecraft, and $\beta$ is the angle of the Sun's elevation with respect to the spacecraft's orbital plane. Note that in both Eq. 2.6, and the solar term in Eq. 2.5, the vector $\vec{r}$ from the Earth to the spacecraft can be safely neglected for simplicity, as it is orders of magnitude smaller than the distance from the Sun to the Earth. This is not, however, the case for the lunar component of Eq. 2.5.

2.2.2. Genetic Algorithms

Genetic Algorithms (GAs) are a method of optimization, applicable to a wide variety of problems, that use a process similar to Darwinian evolution to evolve a set of random (or pseudorandom) initial conditions to find an acceptable solution, or even a globally optimal solution, to a problem [32]. These initial conditions form the initial population, of size $N_{pop}$. This initial population is then propagated, in this case using numerical integration of the perturbed equations of motion of spacecraft relative motion, to the final state at time $t_f$. FIG. 2 shows an overview of the GA iterative process [29].

Once the initial population is created and propagated, the solutions are ranked based on how close they come to the desired solution, using a fitness function. For simplicity, the fitness function is defined such that it ranges from 0 to 1, where a value of 0 has no attributes of a desired solution, and a value of 1 is the desired solution. For the problem of finding closed and repeating trajectories in the LVLH frame, this was defined as:

$$F=(1+C_r\|\vec{r}(t_f)-\vec{r}(t_0)\|+C_v\|\vec{v}(t_f)-\vec{v}(t_0)\|)^{-1} \quad (2.7)$$

where
$C_r$: coefficient of position
$C_v$: coefficient of velocity

Given a start time to and end time $t_f$, Eq. 2.7 defines a fitness function that prefers solutions that are closed trajectories. The closer the final conditions, $\vec{r}(t_f)$ and $\vec{v}(t_f)$ are to the initial conditions, $\vec{r}(t_0)$ and $\vec{v}(t_0)$, the higher the fitness function's value will be, since a desired solution is one where the final conditions and initial conditions are the same. This method can be used to generate closed form relative-motion trajectories for spacecraft with a wide array of mission constraints, by modifying the fitness function accordingly.

2.3. Trajectory Generation & Collision Avoidance

For the purposes of this analysis, trajectories for co-located geostationary spacecraft are referred to as a swarm. This has been modified from its original use case, described above, which is trajectory generation for an arbitrary sized swarm for multiple operations in LEO (such as construction, etc.), and extended to be applicable to a small set of spacecraft in geostationary orbit which are all co-located within the same ITU slot (approximately 75 km×100 km). For GEO spacecraft, the principle constraint is to avoid contact with another satellite in a specified ITU slot.

The primary method of collision avoidance is implemented directly in the genetic algorithm (GA) trajectory generation method itself. Trajectories are generated such that, over a specified time period (at least 24 hrs), there is no risk of collision between any spacecraft in the swarm. During the trajectory generation process, if there is a collision predicted, then the GA will isolate the spacecraft that are involved in the collision and determine how to mitigate it most efficiently, as well as which spacecraft has the least restrictions on it to modify its trajectory. The simplest solution is not to change the trajectory at all, but instead adjust the insertion time of a satellite into its trajectory so as to adjust its phase, thereby avoiding a collision. If this is not possible, or if this results in further collisions, then the solver will try slight variations of the trajectories until one is found that does not result in any conjunction.

The secondary method of collision avoidance is an active system that uses Kalman filtering to determine the estimated relative position of all objects in the swarm, and perform corrective maneuvers if any begin to drift. In order to maintain safe trajectories that avoid collisions between spacecraft in the swarm, a Sensor Fusion Kalman Filter (SFKF) is used to accurately determine, in real-time, the position and velocity of each spacecraft. This is done using only the information available to the swarm members themselves, through external sensors, and without additional information from operators on the ground. Using the filtered data, a set of covariance matrices are obtained for each predicted position and velocity, setting the upper limits of the error bars on the measured and processed data.

A sensor fusion Kalman filter is an extension of an unscented Kalman filter to incorporate the data from multiple sensors. This is implemented using multiple measurement update cycles to incorporate the shared data of the swarm, further refining the covariance ellipsoid for each spacecraft. FIG. 12 shows an example of the sensor fusion process, where the covariance of the position between Sat #1 and the Client spacecraft can be improved by fusing the data from all the swarm spacecraft, even taking into account the GPS position errors defining the locations of each swarm spacecraft with respect to Sat #1.

Using Kalman filtering, trajectories can also be assigned a specific corridor, where if the spacecraft drifts too far from the designated trajectory (as determined by fusing sensor data and filtering it through the sensor fusion Kalman filter), a small corrective maneuver is performed to re-align the spacecraft to its target.

2.4. Patched RPO

In order to transition between various relative motion trajectories, a method of patched RPO has been devised. This method takes two defined states, separated by a defined period of time, to determine the most efficient set of impulsive maneuvers to be able to safely transition between these states. This is done using two, three, or four impulsive maneuvers, depending on what method yields the lowest nearby spacecraft.

Each impulsive maneuver begins a new trajectory segment. To compute the shape of the transfer trajectory, and the initial velocity vector required to place the spacecraft on that trajectory, a two-stage solver is used, using the solution of the linearized C-W equation to seed the nonlinear solver for the perturbed gravitational field solution. The solution to the C-W equations [26] yields the initial velocity of the transfer trajectory, $\vec{v}_0$, which is close to the desired solution. However, it is a linearized approximation of the unperturbed solution, and thus is not the final solution.

The perturbed solution can be solved iteratively, numerically solving the second order ODE in Eq. 2.8.

$$\frac{d^2\vec{r}}{dt^2} = -\mu\frac{\vec{r}}{\|\vec{r}\|^3} + \vec{a}_{grav-pert} + \vec{a}_{sun-moon} + \vec{a}_{SRP} \quad (2.8)$$

Where $\vec{a}_{grav\text{-}pert}$ is computed using Eq. 2.4, $\vec{a}_{sun\text{-}moon}$ comprises the gravitational perturbations of the Sun and Moon (computed as point sources, see Eq. 2.5), and $\vec{a}_{SRP}$ is the acceleration from solar radiation pressure on the spacecraft (see Eq. 2.6). This system of second order ODEs is then solved iteratively to find the initial velocity $\vec{v}_{0_{pert}}$ such that the final position, $\vec{r}_f$ is the desired trajectory endpoint. This was done using the fsolve method in MATLAB, using the velocity $\vec{v}_0$ from the C-W linear solution as the initial solver guess to jumpstart the iterative process.

This is done initially prior to the start of the maneuver, in order to plan out the trajectory being travelled and prepare the spacecraft for the burn maneuver. Once the initial delta-V is applied, the spacecraft has been injected onto the transfer trajectory. A Kalman filter is then used to compute the estimated true position of the spacecraft, using its onboard sensors. This estimated position is then used to recompute the target point at the end of the transfer arc, at a rate of once per second. If the trajectory is determined to deviate by more than 25 m, then Eq. 2.8 is solved again iteratively, and a small maneuver is performed to maintain the original target point.

2.5. Station Keeping Maneuvers

Although the swarm trajectories are propagated forwards in time for a period of 10 days to check for collisions, they will eventually begin to drift away from each other due to orbital perturbations prior to or at the end of this period. In order to repeat the safe trajectories, a two-part trajectory change maneuver must be performed to either reset the swarm onto the same trajectories as the initial conditions, or to generate a new set of trajectories with minimal deviation from the current end state, while maintaining the requirements of the swarm. To reset the swarm trajectories, in essence plotting a relative motion trajectory from the end of the propagated swarm trajectory back to its initial state vector, a two impulse trajectory change maneuver is used.

These trajectory change maneuvers are firstly modelled as instantaneous burns, using the method outlined in Section 2.4. However, many spacecraft in Geostationary orbit operate using Electric Propulsion (EP) thrusters rather than chemical (impulsive) thrusters. Once computed, the impulsive maneuvers are then modified into EP-compatible trajectories in order to be useful for GEO applications. This is done by iteratively solving for a set of spline trajectories that bridges the two sides of the impulsive maneuver into a smooth trajectory that can be navigated within the limits of the EP thruster, while minimizing $\Delta V$.

Although there are methods that can generate more optimized trajectories for EP thrusters [34-39], that is not the focus of this research, and thus it is left as an additional task for the reader, to be implemented in the future. The spline trajectory method used does include $\Delta V$ accommodations for gravitational and SRP perturbations on the spacecraft. The prime goal of this research is to prove that such a method of swarm RPO trajectory generation and maintenance is possible in GEO, and is operationally feasible, given that the upper bound on the EP trajectory estimation method is conservative compared to industry standards.

Figure 13:
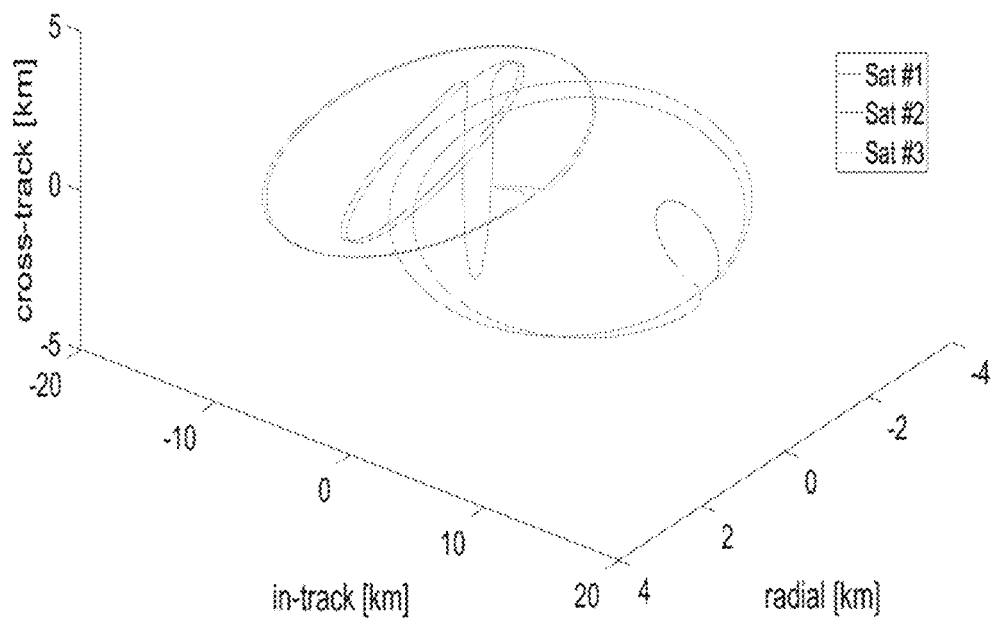
FIG. 13. Return trajectories for a swarm of three spacecraft in GEO.
Figure 14A:
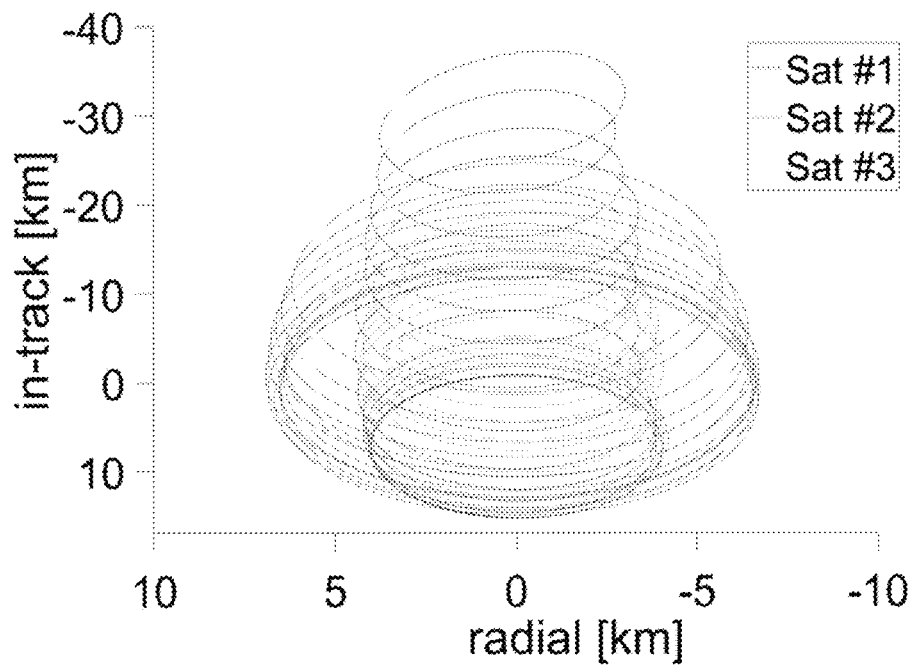
FIGS. 14A, 14B, 14C, and 14D. Optimized and extended co-located trajectories for GEO slot sharing.
Figure 14B:
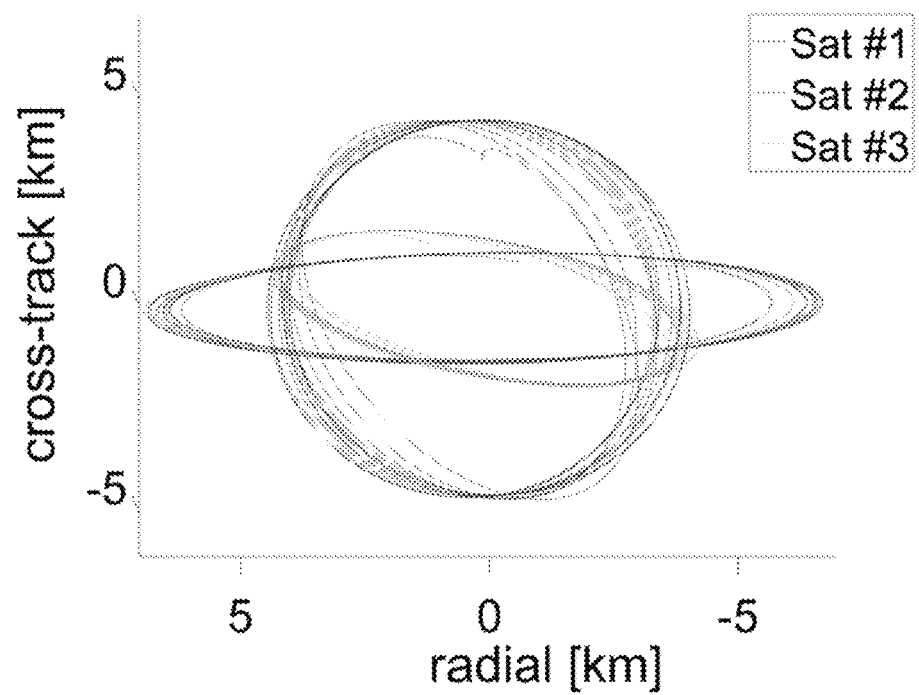
Figure 14C:
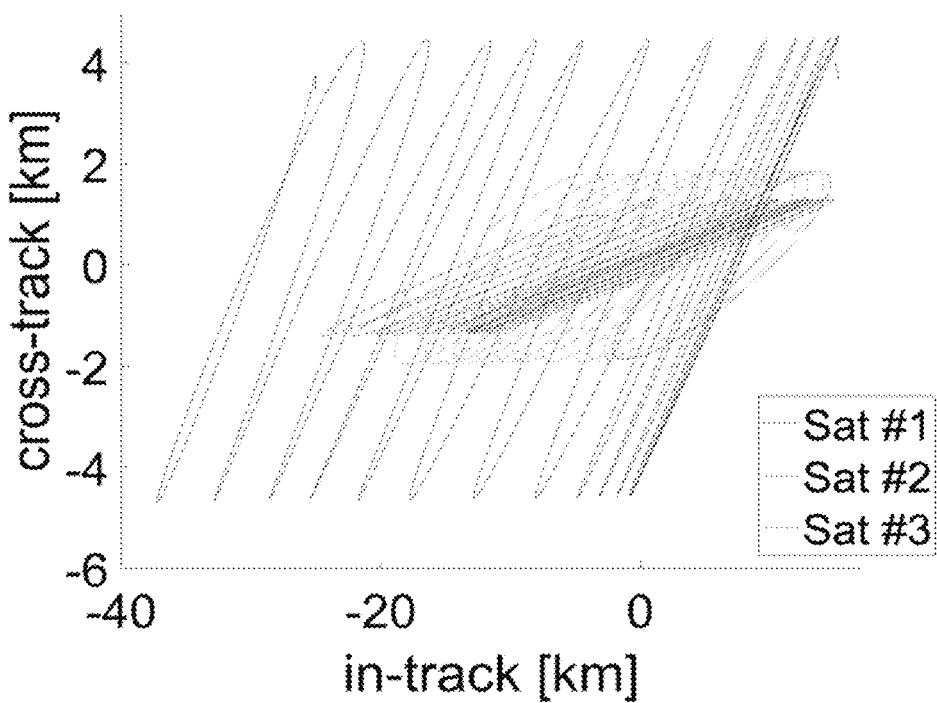
Figure 14D:
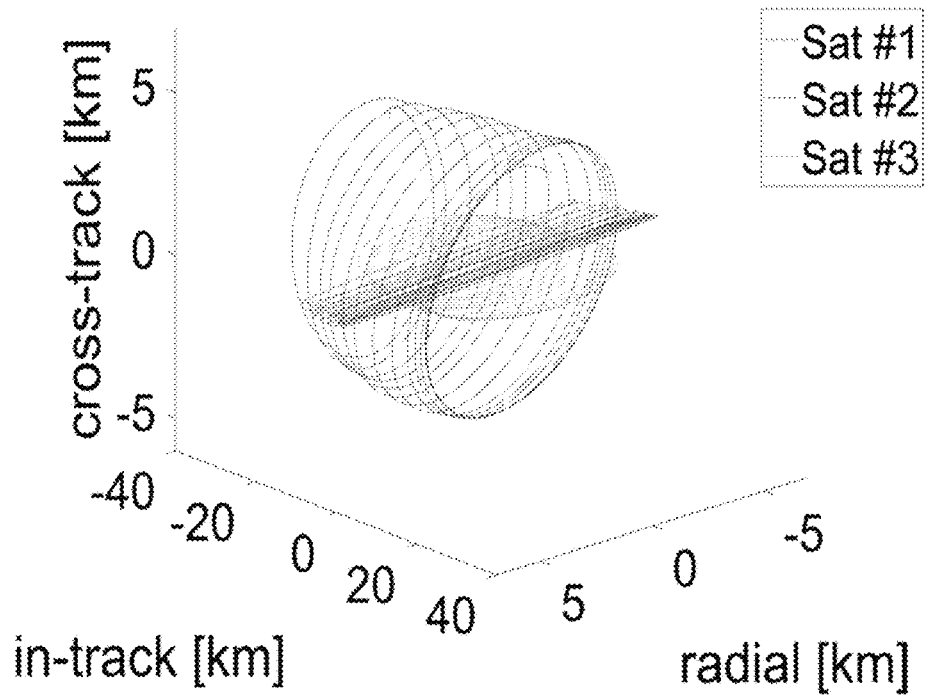
Figure 15A:
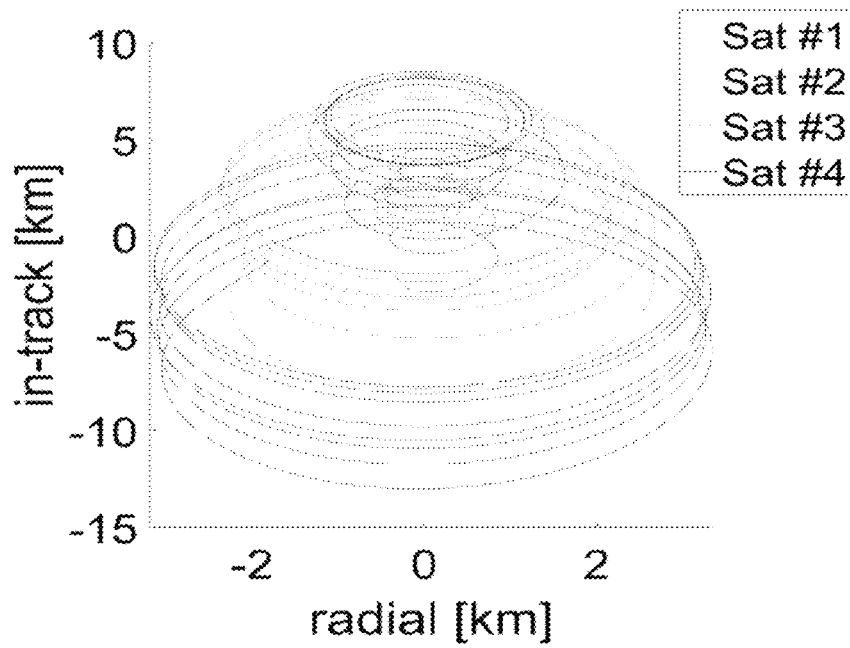
FIGS. 15A, 15B, 15C, and 15D. Co-located trajectories (convex optimization).
Figure 15B:
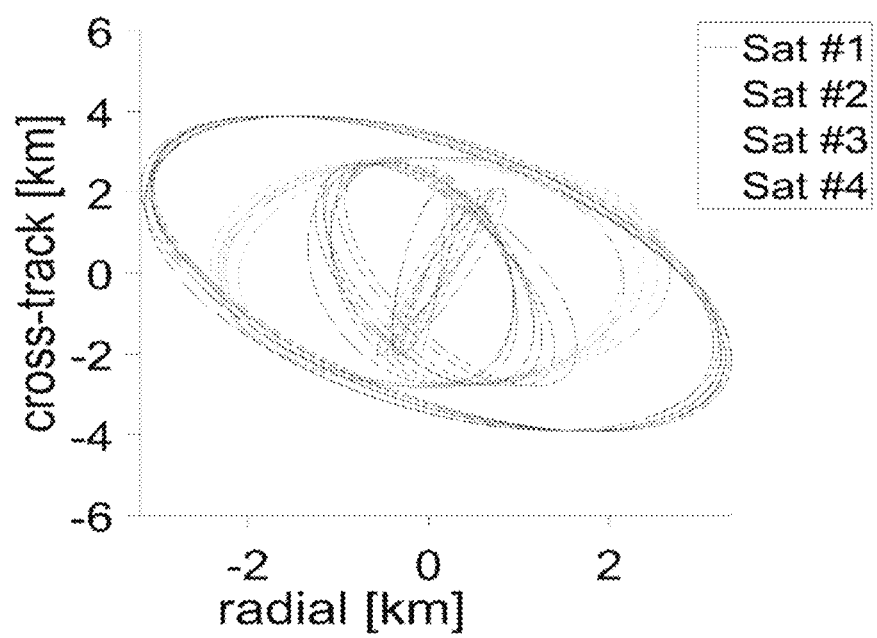
Figure 15C:
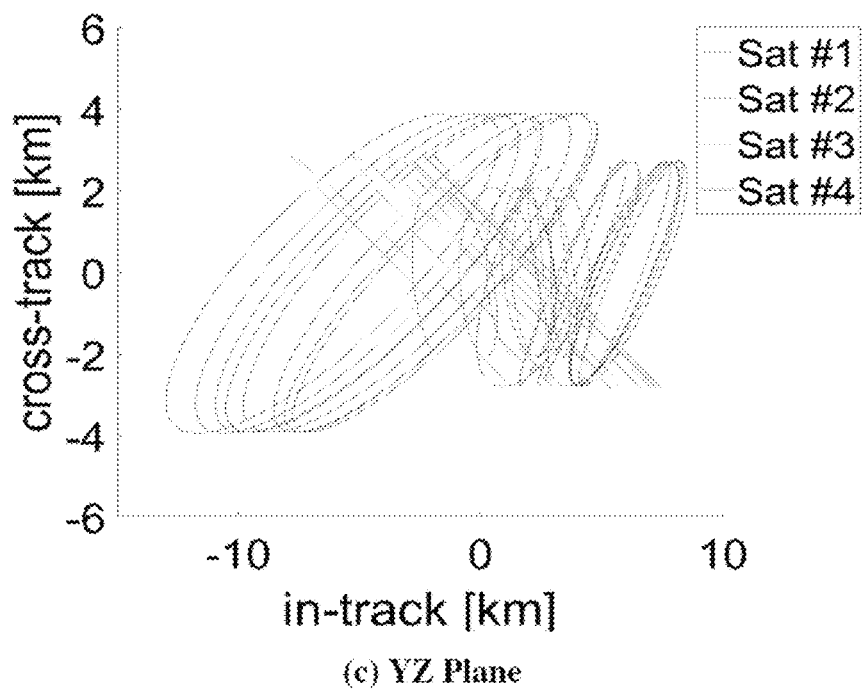
Figure 15D:
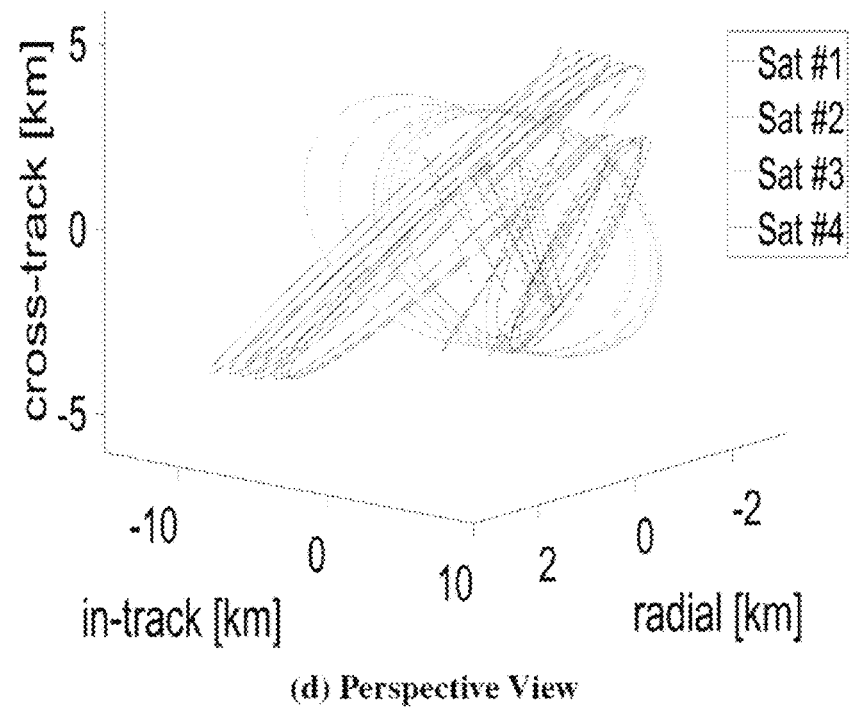
Figure 16A:
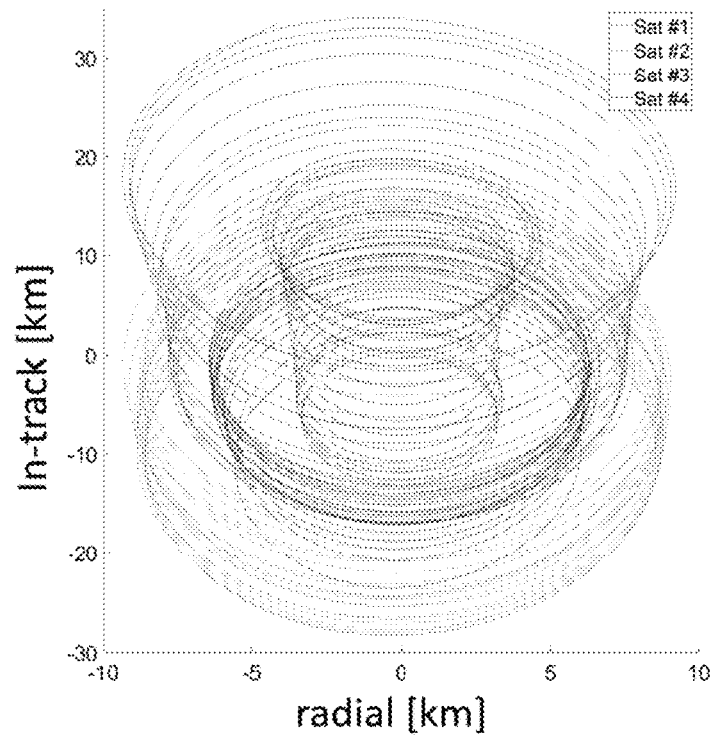
FIGS. 16A, 16B, 16C, and 16D. Co-located trajectories (real-world comparison).
Figure 16B:
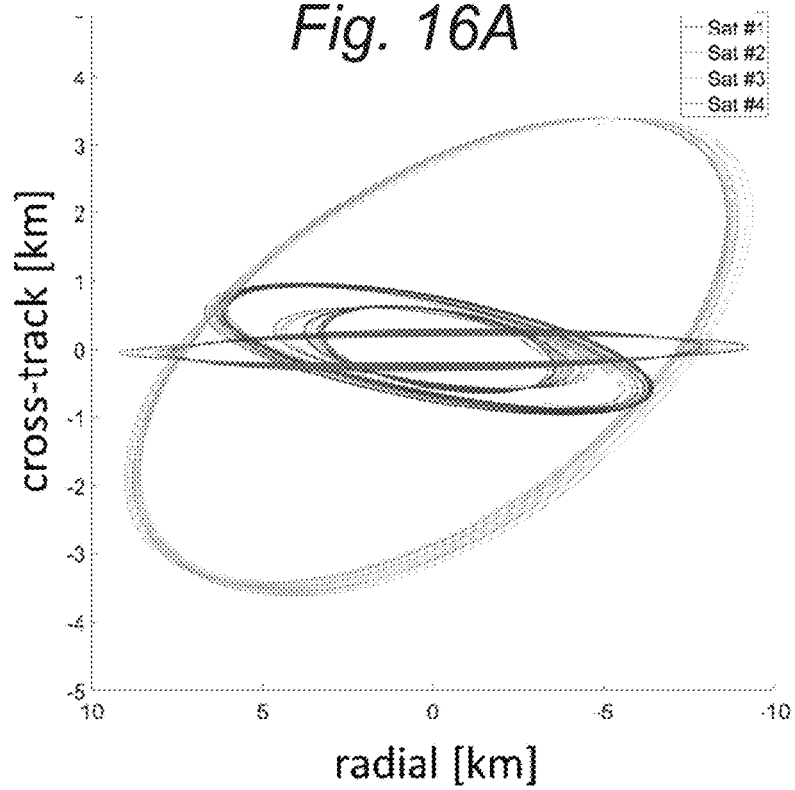
Figure 16C:
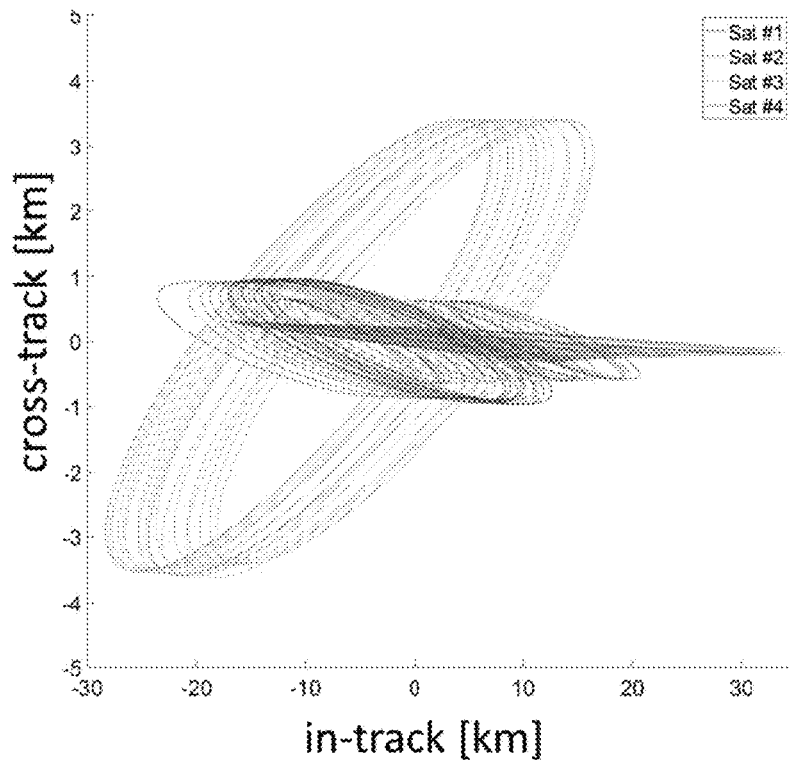
Figure 16D:
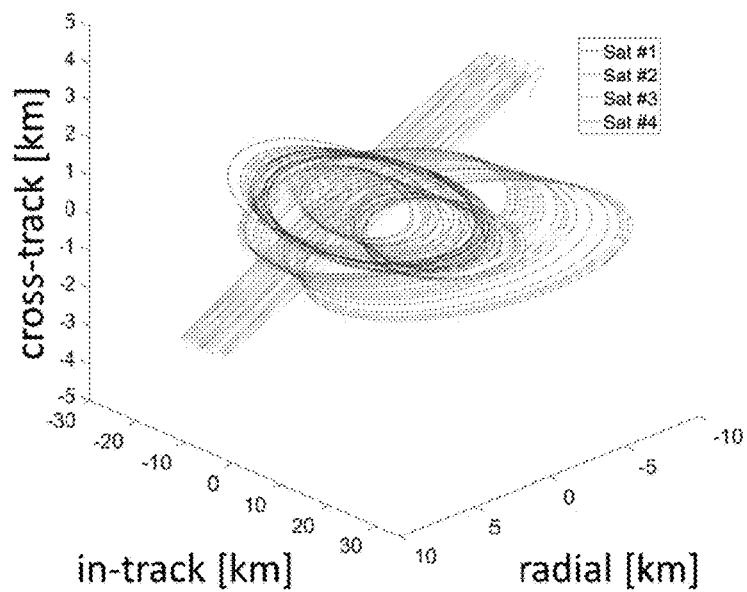

FIG. 13 depicts a set of these return trajectories visually for a swarm of three spacecraft. The trajectories in grey are the previously travelled swarm trajectory generated using GAs, and the colored trajectories are the three return transfer arcs, using numerically computed two-impulse trajectories.

2.6. Numerical Results from Simulation Trials 2.6.1. Comparison to KOREASAT Three Satellite Swarm The algorithms developed in this section were directly compared against existing geostationary collocation strategies. The first test case was that of the KOREASAT three satellite swarm. Lee et al. use the eccentricity and inclination (E/I) vector separation strategy to collocate the three satellites [40]. For ease and simplicity, each satellite was set with a mass of 2300 kg and cross-sectional area of 57 m$^2$, which is the largest and heaviest of the trio. The satellites are located in a longitudinal control box at 116° E±0.05°. Using the E/I method, Lee et al. calculated a $\Delta V$ total over a 14 week period to be 35.6131 m/s. To achieve this number all three satellites had to perform station keeping maneuvers every other day on average.

Now, using genetic algorithms when run with the same initial conditions the total $\Delta V$ for all three satellites is 16.3056 m/s. By allowing the satellites to drift naturally within their constrained boxes, the satellites are only required to fire their thrusters once per week to return them to their initial state to begin drifting again. Table 2.2 shows the direct comparison of these results.

TABLE 2.2

Bi-Weekly $\Delta V$ Results for KOREASAT Comparison

| Satellite | E/I $\Delta V$ (m/s) | GA Free Return $\Delta V$ (m/s) |
|---|---|---|
| KS 1 | 11.7318 | 11.0342 |
| KS 2 | 11.89025 | 1.8543 |
| KS 3 | 11.99105 | 3.4170 |
| Total $\Delta V$ | 35.6131 | 16.3056 |

FIG. 14 depicts the solution associated with the $\Delta V$ values from Table 2.2. The trajectories for each satellite in a 14 day period are shown. At the end of the period the satellites use their on board propulsion to return to their initial positions to begin drifting again with the two impulse method described in Section 2.4.

The three satellites shown in FIG. 14 also maintain at least a 1 km separation at all times. What is also important to note is that by using the same mass for all of the satellites, this test incurs greater penalties from the orbital perturbations; however, the solution derived from the GA still requires less than 50% of the $\Delta V$ used by the traditional E/I method.

2.6.2. Comparison to Convex Optimization Strategy

The second test case was a comparison to the German Aerospace Center's (DLR) convex optimization method for collocating Geostationary satellites [41]. This method is based on using a leader-follower scheme for control. The optimization is done using a cost function to minimize propellant consumption and total number of maneuvers. The entire convex optimization method used in their paper is enabled by a linear time varying formulation of orbital dynamics in terms of nonsingular orbital elements. The simulation is constructed for a fleet of four satellites within a single GEO slot, with a seven day maneuver cycle.

The strategy used for orbital maneuvering for the lead satellite is a sun-pointing perigee strategy. To implement this strategy the leader follows a circle within the eccentricity plane with an eccentricity offset of $2 \times 10^{-4}$. The follower satellites normal states were chosen to be consistent with the e/i separation strategy as described earlier. All four of the satellites were chosen to have a mass of 3000 kg and all had a surface area of 120 m$^2$ except for the lead satellite which had a surface area of 90 m$^2$.

To setup the comparable test case with the use of genetic algorithms, all the satellites were configured with the 3000 kg mass. However, for simplicity the surface area was chosen as a constant 120 m² for all four satellites. As mentioned earlier, this only effects the SRP perturbation, and will be shown later that even with this greater perturbing force the GA method still produces significantly better results. The maneuver cycle used for the GA test is eight days long. FIG. 15 shows graphically the results of this comparison.

TABLE 2.3

Yearly ΔV Results for DLR Comparison

| Satellite | Actual ΔV (m/s) | GA Free Return ΔV (m/s) |
|---|---|---|
| SAT 1 | 49.86 | 71.52 |
| SAT 2 | 50.87 | 43.95 |
| SAT 3 | 68.10 | 35.03 |
| SAT 4 | 68.06 | 43.63 |
| Total ΔV | 236.89 | 194.14 |

The GA free return strategy offers clear ΔV benefits compared to the convex optimization method. The satellites on the eight day maneuver cycle used 18% less ΔV over the entire year as compared to the leader-follower seven day scheme. The GA method is able to save this ΔV by allowing the satellites to drift closer together and react more quickly when compared to the convex method. Minimum separation in the GA test was 1 km where the minimum separation set by the DLR team was 6.03 km.

2.6.3. Comparison to 4 Co-Located Spacecraft

The third and final test case compares this genetic algorithm swarm trajectory generation method with a real-world case of four co-located GEO spacecraft. The data used in this comparison was provided by a GEO spacecraft operator, and similar inputs were used to generate the comparison results. This test case is carried by restricting each spacecraft to an angular separation of ±0.05° to ensure reliable communication with the ground. FIG. 16 shows the resultant trajectories for the GA solution for all four spacecraft. Each trajectory depicts a 10-day period of the spacecraft, which is designed to be repeating, maintained using periodic station keeping maneuvers.

TABLE 2.4

Yearly ΔV Results for Real-World Comparison

| Satellite | Actual ΔV (m/s) | GA Free Return ΔV (m/s) |
|---|---|---|
| Sat 1 | 46.845 | 38.502 |
| Sat 2 | 46.336 | 56.958 |
| Sat 3 | 47.542 | 41.946 |
| Sat 4 | 47.395 | 29.287 |
| Total ΔV | 188.118 | 166.693 |

The plots and data above show that the genetic algorithm method in use for generating and maintaining co-located GEO spacecraft trajectories for this four-satellite solution is more efficient than traditional station keeping methods, primarily due to the ability of the sensor fusion Kalman filtering collision avoidance methods to allow a greater degree of freedom for the spacecraft to drift through the GEO slot without conjunctions.

2.7 Conclusion

Although GEO spacecraft co-location has typically been limited to three or four spacecraft, the increasing demand for high-speed communication systems, along with the recent development of satellite servicing [42] will mean that there most likely will be more spacecraft stationed in Geosynchronous orbital slots, with increased average operational lifetimes. Given the anticipated crowding of the GEO belt, and the ever increasing size of deployments aboard such Geosynchronous communications satellites, it is more important now than ever to develop efficient and adaptable methods for multi-spacecraft swarm trajectory generation and maintenance, enabling greater numbers of spacecraft to operate in close proximity with reduced collision risk and with lower DV. Additionally, systems that include active collision avoidance by way of high fidelity relative motion sensing, which can be achieved using a Sensor Fusion Kalman Filtering method, could be very beneficial if implemented on co-located spacecraft in the GEO belt.

3. Safe Construction in Space: Using Swarms of Small Satellites for In-Space Manufacturing 3.1 Introduction Given the recent advancements in satellite servicing technologies [43-49] and space robotics [50], the collective capabilities of the space industry as a whole are moving towards in-space manufacturing. The ability to manufacture or assemble anything in space using robotics is a crucial technology for developing large platforms near Earth, for deep space exploration and supporting future transport of humans to other planets, as current launchable platforms are limited to the volume and mass constraints of a single rocket fairing. Although the existing On-Orbit Servicing (OOS) methodology employs the use of large, monolithic robotic spacecraft, the method of OOS and in-space manufacturing can be enhanced exponentially from using one spacecraft to a swarm of dozens, potentially even hundreds of small robotic spacecraft. These swarms of spacecraft would operate analogous to a colony of bees, each individual member of the swarm performing its own dedicated task, and when combined culminates in the successful execution of a large and complex operation [51,52].

To be able to control a large number of spacecraft cooperating in close proximity, each member of the swarm must be able to maneuver on its own, as well as have the capability to sense the position and velocity of other nearby members of the swarm to communicate and avoid collisions. To streamline this process, for a given swarm function a set of optimized trajectories needs to be determined such that there are no predicted collisions between the spacecraft for a prescribed amount of time (e.g., at least a day), barring any malfunctions, where also the delta-v required to insert to the swarm is minimized.

3.2 Genetic Algorithms

Genetic Algorithms (GAs) are a method of optimization, applicable to a wide variety of problems, that use a process similar to Darwinian evolution to evolve a set of random (or pseudorandom) initial conditions to find an acceptable solution, or even a globally optimal solution, to a problem. 11 GAs can be applied to generate trajectories for a swarm of spacecraft, given a set of restrictions that the swarm will abide by [53]. These trajectories will be such that each member can perform their required individual actions, while minimizing the fuel required for maneuvering and also avoiding conjunctions, to a prescribed probability of collision, for a given amount of time. While near term it is expected that ground command uplink intervention would be needed to determine and execute remedial actions in the case of failure on orbit of a single element in the swarm, the long-term goal is to develop autonomous algorithms to enable a swarm to accept and remediate failures of one or more of its members, in real time.

3.2.1 Computational Scheme

Computations for trajectory generation were performed in the local vertical local horizontal (LVLH) rendezvous coordinate frame, centered on a central spacecraft. In order to incorporate the J2 perturbations of the Earth's gravitational field, and reduce computation time, a two stage solver was used, incorporating both the linearized Clohessy-Wiltshire (C-W) equations and the numerical integration of the equations of relative motion with perturbations.

This two-stage GA solver is comprised of the following:
1. Stage One: Use the GA solver to generate a set of trajectories satisfying the requirements of the swarm, using the linearized C-W equations to allow for fast iterations, albeit with a loss in accuracy from the linearization process.
2. Stage Two: Feed the solution from Stage One back into the GA solver, this time using the direct numerical integration of the equations of relative motion, with J2 perturbation added.

3.2.2 Kalman Filtering

In the Stage Two solver, a sensor-fusion Kalman Filter is employed to accurately compute the collision risk between each spacecraft, taking into account the errors in relative position knowledge between the spacecraft. In real-world operations, it's impossible to know the position and velocity of a spacecraft with 100% precision. Thus, position and velocity are measured using onboard sensors, which have inherent error tolerances. These errors, from inputs such as GPS and relative Radar ranging, result in a covariance matrix attached to the state vector for each spacecraft in the swarm. These covariance matrices can be computed between each spacecraft in the swarm, meaning that if the covariance between spacecraft A and B is desired, sensor fusion between all other spacecraft and spacecraft B can be used to refine the state vector and covariance matrix of spacecraft B, minimizing the measurement error. By combining the measurements from multiple spacecraft, we can get more accurate measurements than by computing the covariances on each spacecraft separately.

A Kalman filter can be used to reduce the error in an estimated state by propagating a set of points through time, each corresponding to the boundaries of the covariance "bubble of uncertainty" that surrounds the spacecraft. As this is propagated, the covariance ellipsoid is refined by using measurements taken from a sensor at a known position, with a known precision. This is used successively over time to predict what states are more likely, and which are less likely, using a weighted scheme to determine within a 3-sigma gaussian distribution, where the spacecraft lies. The Kalman filtering method is useful for not only simulations, but for real-time operations, since the computational cost of the algorithm is very low and can be run in real-time onboard a satellite.

In order to take into account the shared data of the swarm, which is the combination of the radar ranging sensors on each spacecraft, a sensor-fusion Kalman Filter is used. This is a modification of the standard Kalman filter described above, which uses multiple measurement update cycles to incorporate the shared data of the swarm to further refine the covariance ellipsoid for each spacecraft. FIG. 12 above shows an example of the sensor fusion process, where the covariance of the position between Sat #1 and the Client spacecraft can be improved by fusing the data from all the swarm spacecraft, even taking into account the GPS position errors defining the locations of each swarm spacecraft with respect to Sat #1.

3.3 Trajectory Generation

One of the features that makes these GA-generated trajectories unique is that they are free flight trajectories that require no external inputs for their duration (within limits). This is because the major orbital perturbations are taken into account in the orbit propagation when generating the trajectories, such that if a time period of 10 days is specified, then the trajectory will not require any correction maneuvers for 10 days, and will return to the same starting position at that time, within a prescribed tolerance. Thus, a correction will only be needed after 10 days to repeat the same trajectory, using considerably less fuel than traditional station-keeping methods. However, these fuel savings come at a cost, as the distance and orientation to the target will not remain constant throughout the 10 day period, and thus is only useful if this is acceptable to the mission parameters. For most inspection and OOS tasks, this is allowable and thus allows fuel savings for smaller satellites that already have limited fuel reserves to begin with.

Figure 17:
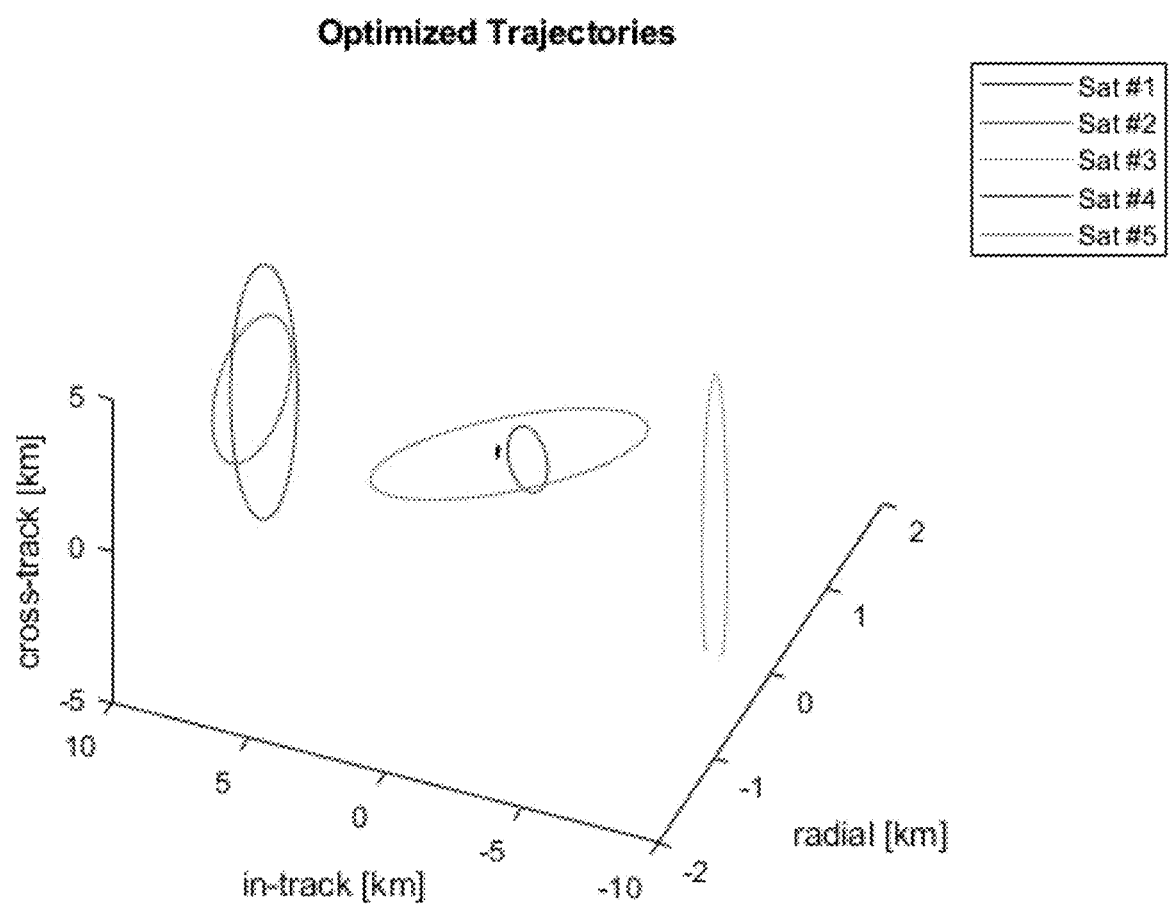
FIG. 17. Swarm of 5 Spacecraft
FIG. 18. Extrapolated Trajectories over 10 days—Swarm of 5 Spacecraft
FIG. 19. Swarm trajectories for in-space manufacturing.

In an ideal case, there would be no limits on how far we can propagate these trajectories to ensure a collision-free solution, however in practice this is limited to 10-20 days, since gravitational perturbations of order higher than the J2 perturbations are not considered in this simulation. It would be possible to extend this limit by accounting for higher order orbital perturbations in future work. FIG. 17 shows an example of a set of 5 spacecraft in a swarm, centered around a central spacecraft. This figure shows the orbits propagated over a 24 h period. In the figure, two spacecraft (Sats #4 & #5) are located within 4 km of the target spacecraft for close-up inspection and imaging, while another spacecraft (Sat #3) is located at 10 km to act as a communications relay. The final two spacecraft (Sats #1 & #2) orbits are further out to be used for future servicing operations after the inspection operations are complete.

Figure 18:
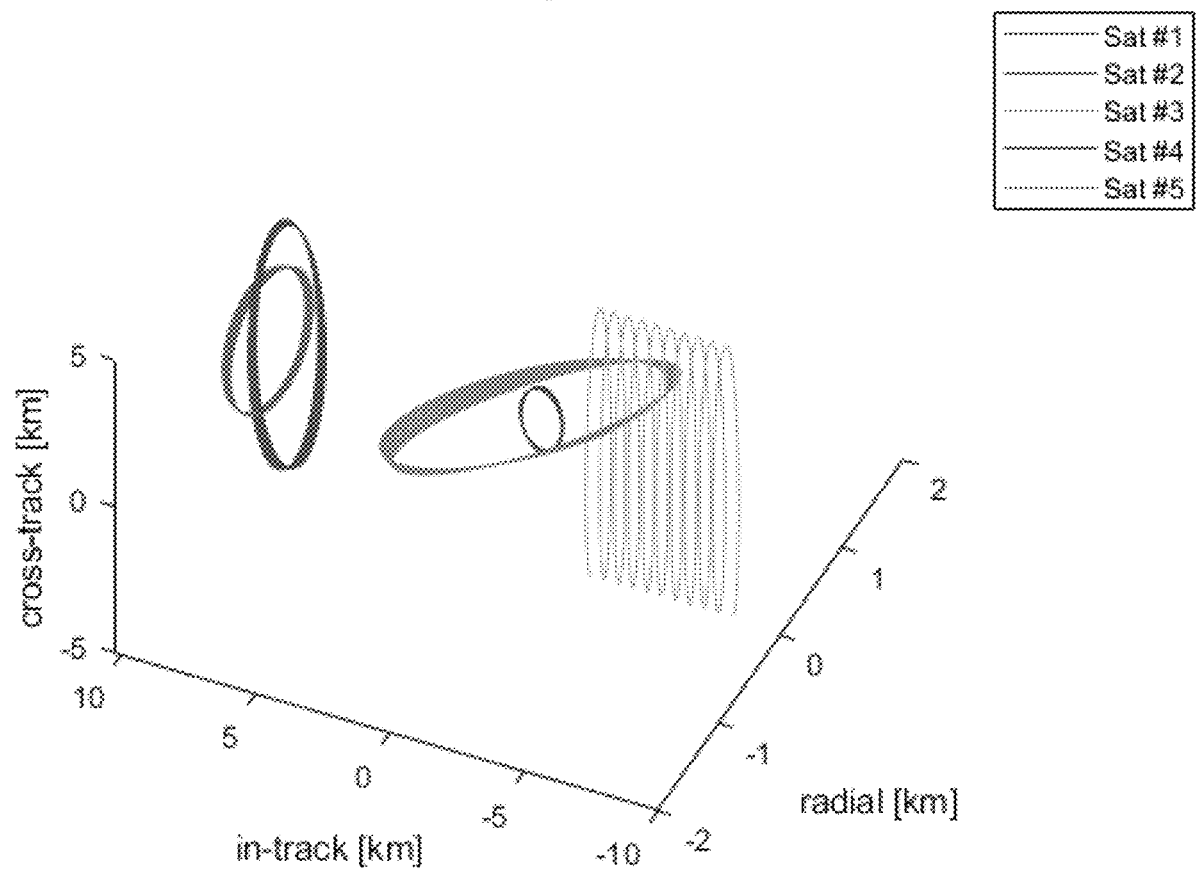

FIG. 18 shows a propagation of the same trajectories over a period of 10 days.

The goal of using a system like this to generate a set of trajectories for a swarm of spacecraft is to allow modular and customizeable designs for a swarm, to enable it to carry out whatever goals may be required. Thus, each spacecraft can have its own requirements and its own sub-mission, yet they can all share data among themselves and their trajectories are setup to prevent collisions under free-flight each with low delta-v.

3.4 In-Space Manufacturing & Assembly

Although to-date, the use of in-space manufacturing & assembly has been infrequent and limited to very large structures, like the International Space Station (ISS) assembled in orbit by astronauts and tele-operated robotics, the future of mankind's expansion into the cosmos will require the commonplace use of in-space manufacturing and assembly to exceed the dimensional constraints imposed by launch vehicle fairings. By assembling and constructing structures in-orbit, spacecraft and space platforms can evolve to become more modular, with parts that are reusable and transferable, somewhat like using a set of standard LEGO® blocks in space.

Combining the method of swarm trajectory generation with the goal of in-space manufacturing/assembly, we can find new and unique ways to perform orbital assembly that cannot be done with a single, monolithic spacecraft. Using swarms of spacecraft which are operating autonomously in concert, an analog of a construction site on Earth can be setup, where there is a staging area for work on converting raw materials or prefabricated parts into sub-assemblies, which are then transported over to the site of the structure being aggregated.

Figure 19:
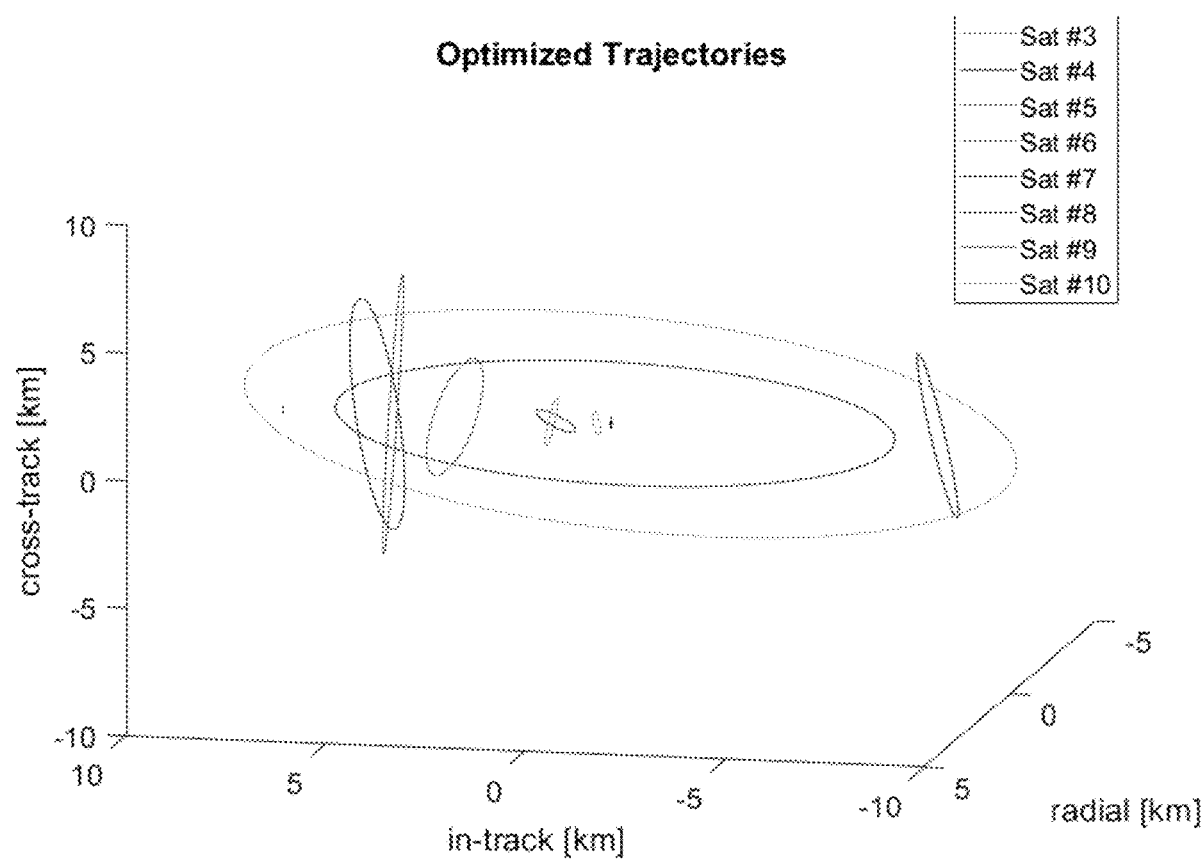

FIG. 19 shows a swarm designed for in-space manufacturing & assembly, where there is a supply depot about 5 km ahead (in-track) of the aggregated object, while other spacecraft are approaching closer, within 0:5 km of the aggregated object. Using GAs to generate trajectories for a swarm of spacecraft performing in-space manufacturing, we can ensure a safe "construction" orbital scenario, since one of the foundations of the swarm GA method is that all the trajectories are passively stable for a period of days (at least). Additionally, the swarm GA method allows dynamic reconfiguration of the swarm to accept new spacecraft into the swarm, and to grow as the aggregated object changes in size and mass. [53]

3.5 Scaling with Number of Spacecraft

Although the algorithms in use for orbit maintenance and collision avoidance schemes can be run in real-time on the individual small satellites using Kalman filtering, the Genetic Algorithms that are used to generate the initial swarm trajectories, or to compute a new set of altered swarm trajectories, are not yet optimized to run in real-time aboard the spacecraft. The conjunction de-confliction process is the most time-consuming and it scales on the order of n-squared, where n is the number of spacecraft in the swarm.

Figure 20:
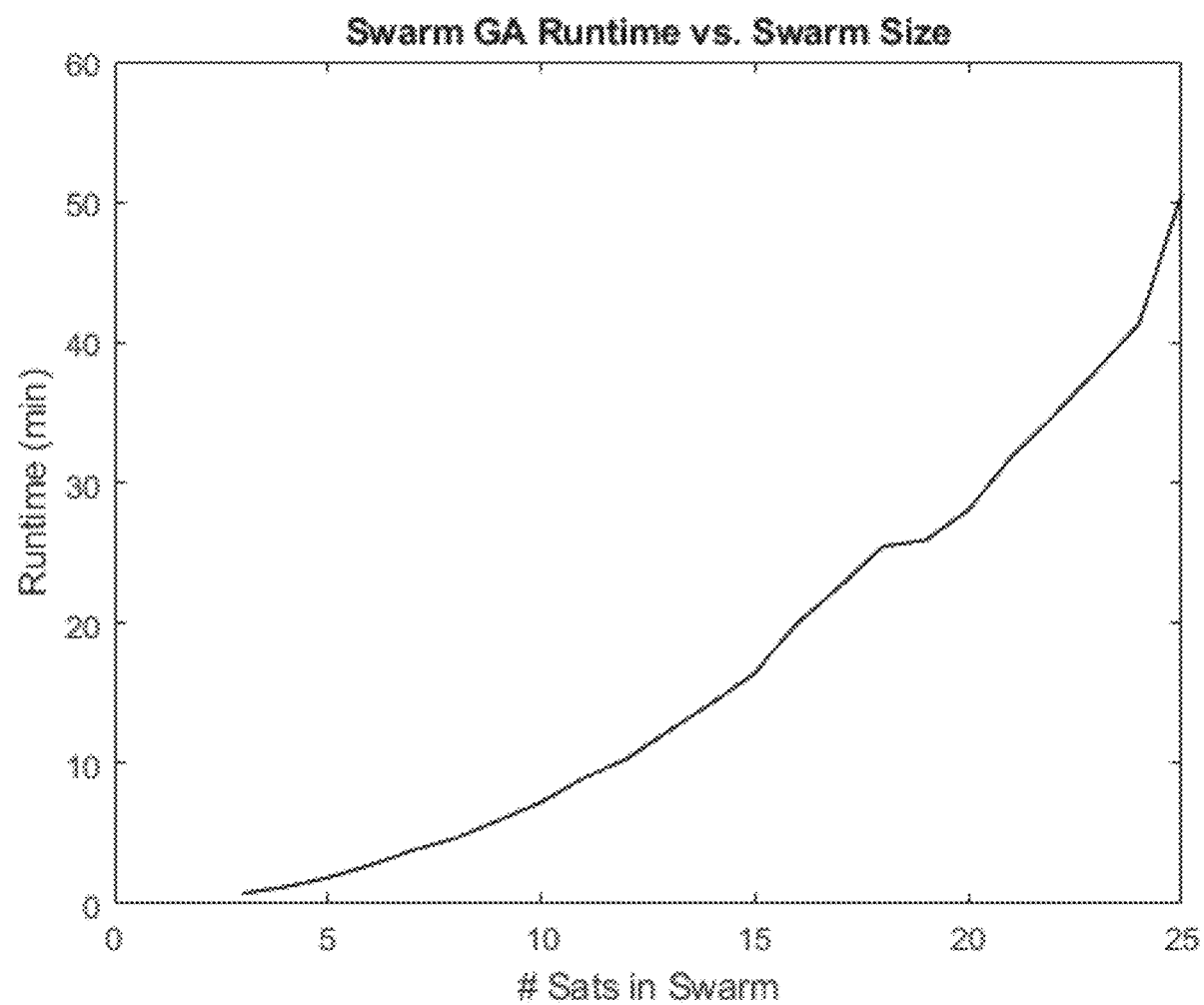
FIG. 20. Runtime vs Swarm Size—Averaged over 100 runs.

The amount of time to compute a solution varies not only by the number of space craft in the swarm, but the pseudo-random initial conditions used to generate the GA population. (See FIG. 20.) In order to analyze variations in computational intensity of the problem with respect to the swarm size alone, a set of Monte-Carlo simulations were run for each swarm size. This allowed these variations introduced by the initial conditions of the solution to be averaged out.

Although the computational time increases as a function of n-squared, future work will strive to reduce this by using machine learning techniques to avoid running similar types of problems over and over again, and instead store these typical solutions in a database for referencing. Additionally, the unique features of a "swarm" of satellites each with their own processor may offer a real-time parallel processing distributed option for computing in real-time GA solutions.

3.6 Concluding Remarks

Using swarms of spacecraft assisted by Genetic Algorithm based trajectories, we can come up with safe and efficient trajectories for swarm rendezvous and proximity operations, thereby enabling in-space manufacturing and assembly on a large and distributed scale. Simulations of these techniques have shown that it is possible to create such trajectories, as well as to maintain them using known and tested techniques to reduce real-time errors in flight such as Kalman filters for multisensor fusion.

It should be appreciated that with further optimization and machine learning in software, as well as taking advantage of the swarms natural number of multiple processors operating in parallel real-time generation of trajectories for N number of satellites in a swarm can be realized. The GA algorithm specifically envisions and enables multiple cooperative space objects to enable much larger scale in-space assembly and manufacturing of objects and platforms, safely and cooperatively. The GA algorithm trajectory may enable the possibility that a swarm could be launched to the orbit of Mars e.g., which would enable an autonomous swarm of spacecraft to "build" a very large RF aperture in orbit thus allowing long distance communications portal for communication and relay before humans ever arrive.

4. Sensor Fusion Kalman Filtering for Stability and Control of Satellite Swarms

4.1 Introduction

Given the recent advancements in satellite servicing technologies and space robotics [54-60], the collective capabilities of the space industry as a whole are moving towards in-space manufacturing/assembly. The ability to manufacture or assemble anything in space using robotics is a crucial technology for developing large platforms near Earth, for deep space exploration and supporting future transport of humans to other planets, as current launchable platforms are limited to the volume and mass constraints of a single rocket fairing. Although the existing On-Orbit Servicing (OOS) methodology employs the use of large, monolithic robotic spacecraft, the method of OOS and in-space manufacturing can be enhanced exponentially from using one spacecraft to a swarm of dozens, potentially even hundreds of small robotic spacecraft. These swarms of spacecraft would operate analogous to a colony of bees, each individual member of the swarm performing its own dedicated task, and when combined culminates in the successful execution of a large and complex operation [61].

To control a large number of spacecraft cooperating in close proximity, each member of the swarm must be able to maneuver on its own, as well have the capability to sense the position and velocity of other nearby members of the swarm to communicate and avoid collisions if anything goes wrong [62]. To streamline this process, for a given swarm function a set of optimized trajectories needs to be determined such that there are no predicted collisions between the spacecraft for a prescribed amount of time, barring any malfunctions, and the $\Delta V$ required to insert to the swarm is minimized.

There has been some prior research into the use of safety metrics and collision avoidance for RPO in Earth orbit [63]; however, no previous research has sought to combine the use of all of these for swarm operations. For example, Gaylor, Brent, and Barbee [64] outline a framework for safe rendezvous algorithms using safety ellipses and linear optimization techniques, but it is applied only to one-on-one RPO, and is not suited for swarm operations. Izzo and Pettazzi [65] analyze the use of equilibrium potential functions to determine optimal orbits for satellites in the swarm to avoid collisions. Lopez and McInnes [66] employ virtual vector fields to control the final approach trajectory during RPO, but only for one-on-one satellite rendezvous. Slater, Byram, and Williams [67] create probability functions to determine the collision risk of members of satellite formations with foreign objects or drifting members of the formation. However, they do not set up the formation (swarm) in a way that reduces the probability of these collisions in the first place. Ross, King, and Fahroo [68] investigate optimization techniques for formations and swarms, though they concentrate on propellant optimization rather than safety and collision avoidance optimization.

This section covers the use of Sensor Fusion and Kalman Filtering to accurately determine the relative states of all spacecraft in a swarm, in real-time, accounting for deviations due to errors and perturbations.

4.2 Swarm Architecture

One goal of swarm Rendezvous and Proximity Operations (RPO) is to enable cooperative on-orbit construction and assembly projects, allowing for the creation of large structures in space while potentially using in-situ resources. These trajectory generation and verification methods are designed to minimize the overall risk of collisions between any spacecraft in the swarm, or with any object that is in close proximity to the swarm. The methodological solutions presented here use Genetic Algorithms to evolve a set of initial conditions into a viable and efficient solution, while also applying a Sensor Fusion Unscented Kalman Filter to predict the relative positions of the spacecraft for real-time collision detection and avoidance. These algorithms result in a set of trajectories for each spacecraft that enable it to achieve its mission goals within its ΔV budget, while also leveraging the combined sensor data of the entire swarm to accurately determine the relative positions between each spacecraft to a higher precision than GPS data alone.

4.2.1 Trajectory Generation

Genetic Algorithms (GAs) can be used to converge on an optimal set or family of trajectories for each member of the swarm [61]. These trajectories will be such that each member can perform their required individual actions, while minimizing the fuel required for maneuvering and also avoiding conjunctions, to a prescribed probability of collision, for a given amount of time. However, there are inherent errors in any system, and in order to react to them, autonomous algorithms, operating in real time, are required.

Figure 21:
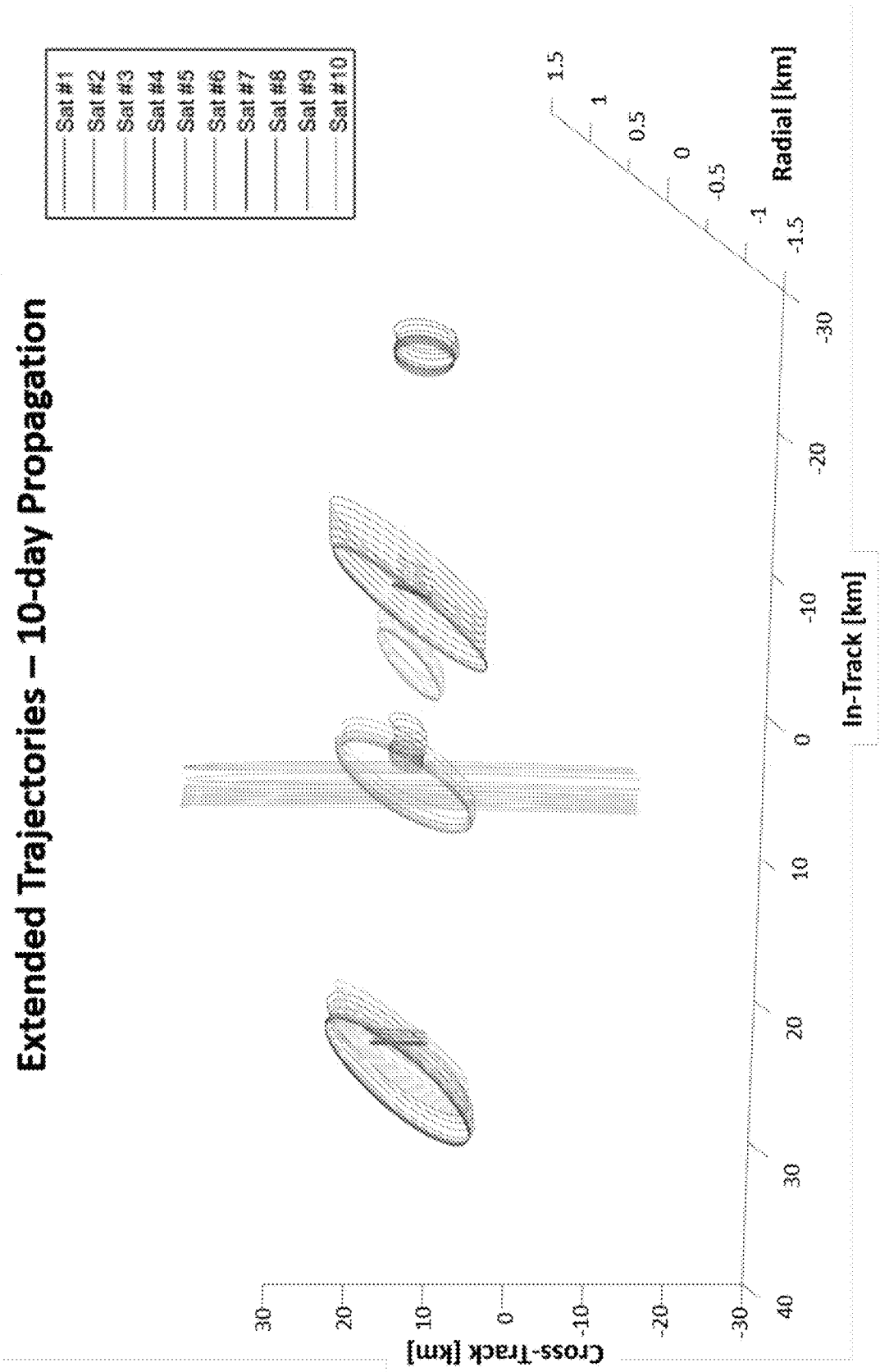
FIG. 21. Swarm Solution for 10 Spacecraft
FIG. 22. Example Error Ellipse for a Satellite.

Running this for a set of 10 spacecraft, with zoning restrictions set out in Table 4.1 with respect to the Client spacecraft, and to avoid conjunctions within a 50 m buffer corridor from each spacecraft, FIG. 21 shows a set of closed and repeating relative motion trajectories that satisfy this criteria. The trajectories shown are for a 10 day propagation of the initial states determined by the GA solver, during which the Sensor Fusion Kalman Filter determined that there was no probability of collision within a 3-sigma covariance.

TABLE 4.1

Constraints for 10 Spacecraft Swarm Example

| Swarm Member | Constraint Ellipsoid Dimensions [km] | Constraint Ellipsoid Center [km] |
| --- | --- | --- |
| Spacecraft 1 | [2, 2, 2] | [0, 0, 0] |
| Spacecraft 2 | [2, 2, 2] | [0, −5, 0] |
| Spacecraft 3 | [3, 3, 3] | [0, 2, 0] |
| Spacecraft 4 | [5, 5, 5] | [0, 7, 3] |
| Spacecraft 5 | [2, 2, 4] | [0, 10, 0] |
| Spacecraft 6 | [2, 2, 4] | [0, 10, 0] |
| Spacecraft 7 | [2, 2, 4] | [0, −20, 0] |
| Spacecraft 8 | [5, 5, 5] | [0, 30, 0] |
| Spacecraft 9 | [5, 5, 5] | [0, 30, 0] |
| Spacecraft 10 | [5, 5, 5] | [0, 30, 0] |

4.3 Kalman Filtering

In real-world operations, it is impossible to know the position and velocity of a spacecraft with 100% precision. Position and velocity are measured using on-board sensors, which have inherent error tolerances. These errors, from inputs such as GPS and relative Radar ranging, result in a covariance matrix attached to the state vector for each spacecraft in the swarm. These covariance matrices can be computed not only with respect to an inertial state, but also between each spacecraft in the swarm. This means that if the covariance between spacecraft A and B is desired, sensor fusion between all other spacecraft and spacecraft B can be used to refine the state vector and covariance matrix of spacecraft B, thus minimizing the measurement error. By combining the measurements from multiple spacecraft, the measurement accuracy can be improved over a simple computation of the covariances on each spacecraft separately.

4.3.1 Mathematical Formulation

A Kalman filter can be used to reduce the error in an estimated state by propagating a set of points through time, each corresponding to the boundaries of the covariance "bubble of uncertainty" that surrounds the spacecraft. As this is propagated, the covariance ellipsoid is refined by using measurements taken from a sensor at a known position, with a known precision. This is used successively over time to predict what states are more likely, and which are less likely, using a weighted scheme to determine where the spacecraft lies within a 3-sigma Gaussian distribution. The Kalman filtering method is useful for not only simulations, but for real-time operations, since the computational cost of the algorithm is very low and can be run in real-time onboard a satellite.

There are two common types of Kalman filters used in practice, an extended Kalman filter (EKF) and an unscented Kalman filter (UKF). The EKF, although more computationally efficient, requires that the Jacobian matrix of the equations of motion be known and well defined, which is quite complex to derive for the nonlinear perturbation equations of RPO. Instead, the UKF uses what is known as sigma-points, a set of virtual points surrounding the unknown object at a 3-sigma distance, which are then propagated using the equations of motion to determine the covariance drift over time. While this is more computationally intensive than modelling the covariance drift using a Kalman filter, it is less sensitive to nonlinear changes in the system and can be computed in real-time without a-priori knowledge of the Jacobian matrix [69].

To run a step of a Kalman filter, first the previous state is needed. This can either be the initial state, or the end state of a previous step of the Kalman filter. We will define these known quantities using $\hat{x}_{0,k-1}^+$ for the spacecraft position, and $\hat{x}_{i,k-1}^+$ for each of the sigma points. Note that there are two sigma points for each dimension of the problem, including position, velocity, and noise dimensions. The plus sign denotes that this is a corrected estimate, and thus has been run through a filter (or is the initial state). The k−1 indicates that it is from the previous time-step, and the hat denotes that it is an estimate generated by the filter, and not a raw measurement from a sensor. Over time, when using a Kalman filter, the estimate will converge to a minimal covariance offset from the truth value so long as the system remains observable [70]. This minimal covariance will depend on the accuracy of the measurement sensors, and the process noise variances—how much the measurements should be trusted above the model.

First, the points can be run through a propagation function, which in this case is the equations of motion for RPO with gravitational perturbations.

$$\hat{x}_{i,k}^- = f(\hat{x}_{i,k-1}^+, q_{i,k-1}) \quad (4.1)$$

Here, qi, k−1 represents the process noise, which are unknowns that affect the propagation. Typically, in terrestrial applications, this is attributed to wind or other variable sources. There are few of these sources in LEO, though this could be used to model aberrations in atmospheric drag, or thruster variations during a maneuver. For our purposes, the process noise is left as zero for simplification.

Once the sigma points have all been calculated and propagated, the mean predicted state is computed as a weighted average of all the sigma points.

$$\hat{x}_k^- = W_0 \hat{x}_{0,k}^- + W \sum_{i=1}^{n} \hat{x}_{i,k}^- \quad (4.2)$$

Where $W_0$ and W are the weights associated to the middle point and the sigma points, respectively. Using this weighted information, the sample covariance can be computed around this new covariance, with the covariance weights $W_c$ and W, similar to the mean predicted state $$P_k^- = W_c(\hat{x}_{0,k}^- - \hat{x}_k^-)(\hat{x}_{0,k}^- - \hat{x}_k^-)^T + W \sum_{i=1}^n (\hat{x}_{i,k}^- - \hat{x}_k^-)(\hat{x}_{i,k}^- - \hat{x}_k^-)^T \quad (4.3)$$

The next step, now that the estimated position and covariance has been computed, is to use this knowledge to attempt to correct the estimated position, to get our predicted state. To do this, the overall predicted measurement $\hat{z}_k$ is computed $$\hat{z}_{i,k} = h(\hat{x}_{i,k}^-, r_{i,k}) \quad (4.4)$$

Where $r_{i,k}$ is the measurement noise with covariance R, a property of the sensors in use. Then the weighted mean of this predicted measurement is computed:

$$\hat{z}_k + W_0 \hat{z}_{0,k} + W \sum_{i=1}^n \hat{z}_{i,k} \quad (4.5)$$

This predicted measurement is then used to correct the state using $y_k$, which is the innovation vector, or residual. This is the vector pointing from the predicted measurement to the actual measurement, which is scaled using K the Kalman gain.

$$y_k = z_k - \hat{z}_k \quad (4.6)$$

$$\hat{x}_k^+ = \hat{x}_k^- + K_{y_k} \quad (4.7)$$

The Kalman gain is a scaling matrix that enables mapping of the estimates to the true location, based on the covariance matrices. Thus, to compute the predicted measurement, and move forward to the next timestep in the filter, the Kalman gain must first be computed. This is done by first computing the weighted sample covariances of both the estimated measurement value with the estimated position, and the estimated measurement value with itself.

$$p_{xy} = W_c(\hat{x}_{0,k}^- - \hat{x}_k^-)(\hat{z}_{0,k}^- - \hat{z}_k^-)^T + W \sum_{i=1}^n (\hat{x}_{i,k}^- - \hat{x}_k^-)(\hat{z}_{i,k}^- - \hat{z}_k^-)^T \quad (4.8)$$

$$P_{yy} = W_c(\hat{z}_{0,k}^- - \hat{z}_k^-)(\hat{z}_{0,k}^- - \hat{z}_k^-)^T + W \sum_{i=1}^n (\hat{z}_{i,k}^- - \hat{z}_k^-)(\hat{z}_{i,k}^- - \hat{z}_k^-)^T \quad (4.9)$$

The Kalman gain is then the ratio of these two covariance matrices $$K = P_{xy} P_{yy}^{-1} \quad (4.10)$$

Finally, the covariance values need to be corrected, similar to how the position estimates were corrected, in order to be used in the next time-step of the filter.

$$\hat{x}_{i,k}^+ = \hat{x}_{i,k}^- + K(z_k - \hat{z}_{i,k}) \quad (4.11)$$

The new covariance matrix can be computed as a sample covariance of the corrected sigma points, $P_k^+$:

$$P_k^+ = W_c(\hat{x}_{0,k}^+ - \hat{x}_k^+)(\hat{x}_{0,k}^+ - \hat{x}_k^+)^T + W \sum_{i=1}^n (\hat{x}_{i,k}^+ - \hat{x}_k^+)(\hat{x}_{i,k}^+ - \hat{x}_k^+)^T \quad (4.12)$$

Which can be simplified to be:

$$P_k^+ P_k^- - KR_k K^T \quad (4.13)$$

Where $R_k$ is the covariance of the measurement error, taken from the datasheet of whatever sensor is in use (in this case a radar or LIDAR sensor). The covariance values can then be used to generate an error ellipse, or egg of death, around the spacecraft, which provides the volume of space within which we expect to find the spacecraft with $3\sigma$ precision.

Figure 22:
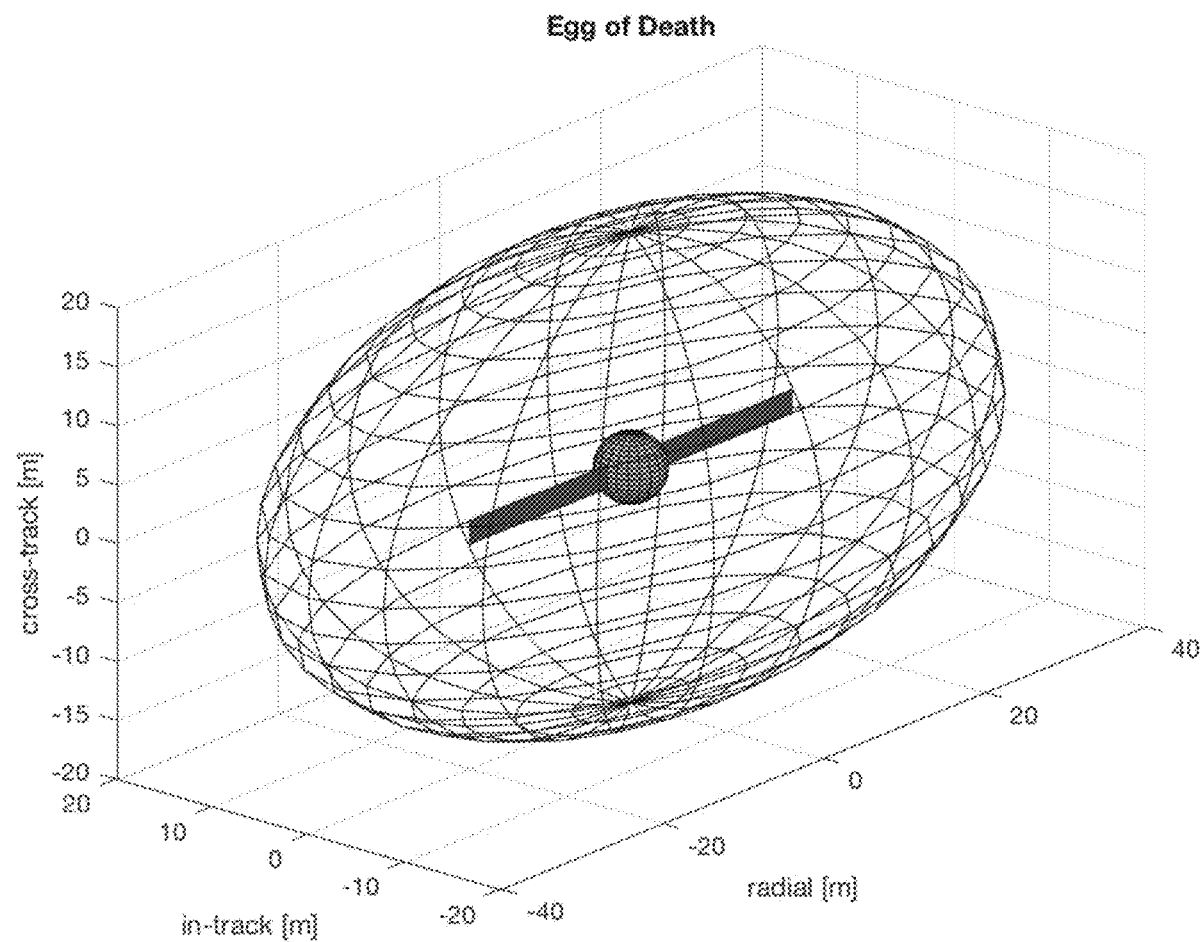

FIG. 22 above shows an example egg of death around a satellite. The size of the egg is primarily based on two factors; the measurement error from the radar ranging system used to determine the position and velocity of the satellite, and the propagation of error between measurements. The measurement error (covariance) itself cannot be removed, but it can be compensated for and narrowed down using a Kalman filter to sort out readings that are not very likely given the physics of orbital mechanics.

4.3.2 Sensor Fusion Kalman Filter

In order to take into account the shared data of the swarm, which is the combination of the radar ranging sensors on each spacecraft, a sensor-fusion Kalman Filter is used. This is a modification of the standard Kalman filter described above, which uses multiple measurement update cycles to incorporate the shared data of the swarm to further refine the covariance ellipsoid for each spacecraft. FIG. 12 shows an example of the sensor fusion process, where the covariance of the position between Sat #1 and the Client spacecraft can be improved by fusing the data from all the swarm spacecraft, even taking into account the GPS position errors defining the locations of each swarm spacecraft with respect to Sat #1.

In order to take into account multiple sensor inputs, the unscented Kalman filter algorithm itself must be modified to be able to process this additional data. The Kalman filter operates by propagating an initial state in time using known equations of motion, and then a position and covariance update step is performed using data from an onboard sensor to filter out noise and erroneous data from the sensor data. With a sensor fusion Kalman filter, the propagation step remains the same (see Equation 4.1), however the correction and update step (see Equation 4.7) is performed multiple times, once for each sensor. This process is depicted in FIG. 3 using pseudocode.

Since the majority of the computation time in the Kalman filter is spent on the propagation step, rather than the update step, repeating the update step adds very little computational overhead, while greatly improving the spacecraft covariance.

4.4 Kalman Filtering for Real-Time Operations

In order to maintain safe trajectories that avoid collisions between spacecraft in the swarm, a Sensor Fusion unscented Kalman Filter (SFKF) is used to accurately determine, in real-time, the position and velocity of each spacecraft. This is done using only the information available to the swarm members themselves, through external sensors, and without additional information from operators on the ground. Using the Kalman filter, a set of covariance matrices are obtained for each predicted position and velocity, setting the upper limits of the error bars on the measured and processed data.

In this manner, trajectories can also be assigned a specific corridor, where if the spacecraft drifts too far from the designated trajectory (as determined by fusing sensor data and filtering it through the SFKF), a small correction maneuver is performed to re-align the spacecraft to its target.

Figure 23:
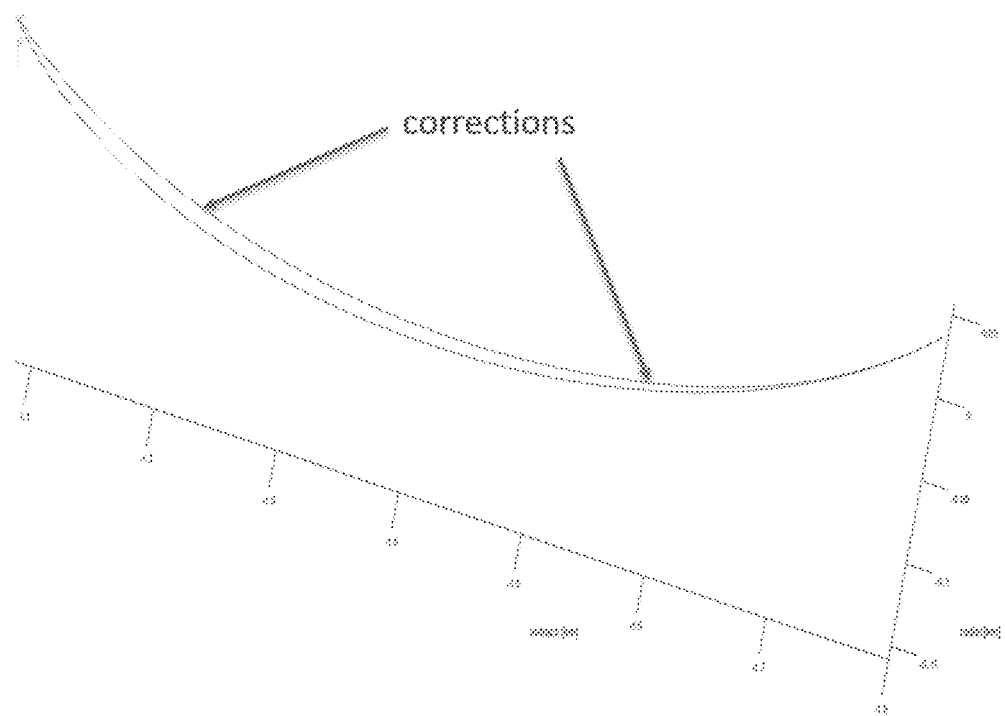
FIG. 23. Filtered Rendezvous Maneuver.

FIG. 23 shows a two-stage rendezvous process, where the first step of the trajectory is a non-intersecting free-flight trajectory. This means that if the burn to transition from the first to the second segment were to fail, there would be no collision. The total Δv for this maneuver is 4.1 m/s, with 0.29 m/s of that due to small course corrections applied by the automated Kalman filter system to remain on-track. The blue trajectory is the projected course, and the purple trajectory is the path perceived by the spacecraft to be where it has actually travelled. This differs from the nominal trajectory due to injection errors, attitude knowledge errors on the spacecraft, and uncertainty of true position. Two corrective maneuvers are performed during this transfer, dictated by the Kalman filter, to maintain the desired destination. In this case there is no truth trajectory of where the spacecraft truly was, as there is no independent observer to determine this. Instead, the swarm Kalman filtering method uses sensors aboard all spacecraft to compute the relative position of each swarm member, and to determine if any sensors are aberrant.

4.5 Patched RPO Using Kalman Filtering

In order to transition between various relative motion trajectories, a method of patched RPO has been devised. This method takes two defined states, separated by a defined period of time, to determine the most efficient set of impulsive maneuvers to be able to safely transition between these states. This is done using two, three, or four impulsive maneuvers, depending on what method yields the lowest Δv consumption, while maintaining safe operations with nearby spacecraft.

Each impulsive maneuver begins a new trajectory segment. To compute the shape of the transfer trajectory, and the initial velocity vector required to place the spacecraft on that trajectory, a two-stage solver is used, using the solution of the linearized C-W equation to seed the nonlinear solver for the perturbed gravitational field solution.

$$\vec{v}_0 = \Phi_{rv}^{-1}(\vec{r}_f - \Phi_{rr}\vec{r}_0) \qquad (4.14)$$

$$\vec{v}_f = \Phi_{vr}\vec{r}_0 + \Phi_{vv}\vec{v}_0 \qquad (4.15)$$

Equations 4.14 and 4.15 describe the process used to solve for the initial and final velocities on a transfer arc, when the initial and final positions are known, as well as the transfer time. $\Phi_{rr}$, $\Phi_{rv}$, $\Phi_{vr}$, and $\Phi_{vv}$ come from the definition of the C-W equations [71]. When solving with the C-W equations, the value for $v_0$ is close to the desired solution, however it is a linearized approximation of the unperturbed solution. The perturbed solution can be solved iteratively, numerically solving the second order ODE in Equation 4.16.

$$\frac{d^2\vec{r}}{dt^2} = -\mu\frac{\vec{r}}{\|\vec{r}\|^3} + \vec{a}_{grav-pert} + \vec{a}_{sun-moon} + \vec{a}_{SRP} \qquad (4.16)$$

Where $\vec{a}_{grav-pert}$ accounts for the perturbations in Earth's asymmetrical gravitational field, $\vec{a}_{sun-moon}$ accounts for the Sun and Moon gravitational perturbations, and $\vec{r}_{SRP}$ accounts for the solar radiation pressure. This system of second order ODEs is then solved iteratively to find the initial velocity $\vec{v}_{pert}$ such that the final position, $\vec{r}f$, is the desired trajectory endpoint. This was done using the fsolve method in MATLAB, using the velocity $v_0$ from the C-W linear solution as the initial solver guess to jumpstart the iterative process.

This is initially done prior to the start of the maneuver, in order to plan out the trajectory being travelled and prepare the spacecraft for the burn. Once the initial Δv is applied, the spacecraft has been injected onto the transfer trajectory. A Kalman filter is then used to compute the estimated true position of the spacecraft in real-time, using its onboard sensors. This estimated position is then used to recompute the target point at the end of the transfer arc, at a rate of once per second. If the trajectory is determined to deviate by more than 5 m, then Equation 4.16 is solved again iteratively, and a small impulsive maneuver is performed to align to the updated trajectory, maintaining the original target point as the destination. FIG. 4 depicts this process graphically. This is done continuously in real-time during all swarm operations to maintain trajectories within their corridors.

4.6 Results

Figure 24:
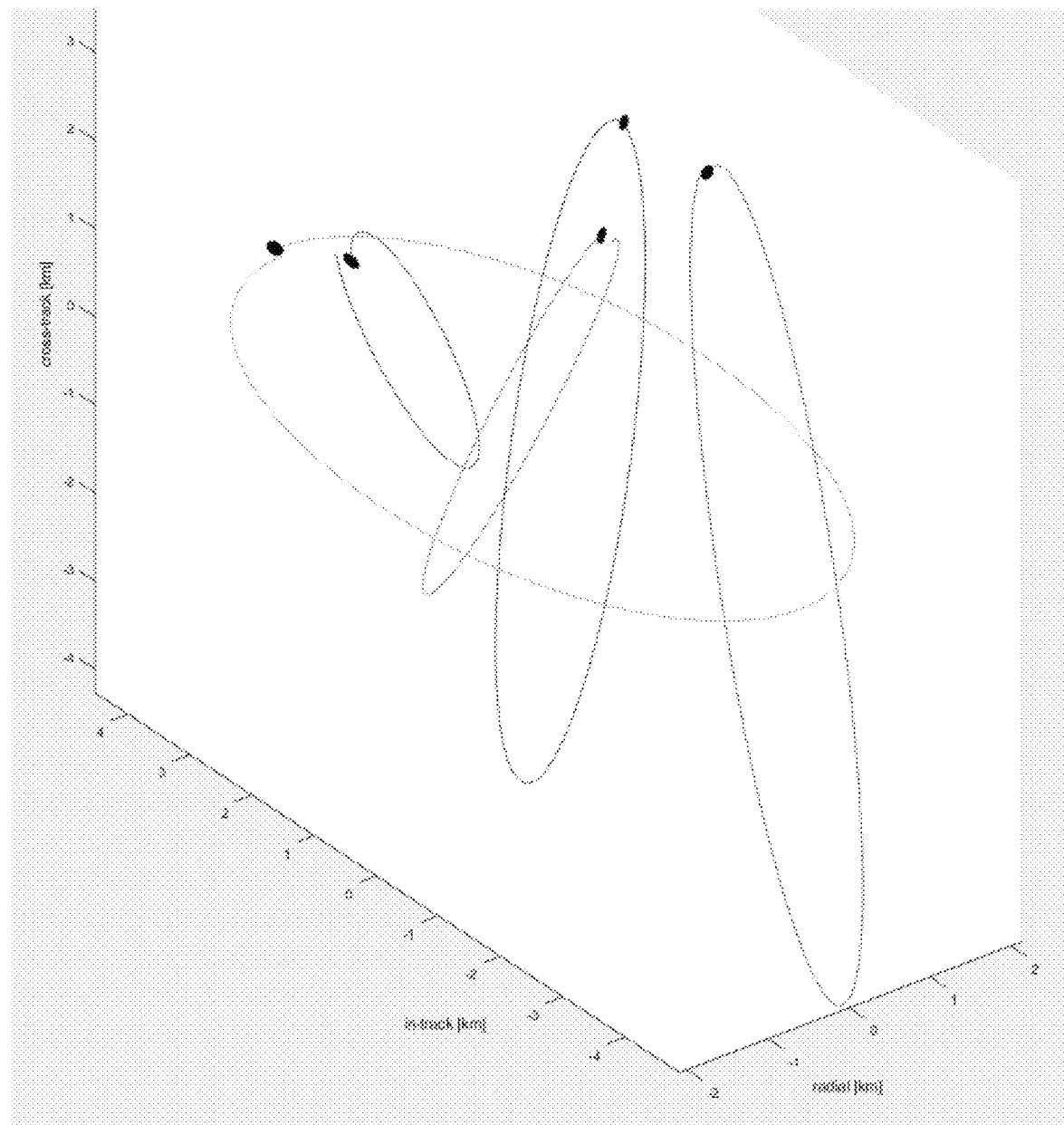
FIG. 24. Swarm Covariance Estimates from SFKF.

Using the following assumptions, a set of simulations were run to determine the estimated position vs time for each spacecraft in the swarm, computed using the SFKF. This produced a set of covariance matrices for each spacecraft at each timestep. Swarm spacecraft assumptions (conservative w.r.t COTS products): 1. On-board propulsion system and fuel source (preferably refuelable) with a minimum 200 m/s Δv capacity. 2. Three-axis attitude control, and attitude knowledge with 0.5° accuracy. 3. Relative motion position sensors to determine range to nearby spacecraft with 5% accuracy 4. Relative motion speed sensors to determine the speed of nearby spacecraft with 1% accuracy 5. Redundant communication systems to transmit and receive data between all spacecraft in the swarm. Comparing the data from this simulation (see FIG. 24) with GPS position accuracy [72], it can be seen that the SFKF offers greater fidelity in close proximity, providing position estimates within 10 m, as compared to GPS in LEO which offers 25 m accuracy.

4.7 Conclusions

When dealing with large swarms of spacecraft, there is an abundance of data available to the swarm as a whole. In order to make efficient use of this data for navigation and mission operations purposes, new sets of algorithms are needed to process this data in real-time and extract the relevant point for immediate use. The Sensor Fusion Kalman Filtering algorithm for spacecraft swarms presented in this paper is one method to achieve this for large swarms of spacecraft, as demonstrated through simulated models.

Additional details of the invention set forth above are found in Rughani, Rahul & Barnhart, David. (2020). [SSC20-WKVI-01] Safe Construction in Space: Using Swarms of Small Satellites for In-Space Manufacturing. 34th Annual. Small Satellite Conference; Garcia-Huerta, Raul A., Luis E. Gonzalez-Jimenez, and Ivan E. Villalon-Turrubiates. 2020. "Sensor Fusion Algorithm Using a Model-Based Kalman Filter for the Position and Attitude Estimation of Precision Aerial Delivery Systems" Sensors 20, no. 18: 5227. https://doi.org/10.3390/s20185227; and Rughani, Rahul.University of Southern California, Relative-Motion Trajectory Generation and Maintenance for Multi-Spacecraft Swarms ProQuest Dissertations Publishing, 2021. 28411151; the entire disclosures of these publications are hereby incorporated by reference in their entirety.

APPENDIX A

Relative orbital motion takes place in the Local-Vertical Local-Horizontal (LVLH) rotating reference frame. This non-inertial reference frame is centered on a point in space, in orbit around the Earth, which could be a Client spacecraft, a waypoint, or some other point of interest. The x-axis (radial) is directed along the outward radial vector from the center of the Earth to the target, the z-axis (cross-track) is normal to the orbital plane of the target, and the y-axis (in-track) lies within the orbital plane, constrained by the x- and z-axes to form a triad.

This motion can be described by the following equations of motion, where $\vec{R}$ is the vector from the center of the Earth to the Client, and $\delta r$ is the vector from the Client (i.e., target spacecraft) to the Servicer vehicle (swarm spacecraft):

$$\ddot{\delta r} = -\ddot{\vec{R}} - \mu \frac{\vec{R} + \delta \vec{r}}{\|\vec{R} + \delta \vec{r}\|^3} \tag{A.1}$$

These equations of motion are a nonlinear system of equations; however, a linearized approach is desired to use in a real-time guidance application. If the target spacecraft is restricted to be in a circular orbit, the system can be defined in a closed-form linearized approximation by the Clohessy-Wiltshire (C-W) equations, laid out below in Equations A.2-A.4.

$$\delta\ddot{x} - 3n^2\delta x - 2n\delta\dot{y} = 0 \tag{A.2}$$

$$\delta\ddot{y} + 2n\delta\dot{x} = 0 \tag{A.3}$$

$$\delta\ddot{z} + n^2\delta z = 0 \tag{A.4}$$

These differential equations are valid while the following criterion from the linearization process holds:

$$\frac{\|\delta\vec{r}\|}{\|\vec{R}\|} \ll 1 \tag{A.5}$$

A closed form solution of these coupled partial differential equations can be obtained, expressed in matrix form in Equations A.6-A.7 below, enabling the computation of position and velocity at any point in time:

$$\delta\vec{r}(t) = [\Phi_{rr}(t)]\delta\vec{r}_0 + [\Phi_{rv}(t)]\delta\vec{v}_0 \tag{A.6}$$

$$\delta\vec{v}(t) = [\Phi_{vr}(t)]\delta\vec{r}_0 + [\Phi_{vv}(t)]\delta\vec{v}_0 \tag{A.7}$$

where the initial position and velocity are $$\delta\vec{r}_0 = \begin{bmatrix} \delta x_0 \\ \delta y_0 \\ \delta z_0 \end{bmatrix}, \delta\vec{v}_0 = \begin{bmatrix} \delta u_0 \\ \delta v_0 \\ \delta w_0 \end{bmatrix}$$

n: angular rotation rate of orbit (rad/s)
t: time since initial conditions $$\Phi_{rr}(t) = \begin{bmatrix} 4 - 3\cos nt & 0 & 0 \\ 6(\sin nt - nt) & 1 & 0 \\ 0 & 0 & \cos nt \end{bmatrix} \tag{A.8}$$

$$\Phi_{rv}(t) = \begin{bmatrix} \frac{1}{n}\sin nt & \frac{2}{n}(1 - \cos nt) & 0 \\ \frac{2}{n}(\cos nt - 1) & \frac{1}{n}(4\sin nt - 3nt) & 0 \\ 0 & 0 & \frac{1}{n}\sin nt \end{bmatrix} \tag{A.9}$$

$$\Phi_{vr}(t) = \begin{bmatrix} 3n\sin nt & 0 & 0 \\ 6n(\cos nt - 1) & 0 & 0 \\ 0 & 0 & -n\sin nt \end{bmatrix} \tag{A.10}$$

$$\Phi_{vv}(t) = \begin{bmatrix} \cos nt & 2\sin nt & 0 \\ -2\sin nt & 4\cos nt - 3 & 0 \\ 0 & 0 & \cos nt \end{bmatrix} \tag{A.11}$$

Although the C-W equations are linearized approximations of a nonlinear system, the approximations are sufficient for the purposes of orbital rendezvous and proximity operations. The solutions diverge when the distance from the target is a significant percentage of the mean orbital radius of the target, as this is when the Earth's curvature will have an effect on the direction of the gravitational perturbations. Thus, for LEO, based on the linearization criterion (Equation 2.5), these solutions can be used with relatively high accuracy within a few dozen kilometers of the target, and in GEO within a few hundred kilometers of the target [50].

APPENDIX B

Planetary gravitational fields, like the Earth's, are not perfectly symmetric. The Earth is not a perfect sphere, nor is its mass evenly distributed, thus it has a non-uniform gravitational field. These gravitational perturbations can be described using a spherical harmonic gravitational model, described as follows, with the full explanation being found in section 2.2.1.

$$U = \frac{\mu}{r}\left[1 - \sum_{l=2}^{\infty} J_l\left(\frac{R_\oplus}{r}\right)^l P_l[\sin(\phi_{gc_{sat}})] + \sum_{l=2}^{\infty}\sum_{m=1}^{l}\left(\frac{R_\oplus}{r}\right)^l P_{l,m}[\sin(\phi_{gc_{sat}})]\{C_{l,m}\cos(m\lambda_{sat}) + S_{l,m}\sin(\lambda_{sat})\}\right] \tag{B.1}$$

The C and S coefficients are required to solve for the potential, which are determined empirically, and are specific to the gravitational field in question. For Earth, this can be found in data from the GRACE mission by NASA and UT Austin, up to the 2160th degree. For the purposes of this analysis, a fourth order analysis using both zonal and tesseral terms is used for orbits in MEO and GEO, whereas a second order analysis with only zonal terms is used for LEO orbits, due to the negligible variations of longitudinal perturbations in LEO compared to the latitudinal perturbations (J2 effect). The data below shows these coefficients up to the 5th degree, retrieved from http://download.csr.utex-as.edu/pub/s1r/degree 5/CSR Monthly 5x5 Gravity Harmonics.txt on Feb. 19, 2021. These values are updated monthly from the GRACE-FO satellites.

| GGM05C coefficients: | |
|---|---|
| earth_gravity_constant | 3.986004415E+14 |
| radius | 6.378136300E+06 |
| errors | Calibrated (sigmas have been adjusted to be more accurate) |
| norm | fully_normalized |
| tide_system | zero_tide |
| format | 2I5, 2D20.12, 2D13.5 |

| L | M | C | S | sigma | C |
|---|---|---|---|---|---|
| 2 | 0 | -4.841694573200D-04 | 0.000000000000D+00 | 1.17430D-10 | 0.00000D+00 |
| 2 | 1 | -3.103431067239D-10 | 1.410757509442D-09 | 4.29920D-11 | 4.29620D-11 |
| 2 | 2 | 2.439373415940D-06 | -1.400294011836D-06 | 3.68360D-11 | 3.63870D-11 |
| 3 | 0 | 9.571647583412D-07 | 0.000000000000D+00 | 1.30040D-11 | 0.00000D+00 |
| 3 | 1 | 2.030446637169D-06 | 2.482406346848D-07 | 7.71580D-12 | 7.69980D-12 |
| 3 | 2 | 9.047646744100D-07 | -6.190066246333D-07 | 1.17100D-11 | 1.17290D-11 |
| 3 | 3 | 7.212852551704D-07 | 1.414400065165D-06 | 2.34700D-11 | 2.34810D-11 |
| 4 | 0 | 5.399815392137D-07 | 0.000000000000D+00 | 6.73720D-12 | 0.00000D+00 |
| 4 | 1 | -5.361808133703D-07 | -4.735769769691D-07 | 5.29480D-12 | 5.28940D-12 |
| 4 | 2 | 3.504921442703D-07 | 6.625051657439D-07 | 7.61690D-12 | 7.61490D-12 |
| 4 | 3 | 9.908610311151D-07 | -2.009508998058D-07 | 1.28570D-11 | 1.28620D-11 |
| 4 | 4 | -1.884924225276D-07 | 3.088185785570D-07 | 1.34180D-11 | 1.33940D-11 |
| 5 | 0 | 6.865032345839D-08 | 0.000000000000D+00 | 3.20970D-12 | 0.00000D+00 |
| 5 | 1 | -6.291457940968D-08 | -9.434259860005D-08 | 2.56020D-12 | 2.55850D-12 |
| 5 | 2 | 6.520586031691D-07 | -3.233430798143D-07 | 3.36790D-12 | 3.36650D-12 |
| 5 | 3 | -4.518313784464D-07 | -2.149423673602D-07 | 6.27900D-12 | 6.27680D-12 |
| 5 | 4 | -2.953234091704D-07 | 4.981057884405D-08 | 7.88550D-12 | 7.89070D-12 |
| 5 | 5 | 1.748143504694D-07 | -6.693546770160D-07 | 1.22840D-11 | 1.22710D-11 |
| 6 | 1 | -7.594326587940D-08 | 2.652568324970D-08 | 2.52870D-12 | 2.52720D-12 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

[1] Alfriend, K., Vadali, S. R., Gurfil, P., How, J., and Breger, L., Spacecraft formation flying: Dynamics, control and navigation, Vol. 2, Elsevier, 2009.

[2] Izzo, D., and Pettazzi, L., "Autonomous and distributed motion planning for satellite swarm," Journal of Guidance, Control, and Dynamics, Vol. 30, No. 2, 2007, pp. 449-459.

[3] Hadaegh, F. Y., Chung, S.-J., and Manohara, H. M., "On development of 100-gram-class spacecraft for swarm applications," IEEE Systems Journal, Vol. 10, No. 2, 2014, pp. 673-684.

[4] Reed, B. B., Smith, R. C., Naasz, B. J., Pellegrino, J. F., and Bacon, C. E., "The Restore-L servicing mission," AIAA SPACE 2016, 2016, p. 5478.

[5] Barnhart, D., Will, P., Sullivan, B., Hunter, R., and Hill, L., "Creating a Sustainable Assembly Architecture for Next-Gen Space: The Phoenix Effect," 30th Space Symposium, 2014.

[6] Katz, J., Mohan, S., and Miller, D., "On-orbit assembly of flexible space structures with SWARM," AIAA Infotech@ Aerospace 2010, 2010, p. 3524.

[7] Skomorohov, R., Welch, C., and Hein, A., "In-orbit Spacecraft Manufacturing: Near-Term Business Cases," International Space University, 2016.

[8] Piskorz, D., and Jones, K. L., "On-orbit assembly of space assets: A path to affordable and adaptable space infrastructure," The Aerospace Corporation, 2018.

[9] Rauwolf, G. A., and Coverstone-Carroll, V. L., "Near-optimal low-thrust orbit transfers generated by a genetic algorithm," Journal of Spacecraft and Rockets, Vol. 33, No. 6, 1996, pp. 859-862.

[10] Ferrandez, S. M., Harbison, T., Weber, T., Sturges, R., and Rich, R., "Optimization of a truck-drone in tandem delivery network using k-means and genetic algorithm," Journal of Industrial Engineering and Management (JIEM), Vol. 9, No. 2, 2016, pp. 374-388.

[11] Saez, Y., Perez, D., Sanjuan, O., and Isasi, P., "Driving cars by means of genetic algorithms," International Conference on Parallel Problem Solving from Nature, Springer, 2008, pp. 1101-1110.

[12] Rughani, R., Villafaña, L., and Barnhart, D. A., "Swarm RPO and Docking Simulation on a 3DOF Air Bearing Platform," 70$^{th}$ International Astronautical Congress (IAC), Washington D.C., United States, 21-25 Oct. 2019.

[13] Curtis, H. D., Orbital Mechanics for Engineering Students, (pp. 383-38'7) Elsevier Aerospace Engineering Series, Elsevier, 2014.

[14] Mayer, J., and Parten, R., "Development of the Gemini operational rendezvous plan." Journal of spacecraft and rockets, Vol. 5, No. 9, 1968, pp. 1023-1028.

[15] Goldberg, D. E., Genetic Algorithms in Search, Optimization and Machine Learning, 1st ed., Addison-Wesley Longman Publishing Co., Inc., Boston, MA, USA, 1989.

[16] Haupt, R., and Haupt, S., Practical Genetic Algorithms, Wiley InterScience electronic collection, Wiley, 2004.

[17] Chan, F. K., et al., Spacecraft collision probability, Aerospace Press El Segundo, C A, 2008.

[18] Pavlou, G., "Bandwidth Shortage and Relevant Solutions: Myths and Facts," Inernational Federation for Information Processing (IFIP) and Institute of Electrical and Electronics Engineers (IEEE) Joint International Conference on Network and Service Management (CNSM), University College London, United Kingdom, 2011.

[19] Levchenko, I., Xu, S., Wu, Y.-L., and Bazaka, K., "Hopes and concerns for astronomy of satellite constellations," Nature Astronomy, Vol. 4, No. 11, 2020, pp. 1012-1014.

[20] Mohney, D., "The 2018 Summer of Satellite IoT-18 Startups, Over 1,600 Satellites," https://www.spaceitbridge. com/the-2018-summer-of-satellite-iot-18-startups-over-1600-satellites.htm, 2018.

[21] Alfano, S., Oltrogge, D., and Shepperd, R., ""Leo Constellation Encounter And Collision Rate Estimation: An Update"," Second International Academy of Astronautics (IAA) Conference on Space Situational Awareness (ICSSA), Washington D.C., IAA-ICSSA-20-0021, Jan. 15, 2020.

[22] Dowd, K., "OneWeb Seeks to Increase Satellite Constellation Up to 48,000 Satellites, Bringing Maximum Flexibility to Meet Future Growth and Demand," OneWeb Offical Press Release, 2020.

[23] Kelso, T., "Active Geosynchronous Satellites Current as of 2020 Dec. 28 00:06:06 UTC," https://celestrak.com/NORAD/elements/geo.php, 2020.

[24] Rughani, R., and Barnhart, D. A., "Using Genetic Algorithms for Safe Swarm Trajectory Optimization," 30th AIAA/AAS Space Flight Mechanics Meeting. Orlando Fl, USA, 6-10 Jan. 2020.

[25] Curtis, H. D., Orbital Mechanics for Engineering Students, Butterworth-Heinemann, 2013.

[26] Tapley, B. D., Watkins, M. M., Ries, J. C., Davis, G. W., Eanes, R. J., Poole, S. R., Rim, H. J., Schutz, B. E., Shum, C. K., Nerem, R. S., Lerch, F. J., Marshall, J. A., Klosko, S. M., Pavlis, N. K., and Williamson, R. G., "The Joint Gravity Model 3," Journal of Geophysical Research: Solid Earth, Vol. 101, No. B12, 1996, pp. 28029-28049.

[27] Vallado, D. A., Fundamentals of Astrodynamics and Applications, Vol. 12, Springer Science & Business Media, 2001.

[28] Tapley, B., and Reigber, C., "The GRACE Mission: Status and Future Plans," Proceedings of the American Geophysical Union Fall Meeting, Vol. 2001, 2001, pp. G41C-02.

[29] Lemoine, F. G., Kenyon, S. C., Factor, J. K., Trimmer, R. G., Pavlis, N. K., Chinn, D. S., Cox, C. M., Klosko, S. M., Luthcke, S. B., Torrence, M. H., Wang, Y. M., Williamson, R. G., Pavlis, R. H., Rapp, R. H., and Olson, T. R., "The Development of the Joint NASA GSFC and the National Imagery and Mapping Agency (NIMA) Geopotential Model EGM96," NASA Technical Report, Goddard Space Flight Center, 1998.

[30] Wagner, C. A., The Gravity Potential and Force Field of the Earth Through Fourth Order, National Aeronautics and Space Administration, 1966.

[31] Chao, C.-C. G., Applied Orbit Perturbation and Maintenance, American Institute of Aeronautics and Astronautics, Inc., 2005.

[32] Goldberg, D. E., Genetic Algorithms in Search, Optimization and Machine Learning, 1st ed., Addison-Wesley Longman Publishing Co., Inc., Boston, MA, USA, 1989.

[33] Courant, R., and Hilbert, D., Methods of Mathematical Physics: Partial Differential Equations, John Wiley & Sons, 2008.

[34] Patel, P. R., "Automating Interplanetary Trajectory Generation for Electric Propulsion Trade Studies," Ph.D. thesis, The University of Michigan, 2008.

[35] Patel, P. R., Gallimore, A. D., Zurbuchen, T. H., and Scheeres, D. J., "An Algorithm for Generating Feasible Low Thrust Interplanetary Trajectories," Proceedings of the International Electric Propulsion Conference, Michigan, USA, 2009.

[36] Sims, J., Finlayson, P., Rinderle, E., Vavrina, M., and Kowalkowski, T., "Implementation of a Low-Thrust Trajectory Optimization Algorithm for Preliminary Design," AIAA/AAS Astrodynamics Specialist Conference and Exhibit, 2006, p. 6746.

[37] Jiang, F., Baoyin, H., and Li, J., "Practical Techniques for Low-Thrust Trajectory Optimization with Homotopic Approach," Journal of Guidance, Control, and Dynamics, Vol. 35, No. 1, 2012, pp. 245-258.

[38] Hargraves, C. R., and Paris, S. W., "Direct Trajectory Optimization using Nonlinear Programming and Collocation," Journal of Guidance, Control, and Dynamics, Vol. 10, No. 4, 1987, pp. 338-342.

[39] Wu, B., Wang, D., Poh, E. K., and Xu, G., "Nonlinear Optimization of Low-Thrust Trajectory for Satellite Formation: Legendre Pseudospectral Approach," Journal of Guidance, Control, and Dynamics, Vol. 32, No. 4, 2009, pp. 1371-1381.

[40] Lee, B.-S., Lee, J.-S., and Choi, K.-H., "Analysis of a Station-Keeping Maneuver Strategy for Collocation of Three Geostationary Satellites," Control Engineering Practice, Vol. 7, No. 9, 1999, pp. 1153-1161.

[41] de Bruijn, F. J., Theil, S., Choukroun, D., and Gill, E., "Collocation of Geostationary Satellites Using Convex Optimization," Journal of Guidance, Control, and Dynamics, Vol. 39, No. 6, 2016, pp. 1303-1313.

[42] Redd, N. T., "Bringing Satellites Back From the Dead: Mission Extension Vehicles Give Defunct Spacecraft a New Lease on Life-[News]," Institute of Electrical and Electronics Engineers (IEEE) Spectrum, Vol. 57, No. 8, 2020, pp. 6-7.

[43] Caleb Henry, Northrop Grumman's MEV-1 servicer docks with Intelsat satellite. SpaceNews, February 2020.

[44] Debra Werner. Orbital ATK's giant leap into satellite servicing begins with baby steps. https://spacenews.com/orbital-atksgiant-leap-into-satellite-servicingbegins-with-baby-steps/, 2018. [Online; accessed 6 Sep. 2018].

[45] Neil Dipprey and Scott Rotenberger. Orbital Express Propellant Resupply Servicing. In 39th AIAA/ASME/SAE/ASEE Joint Propulsion Conference and Exhibit, page 4898, 2003.

[46] Aman Chandra, Himangshu Kalita, Roberto Furfaro, and Jekan Thangavelautham. End to End Satellite Servicing and Space Debris Management. arXiv preprint arXiv:1901.11121, 2019.

[47] Benjamin B Reed, Robert C Smith, Bo J Naasz, Joseph F Pellegrino, and Charles E Bacon. The restore-L servicing mission. In AIAA SPACE 2016, page 5478. 2016.

[48] Jason L Forshaw, Guglielmo S Aglietti, Nimal Navarathinam, Haval Kadhem, Thierry Salmon, Aurélien Pisseloup, Eric Joffre, Thomas Chabot, Ingo Retat, Robert Axthelm, et al. Removedebris: An in-orbit active debris removal demonstration mission. Acta Astronautica, 127: 448-463, 2016.

[49] Brook R Sullivan, Joseph Parrish, and Gordon Roesler. Upgrading In-service Spacecraft with On-orbit Attachable Capabilities. In 2018 AIAA SPACE and Astronautics Forum and Exposition, page 5223, 2018.

[50] J. Sasiadek. Space robotics—present and past challenges. 2014 19th International Conference on Methods and Models in Automation and Robotics, MMAR 2014, pages 926-929, 11 2014.

[51] David Saldana, Bruno Gabrich, Guanrui Li, Mark Yim, and Vijay Kumar. Modquad: The flying modular structure that self-assembles in midair. In 2018 IEEE International Conference on Robotics and Automation (ICRA), pages 691-698. IEEE, 2018.

[52] Neeraj Gandhi, David Saldana, Vijay Kumar, and Linh Thi Xuan Phan. Self-reconfiguration in response to faults in modular aerial systems. IEEE Robotics and Automation Letters, 5(2):2522-2529, 2020.

[53] Rahul Rughani and David A Barnhart. Using Genetic Algorithms for Safe Swarm Trajectory Optimization. In 30th AIAA/AAS Space Flight Mechanics Meeting. Orlando Fl, USA, 6-10 Jan. 2020.

[54] Caleb Henry. Northrop Grumman's MEV-1 servicer docks with Intelsat satellite. SpaceNews, February 2020. https://spacenews. com/northrop-grummans-mev-1-servicer-docks-with-intel sat-satellite/.

[55] Debra Werner. Orbital ATK's giant leap into satellite servicing begins with baby steps. https://spacenews.com/orbital-atks-giant-leap-into-satellite-servicing-begins-with-baby-steps/, 2018. [Online; accessed 6 Sep. 2018].

[56] Neil Dipprey and Scott Rotenberger. Orbital Express Propellant Resupply Servicing. In 39th AIAA/AS-ME/SAE/ASEE Joint Propulsion Conference and Exhibit, page 4898, 2003.

[57] Aman Chandra, Himangshu Kalita, Roberto Furfaro, and Jekan Thangavelautham. End to End Satellite Servicing and Space Debris Management. arXiv preprint arXiv:1901.11121, 2019.

[58] Benjamin B Reed, Robert C Smith, Bo J Naasz, Joseph F Pellegrino, and Charles E Bacon. The restore-L servicing mission. In AIAA SPACE 2016, page 5478. American Institute of Aeronautics and Astronautics, 2016.

[59] Jason L Forshaw, Guglielmo S Aglietti, Nimal Navarathinam, Haval Kadhem, Thierry Salmon, Aurelien Pisseloup, Eric Joffre, Thomas Chabot, Ingo Retat, Robert Axthelm, et al. Removedebris: An in-orbit active debris removal demonstration mission. Acta Astronautica, 127: 448-463, 2016.

[60] Brook R Sullivan, Joseph Parrish, and Gordon Roesler. Upgrading In-service Spacecraft with On-orbit Attachable Capabilities. In 2018 AIAA SPACE and Astronautics Forum and Exposition, page 5223, 2018.

[61] Rahul Rughani and David A Barnhart. Using Genetic Algorithms for Safe Swarm Trajectory Optimization. In 30th AIAA/AAS Space Flight Mechanics Meeting. Orlando Fl, USA, 6-10 Jan. 2020.

[62] Rahul Rughani and David A Barnhart. Safe Construction in Space: Using Swarms of Small Satellites for In-Space Manufacturing. SmallSat Conference, Logan, Utah (Virtual), 2020.

[63] David A Barnhart and Rahul Rughani. On-Orbit Servicing Ontology Applied to Recommended Standards for Satellites in Earth Orbit. Journal of Space Safety Engineering, 2020.

[64] David E Gaylor and Brent William Barbee. Algorithms for Safe Spacecraft Proximity Operations. In AAS/AIAA Spaceflight Mechanics Meeting, 2007.

[65] Dario Izzo and Lorenzo Pettazzi. Autonomous and Distributed Motion Planning for Satellite Swarm. Journal of Guidance, Control, and Dynamics, 30(2):449{459, 2007.

[66] Ismael Lopez and Colin R McInnes. Autonomous Rendezvous Using Artificial Potential Function Guidance. Journal of Guidance, Control, and Dynamics, 18(2): 237{241, 1995.

[67] G L Slater, S M Byram, and T W Williams. Collision Avoidance for Satellites in Formation Flight. Journal of Guidance, Control, and Dynamics, 29(5):1140{1146, 2006.

[68] I Ross, J King, and Fariba Fahroo. Designing Optimal Spacecraft Formations. In AIAA/AAS Astrodynamics Specialist Conference and Exhibit, page 4635, 2002.

[69] Yaakov Bar-Shalom, X Rong Li, and Thiagalingam Kirubarajan. Estimation With Applications to Tracking and Navigation: Theory Algorithms and Software. John Wiley & Sons, 2004.

[70] Mike West and Jeff Harrison. Bayesian Forecasting and Dynamic Models. Springer Science & Business Media, 2006.

[71-57] Howard D. Curtis. Orbital Mechanics for Engineering Students. (pp. 383-38'7) Elsevier Aerospace Engineering Series. Elsevier, 2014.

[72] Anthony S Williams. Expected Position Error for an Onboard Satellite GPS Receiver. Technical report, Graduate School of Air Force Institute of Technology Wright-Patterson AFB, Ohio, 2015.

[73] David Barnhart, Tim Barrett, Je Sachs, and Peter Will. Development and Operation of a Micro-Satellite Dynamic Test Facility for Distributed Flight Operations. In AIAA SPACE 2009 Conference & Exposition, page 6443, 2009.

[74] David A Barnhart, Ryan H Duong, Lizvette Villafana, Jaimin Patel, and Shreyash Annapureddy. The Development of Dynamic Guidance and Navigation Algorithms for Autonomous on-Orbit Multi-Satellite Aggregation. In 70th International Astronautical Congress (IAC), Washington, DC, 2019.

[75] Yashwanth Kumar Nakka, Rebecca C Foust, Elena Sorina Lupu, David B Elliott, Irene S Crowell, Soon-Jo Chung, and Fred Y Hadaegh. A Six Degree-of-Freedom Spacecraft Dynamics Simulator for Formation Control Research. 18th AAS/AIAA Space Flight Mechanics Meeting, Galveston TX, 2018.

[76] Michael Smat, David Barnhart, Lizvette Villafa˜na, and Kirby Overman. Cellular Based Aggregated Satellite System: The Design and Architecture of a Three Degree of Freedom Near-Frictionless Testbed for Ground Validation of CubeSat Operations. 2020 SmallSat Conference, Logan, Utah (Virtual), 2020.

What is claimed is:

1. A swarm control system comprising:
a target space platform;
a swarm of chaser spacecraft, each chaser spacecraft controlled to follow a corresponding computed trajectory; and
at least one computing device that executes a swarm control algorithm, the swarm control algorithm including a nested genetic algorithm, the nested genetic algorithm including multiple guidance genetic algorithms and an outer genetic algorithm, wherein each chaser spacecraft having an associated guidance genetic algorithm that determines a computed trajectory for the chaser spacecraft associated therewith, the outer genetic algorithm configured to check for collisions and to alter one or more computed trajectories to avoid collisions, wherein the swarm control algorithm, when executed, includes steps of:
a) generating an initial population as an input set of position $r(t_0)$ and velocity $v(t_0)$ pairs where $t_0$ is a start time;
b) compute trajectories from the input set of position $r(t_0)$ and velocity $v(t_0)$ pairs;
c) propagate the chaser spacecraft to a final time $t_r$;
d) calculate a trajectory fitness function using an initial position $r(t_0)$, an initial velocity $v(t_0)$, a final position $r(t_r)$, an final velocity $v(t_r)$;
e) if the trajectory fitness function for a given trajectory is calculated to be above a predetermined threshold, the given trajectory is identified as a potential trajectory;

f) encode set of position $r(t_0)$ and velocity $v(t_0)$ pairs into pairs of position binary numbers and velocity binary number;

g) select a predetermined number of the pairs of position binary numbers and velocity binary numbers having best values for the trajectory fitness function as parents for a next generation;

h) apply crossover to the parents;

i) apply mutations to the parents;

j) identify results from the crossover and mutation as inputs for a next iteration;

k) binary decode results from the crossover and mutation to form a new set of position $r(t_0)$ and velocity $v(t_0)$ pairs; and l) provide the new set of position $r(t_0)$ and velocity $v(t_0)$ pairs as the input set of position $r(t_0)$ and velocity $v(t_0)$ pairs in step b).

2. The swarm control system of claim 1, wherein each chaser spacecraft includes a computing device that executes the swarm control algorithm for that chaser spacecraft.

3. The swarm control system of claim 1 further comprising a control station that includes the at least one computing device.

4. The swarm control system of claim 1, wherein each guidance genetic algorithm optimizes an associated trajectory fitness function.

5. The swarm control system of claim 1, wherein the outer genetic algorithm is configured to isolate spacecraft that are involved in a collision and determine how to mitigate the collision.

6. The swarm control system of claim 1, wherein steps b) to l) are repeated until the trajectory fitness function achieves a predetermined value or until a predetermined number of iterations are executed.

7. The swarm control system of claim 1, wherein the outer genetic algorithm is further configured to add one or more chaser spacecraft.

8. The swarm control system of claim 1, wherein the outer genetic algorithm adds chaser spacecraft by optimizing an insert fitness function that uses existing trajectories as an input.

9. The swarm control system of claim 1, wherein genetic algorithms are paired with data from onboard sensors on each individual chaser spacecraft.

10. The swarm control system of claim 9, wherein the onboard sensors are relative motion position sensors to determine range to nearby spacecraft and relative motion speed sensors to determine a speed of nearby spacecraft.

11. The swarm control system of claim 9, wherein data from the onboard sensors is parsed in real-time by an on-board system on each chaser spacecraft in the swarm of chaser spacecraft, and then fed into a sensor fusion Kalman filter on each individual chaser spacecraft to allow the outer genetic algorithm to maintain a relative motion orbit of the swarm of chaser spacecraft when gravitational perturbations are present.

12. The swarm control system of claim 11, wherein a combination of the sensor fusion Kalman filter and the guidance genetic algorithms is configured to predict relative positions of the chaser spacecraft for real-time collision detection and avoidance.

* * * * *